US008366940B2

(12) United States Patent
Berkowitz et al.

(10) Patent No.: US 8,366,940 B2
(45) Date of Patent: Feb. 5, 2013

(54) ZERO VALENT METAL COMPOSITE, MANUFACTURING, SYSTEM AND METHOD USING THEREOF, FOR CATALYTICALLY TREATING CONTAMINATED WATER

(75) Inventors: Brian Berkowitz, Mazkeret Batia (IL); Andrea Cortis, Iglesias (IT); Ishai Dror, Shoham (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 922 days.

(21) Appl. No.: 11/794,544

(22) PCT Filed: Jan. 3, 2006

(86) PCT No.: PCT/IL2006/000010
§ 371 (c)(1),
(2), (4) Date: Jan. 5, 2009

(87) PCT Pub. No.: WO2006/072944
PCT Pub. Date: Jul. 13, 2006

(65) Prior Publication Data
US 2009/0127208 A1    May 21, 2009

Related U.S. Application Data

(60) Provisional application No. 60/640,214, filed on Jan. 3, 2005.

(51) Int. Cl.
*C02F 1/68* (2006.01)
(52) U.S. Cl. ............. 210/749; 423/1; 502/412; 428/328
(58) Field of Classification Search ................ 423/1, 49, 423/53, 62, 69, 99, 138; 428/323, 328; 210/749
See application file for complete search history.

(56) References Cited

U.S. PATENT DOCUMENTS 3,536,619 A * 10/1970 Urban et al. ................. 210/718

5,122,418 A    6/1992 Nakane et al.
(Continued)

FOREIGN PATENT DOCUMENTS

| JP | 63-283752 | 11/1988 |
| JP | 05-277167 | 10/1993 |

(Continued)

OTHER PUBLICATIONS

Use of Nanosized Catalysts for Transformation of Chloro-Organic Pollutants Ishai Dror,*Dana Baram, and, and Brian Berkowitz Environmental Science & Technology 2005 39 (5), 1283-1290 Online Nov. 14, 2004.*

(Continued)

*Primary Examiner* — Steven Bos
*Assistant Examiner* — Richard M Rump

(57) ABSTRACT

Zero valent metal composite, manufacturing thereof, using thereof, and system including thereof, for (in-situ or ex-situ) catalytically treating contaminated water, such as sub-surface water, surface water, above-surface water, water vapor, or/and gaseous water. Composite includes powdered diatomite matrix incorporated with nanometer (1-1000 nm) sized particles of a zero valent (transition) metal (iron, cobalt, nickel, copper, zinc, palladium, platinum, or/and gold) and at least one electron transfer mediator (catalyst) from porphyrinogenic organometallic complexes (e.g., metalloporphyrins (chlorophylls, hemes, cytochromes) or metallocorrins (e.g., vitamin $B_{12}$), and optionally, includes vermiculite. System includes composite and in-situ or/and ex-situ unit containing the composite, enabling exposure of contaminated water thereto. Applicable to in-situ sub-surface permeable reactive barriers (PRBs). Treatable water contaminants are organics (halogenated organic compounds), or/and inorganics (metal elements, metal element containing inorganic species, nonmetal elements, and nonmetal element containing inorganic species). Applicable to non-aqueous fluids (liquids, vapors, gases), for removing contaminants therefrom.

46 Claims, 8 Drawing Sheets

U.S. PATENT DOCUMENTS

| | | | |
|---|---|---|---|
| 5,733,067 | A | 3/1998 | Hunt et al. |
| 6,303,367 | B1 | 10/2001 | Kataoka et al. |
| 6,828,141 | B2 | 12/2004 | Kataoka et al. |
| 2002/0006867 | A1 | 1/2002 | Ponder et al. |
| 2004/0133059 | A1 | 7/2004 | Scalzi et al. |

FOREIGN PATENT DOCUMENTS

| | | |
|---|---|---|
| RU | 2174961 C2 * | 10/2001 |
| WO | WO 2004/007379 | 1/2004 |

OTHER PUBLICATIONS

Majeda A.M. Khraisheh, Yahya S. Al-degs, Wendy A.M. Mcminn, Remediation of wastewater containing heavy metals using raw and modified diatomite, Chemical Engineering Journal, vol. 99, Issue 2, Jun. 15, 2004, pp. 177-184, ISSN 1385-8947, 10.1016/j.cej.2003.11. 029. (http://www.sciencedirect.com/science/article/pii/S1385894704000117).*

Perego et al. "Catalyst Preparation Methods", Catalysis Today, 34(Chap.3): 281-305, Feb. 28, 1997.

Scott "Industrial Waste Water and Effluent Treatment", Handbook of Industrial Membranes, 2nd Ed.: 575-629, 1998.

Tarasevich "Application of Natural Adsorbents and Adsorption-Active Materials Based Thereon in the Processes of Water Purification", Asorption and Its Applications in Industry and Environmental Protection, Studies in Surface Science and Catalysis, 120: 659-722, 1999. p. 659-673, 701-705.

International Preliminary Report on Patentability Dated Dec. 31, 2008 From the International Bureau of WIPO Re.: Application No. PCT/IL2006/000010.

Office Action Dated Apr. 27, 2011 From the Israel Patent Office Re. Application No. 184386 and Its Translation Into English.

Supplementary European Search Report and the European Search Opinion Dated Dec. 14, 2011 From the European Patent Office Re. Application No. 06700051.3.

Adriaens et al. "Dechlorination pf PCDD/F by Organic and Inorganic Electron Transfer Molecules in Reduced Environments", Chemosphere, XP055013020, 32(3): 433-441, Feb. 1, 1996.

Kim et al. "Reductive Dechlorination of PCE and TCE by Vitamin B12 and ZVMs", Environmental Technology, XP002664283, 23(10): 1135-1145, Oct. 2002. Abstract.

"Chromium, Hexavalent (Colorimetric)", Method 719A, CD-ROM, Revision 1, p. 1-6, 1992. http://www.epa.gov/epaoswer/hazwaste/test/pdfs/7196a.pdf.

Allen-King et al. "Reductive Transformation and Sorption of Cis- and Trans-1,2- Dichlorethene in a Metallic-Water System", Environmental Toxicology and Chemistry, 16(3): 424-429, 1997.

Assaf-Anid et al. "Reductive Dechlorination of Carbon Tetrachloride by Cobalamin(ii) in the Presence of Dithiothreitol: Mechanistic Study, Effect of Redox Potential and PH", Environmental Science & Technology, 28(4): 246-252, 1994.

Barwise et al. Diagenetic and Catagenetic Pathways for Porphyrins in Sediments, Organic Geochemistry, 6: 167-176, 1984.

Baxter "Reductive Dechlorination of Certain Chlorinated Organic Compounds by Reduced Hematin Compared With Their Behaviour in the Environment", Chemosphere, 21: 451-458, 1990.

Burris et al. "Kinetics of Tetrachloroethylene-Reductive Dechlorination Catalyzed by Vitamin B12", Environmental Toxicology and Chemistry, 17(9): 1681-1688, 1998.

Burris et al. "Reductive Dechlorination of Terachloroethylene and Trichloroethylene Catalyzed by Vitamin B12 in Homogeneous and Heterogeneous Systems", Environmental Science & Technology, 30(10): 3047-3052, 1996.

Burris et al. "Sorption of Trichloroethylene and Tetrachloroethylene in a Batch Reactive Metallic Iron-Water System", Environmental Science & Technology, 29(11): 2850-2855, 1995.

Campbell et al. "Trichloroethylene and Tetrachloroethylene Reduction in a Metallic Iron-Water-Vapor Batch System", Environmental Toxicology and Chemistry, 16(4): 625-630, 1997.

Chiu et al. "Metallocoenzyme-Mediated Reductive Transformation of Carbon Tetrachloride in Titanium(III) Citrate Aqueous Solution", Environmental Science & Technology, 29(3): 595-603, 1995.

Curtis et al. "Reductive Dehalogenation of Hexachloroethane, Carbon Tetrachloride, and Bromoform by Anthrahydroquinone Disulfonate and Humic Acid", Environmental Science & Technology, 28(13): 2393-2401, 1994.

Dunnivant et al. "Reduction of Substituted Nitrobenzenes in Aqueous Solutions Containing Natural Organic Matter", Environmental Science & Technology, 26(11): 2133-2141, 1992.

Gantzer et al. "Reductive Dechlorination Catalyzed by Bacterial Transition-Metal Coenzymes", Environmental Science & Technology, 25(4): 715-722, 1991.

Garant et al. "Applicability of Competitive and Noncompetitive Kinetics to the Reductive Dechlorination of Chlorinated Ethenes", Biotechnology and Bioengineering, 57: 751-755, 1998.

Garrison et al. "Phytodegration of P,P'-DDT and the Enantiomers of O,P'-DDT", Environmental Science & Technology, 34(9): 1663-1670, 2000.

Glod et al. "Cobalamin-Mediated Reduction of Cis- and Trans-Dichloroethene, 1,1-Dichloroethene, and Vinyl Chloride in Homogeneous Aqueous Solution: Reaction Kinetics and Mechanistic Considerations", Environmental Science & Technology, 31(11): 3154-3160, 1997.

Habeck et al. "Reductive Dechlorination of Tetrachloroethylene (PCE) Catalyzed by Cyanocobalamin", Applied Biochemistry and Biotechnology, 51/52: 747-759, 1995.

Harradine et al. "Pyrophaeoporphyrins C 1 and C2: Grazing Products of Chlorophyll C in Aquatic Environments", Organic Geochemistry, 28(1-2): 111-117, 1998.

Jeffers et al. "Green Plants: A Terrestrial Sink for Atmospheric CH3Br", Geophysical Research Letters, 25(1): 43-46, 1998.

Kim et al. "Dechlorination of Pentachlorophenol by Zero Valent Iron and Modified Zero Valent Irons", Environmental Science & Technology, 34(10): 2014-2017, 2000.

Klečka et al. "Reductive Dechlorination of Chlorinated Methanes and Ethanes by Reduced Iron (II) Porphyrins", Chemosphere, 13(3): 391-402, 1984.

Krone et al. "Coenzyme F430 as a Possible Catalyst for the Reductive Dehalogenation of Chlorinated C1-Hydrocarbons in Methanogenic Bacteria", Biochemistry, 28: 10061-10065, 1989.

Krone et al. "Reductive Dehalogenation of Chlorinated C1-Hydrocarbons Mediated by Corrinoids", Biochemistry, 28: 4908-4914, 1989.

Lesage et al. "A Different Mechanism for the Reductive Dechlorination of Chlorinated Ethenes: Kinetic and Spectroscopic Evidence", Environmental Science & Technology, 32(15): 2264-2272, 1998.

Lewis et al. "Comparative Product Analysis of Carbon Tetrachloride Dehalogenation Catalyzed by Cobalt Corrins in the Presence of Thiol or Titanium(III) Reducing Agents", Environmental Science & Technology, 30: 292-300, 1996.

Lewis et al. "Reductive Dechlorination of Carbon Tetrachloride Mediated by Cationic Water-Soluble Metalloporphyrins", Journal of Environmental Quality, 24: 56-61, 1995.

Mackay et al. "Groundwater Contamination: Pump-and Treat Remediation", Environmental Science & Technology, 23(6): 630-636, 1989.

Marks et al. "Dehalogenation of Lindane by a Variety of Porphyrins and Corrins", Applied and Environmental Microbiology, 55(5): 1258-1261, 1989.

Marks et al. "The Use of Immobilized Porphyrins and Corrins to Dehalogenate Organochlorine Pollutants", Applied Microbiology and Biotechnology, 38: 413-416, 1992.

Matheson et al. "Reductive Dehalogenation of Chlorinated Methanes by Iron Metal", Environmental Science & Technology, 28(12): 2045-2053, 1994.

Natarajan et al. "Dechlorination of Polychlorinated Biphenyl Congeners by an Anaerobic Microbial Consortium", Applied Microbiology and Biotechnology, 46: 673-677, 1996.

Newman et al. "Uptake and Biotransformation of Trichloroethylene by Hybrid Poplars", Environmental Science & Technology, 31(4): 1062-1067, 1997.

Nzengung et al. "Use of Aquatic Plants and Algae for Decontamination of Waters Polluted With Chlorinated Alkanes", International Journal of Phytoremediation, 1(3): 203-226, 1999.

O'Loughlin et al. "Reductive Dechlorination of Trichloroethene Mediated by Humic-Metal Complexes", Environmental Science & Technology, 33(7): 1145-1147, 1999.

Orth et al. "Dechlorination of Trichloroethene in Aqueous Solution Using $Fe^{\circ}$", Environmental Science & Technology, 30(1): 66-71, 1996.

Perlinger et al. "Iron Porphyrin and Mercaptojuglone Mediated Reduction of Polyhalogenated Methanes and Ethanes in Homogeneous Aqueous Solution", Environmental Science & Technology, 32(16): 2431-2437, 1998.

Pon et al. "Acetylene Inhibition of Trichloroethylene and Vinyl Chloride Reductive Dechlorination", Environmental Science & Technology, 37: 3181-3188, 2003.

Quirke et al. "The Degradation of DDT and Its Degradative Products by Reduced Iron (III) Porphyrins and Ammonia", Chemosphere, 3: 151-155, 1979.

Roberts et al. "Reductive Elimination of Chlorinated Ethylenes by Zero-Valent Metals", Environmental Science & Technology, 30(8): 2654-2659, 1996.

Rodriguez et al. "Wet Peroxide Degradation of Atrazine", Chemosphere, 54: 71-78, 2004.

Schanke et al. "Environmental Reductive Elimination Reactions of Polychlorinated Ethanes Mimicked by Transition-Metal Coenzymes", Environmental Science & Technology, 26(4): 830-833, 1992.

Schnoor et al. "Phytoremediation of Organic and Nutrient Contaminants. Pilot and Full-Scale Studies Are Demonstrating the Promise and Limitations of Using Vegetation for Remediating Hazardous Wastes in Soils and Sediments", Environmental Science & Technology, 29 (7): 318A-323A, 1995.

Smith et al. "Comparison of Reactors for Oxygen-Sensitive Reactions: Reductive Dechlorination of Chlorophenols by Vitamin B12s", Applied and Environmental Microbiology, 60(11): 4107-4110, 1994.

Su et al. "Kinetics of Trichloroethene Reduction by Zerovalent Iron and Tin: Pretreatment Effect, Apparent Activation Energy, and Intermediate Products", Environmental Science & Technology, 33(1): 163-168, 1999.

Ukrainczyk et al. "Reductive Dechlorination of Carbon Tetrachloride in Water Catalyzed by Mineral-Supported Biomimetic Cobalt Macrocycles", Environmental Science & Technology, 29: 439-445, 1995.

Wade et al. "Oxidation of Iron(II) Porphyrins by Alkyl Halides", Journal of the American Chemical Society, 95(1): 226-230, 1973.

Warburg et al. "Notiz über Spirographishämin", Biochemische Zeitschrift, 244: 239-242, 1932.

Woods et al. "Polychlorinated Biphenyl Reductive Dechlorination by Vitamin B 12s: Thermodynamics and Regiospecificity", Environmental Science & Technology, 33(6): 857-863, 1999.

Zoro et al. "Degradation of P,P'-DDT in Reducing Environments", Nature, 247: 235-236, 1974.

* cited by examiner

US 8,366,940 B2

ZERO VALENT METAL COMPOSITE, MANUFACTURING, SYSTEM AND METHOD USING THEREOF, FOR CATALYTICALLY TREATING CONTAMINATED WATER

RELATED APPLICATIONS

This Application is a National Phase of PCT Patent Application No. PCT/IL2006/000010 having International Filing Date of Jan. 3, 2006, which claims the benefit of U.S. Provisional Patent Application No. 60/640,214 filed on Jan. 3, 2005. The contents of the above Applications are all incorporated herein by reference.

FIELD AND BACKGROUND OF THE INVENTION

The present invention relates to a zero valent metal composite, a method for manufacturing thereof, a method using thereof, a system including thereof, and an article-of-manufacture including thereof. The zero valent metal composite is used for (in-situ or ex-situ) catalytically treating contaminated water. The present invention is generally applicable to (in-situ or ex-situ) catalytically treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants. The present invention is particularly applicable to (in-situ or ex-situ) catalytically treating such forms of contaminated water wherein the water contaminants are organic species, for example, halogenated organic compounds and halogen containing degradation products thereof; inorganic species, for example, metal elements, metal element containing inorganic species, nonmetal elements, and nonmetal element containing inorganic species; or any combination thereof. The present invention is also applicable to (in-situ or ex-situ) catalytically treating contaminated non-aqueous fluids (in liquid, vapor, or/and gaseous forms), for decreasing contaminant concentrations therefrom.

Herein, in the context of the field and art of the present invention, it is to be fully understood that the terms 'contaminated' and 'polluted' are synonymous and equivalent to each other, and, for consistency, the term 'contaminated' is generally used. Accordingly, the phrases 'contaminated water' and 'polluted water' are synonymous and equivalent to each other, and, for consistency, the term 'contaminated water' is generally used. Additionally, herein, it is to be fully understood that the terms 'contaminant(s)' and 'pollutant(s)' are synonymous and equivalent to each other, and, for consistency, the term 'contaminant(s)' is generally used.

Contaminated Water, and Forms Thereof:

In general, in the context of the field and art of the present invention, contaminated water can be any of a variety of numerous different forms. Exemplary general forms of contaminated water, which are particularly relevant to the field and art of the present invention, are sub-surface water, surface water, above-surface water, water vapor, gaseous water, and combinations thereof, which contain chemical contaminants.

Sub-surface water is to be understood as generally being water which is 'entirely' located below or beneath the ground or earth. Exemplary specific forms of sub-surface water, which are particularly relevant to the field and art of the present invention, are, typically naturally existing, but possibly human made or/and formed, ground water (i.e., water found underground beneath the earth's surface within partially or fully saturated soil or/and porous rock), water of an aquifer (i.e., a water-bearing rock or rock formation, or an underground layer of porous rock, sand, etc., containing water), wells or springs (i.e., flows of water from the ground or earth), rivers, streams, lakes, ponds, pools, or sub-surface water reservoirs, which are entirely located below or beneath the ground or earth. Additional exemplary specific forms of sub-surface water, which are also relevant to the field and art of the present invention, are water that is, or/and may be, present or contained in human made (commercial size) large volume water receiver, collection, or/and storage, vessels, containers, reservoirs, or chambers, which are entirely located below or beneath the ground or earth.

Surface water is to be understood as generally being water whose top or uppermost surface is located at about ground or earth level. Typically, but not necessarily, the top or uppermost surface of surface water is exposed to air or the atmosphere under the sky (i.e., not beneath or below the ground). Exemplary specific forms of surface water, which are particularly relevant to the field and art of the present invention, are, typically naturally existing, but possibly human made or/and formed, rivers, streams, lakes, ponds, pools, surface water reservoirs, or, wells or springs, each of whose top or uppermost surface is located at about ground or earth level. Additional exemplary specific forms of surface water, which are also relevant to the field and art of the present invention, are water that is, or/and may be, present or contained in human made (commercial size) large volume water receiver, collection, or/and storage, vessels, containers, reservoirs, or chambers, which are located at about ground or earth level.

Above-surface water is to be understood as generally being water whose top or uppermost surface is located above ground or earth level. Exemplary specific forms of above-surface water, which are particularly relevant to the field and art of the present invention, are, typically human made or/and formed, but possibly naturally existing, above-surface water reservoirs, or, above-surface sources or supplies of residential or commercial drinking, each of whose top or uppermost surface is located above ground level. Additional exemplary specific forms of above-surface water, which are also relevant to the field and art of the present invention, are water that is, or/and may be, present or contained in human made (commercial size) large volume water receiver, collection, or/and storage, vessels, containers, reservoirs, or chambers, which are located above ground or earth level.

Water vapor is to be understood as generally being water existing as a vapor, i.e., as a barely visible or cloudy diffused form of water, such as water mist, water fumes, or steam, suspended in air. Gaseous water is to be understood as generally being water existing in the gas phase. Such water vapor or/and gaseous water exists as either a pure vapor or/and gas of water, or as part of a vapor or/and gas mixture which also includes other vapor or/and gaseous species.

In a non-limiting manner, in the context of the field and art of the present invention, it is to be understood that the contaminated water can be of a form corresponding to a combination of any two or more of the above stated exemplary general forms of water, i.e., sub-surface water, surface water, above-surface water, water vapor, and gaseous water, and exemplary specific forms thereof, which contain chemical contaminants.

In general, in the context of the field and art of the present invention, any of the preceding described forms of contaminated water, in addition to the undesirable chemical contaminants, may contain, typically naturally existing, but possibly human made or/and formed, ground or earth types or kinds of geological matter. Exemplary specific ground or earth types or kinds of geological matter, which are particularly relevant to the field and art of the present invention, are soil, sand, rocks, stones, pebbles (i.e., small rocks or stones), sediment (i.e., matter deposited by water or wind), fragments thereof, or any combination thereof (e.g., gravel, being an unconsolidated combination (mixture) of rock fragments or pebbles).

Such ground or earth types or kinds of geological matter are typically present in the immediate environment or ecosystem surrounding or encompassing sub-surface and surface forms of water. In fact, by definition, each of the various different forms of sub-surface water, for example, ground water (i.e., water found underground beneath the earth's surface within partially or fully saturated soil or/and porous rock), water of an aquifer (i.e., a water-bearing rock or rock formation, or an underground layer of porous rock, sand, etc., containing water), wells or springs (i.e., flows of water from the ground or earth), rivers, streams, lakes, ponds, pools, or sub-surface water reservoirs, which are entirely located below or beneath the ground or earth, are surrounded or encompassed by immediate environments or ecosystems within which are present the above stated ground or earth types or kinds of geological matter.

Similarly, by definition, each of the various different forms of surface water, for example, rivers, streams, lakes, ponds, pools, surface water reservoirs, or, wells or springs, each of whose top or uppermost surface is located at about ground or earth level, are surrounded or encompassed by immediate environments or ecosystems within which are present the above stated ground or earth types or kinds of geological matter.

Types or Kinds of Water Contaminants:

In the context of the field and art of the present invention, a water contaminant is to be understood as generally being a chemical specie (atom, ion, radical, molecule) that is proven or known, or suspected, as being hazardous (poisonous or toxic), or potentially hazardous, to a human or animal subject. Accordingly, in the context of the field and art of the present invention, the phrase 'contaminated water' is to be understood as generally being water which contains or includes at least one chemical specie (atom, ion, radical, molecule) that is/are proven or known, or suspected, as being hazardous (poisonous or toxic), or potentially hazardous, to a human or animal subject.

In general, in the context of the field and art of the present invention, any of the above described forms of contaminated water may contain any number of a wide variety of different types or kinds, and forms, of contaminants. In general, water contaminants can be characterized as being composed of organic (carbon containing) species (atoms, ions, radicals, molecules), inorganic species (atoms, ions, radicals, molecules), or any combination thereof.

In a non-limiting manner, exemplary specific types or kinds of water contaminants composed of organic species, which are particularly relevant to the field and art of the present invention, are aromatic organic compounds (i.e., aromatic hydrocarbons, or arenes), and non-aromatic organic compounds (i.e., non-aromatic hydrocarbons, aliphatic hydrocarbons (alkanes), or conjugated hydrocarbons (alkenes, alkynes). An aromatic organic compound (aromatic hydrocarbon, or arene) type or kind of water contaminant may contain at least one halogen atom (i.e., fluorine [F], chlorine [Cl], bromine [Br], or/and iodine [I]). Similarly, a non-aromatic organic compound (non-aromatic hydrocarbon, aliphatic hydrocarbon, or conjugated hydrocarbon) type or kind of water contaminant may contain at least one halogen atom (i.e., fluorine [F], chlorine [Cl], bromine [Br], or/and iodine [I]). Accordingly, any such halogen containing aromatic organic compound or halogen containing non-aromatic organic compound may be mono-halogenated or poly-halogenated. Such halogen containing aromatic organic compounds and halogen containing non-aromatic organic compounds are generally referred to as halogen containing organic compounds, or, synonymously and equivalently, as halogenated organic compounds. Moreover, an aromatic organic compound or non-aromatic organic compound type or kind of water contaminant may contain at least one heteroatom (e.g., nitrogen [N], oxygen [O], sulfur [S], or/and phosphorous [P]).

In a non-limiting manner, exemplary specific types or kinds of halogenated organic compound water contaminants which are especially relevant to the field and art of the present invention, are methylene chloride, chloroform, carbon tetrachloride, trichloroethane, di-, tri-, and tetra-chloroethylenes, polychlorinated biphenyls, tribromoneopentlyalcohol (TB-NPA), and halogen containing degradation products thereof.

In a non-limiting manner, exemplary specific types or kinds of water contaminants composed of inorganic species, which are particularly relevant to the field and art of the present invention, are metal elements, metal element containing inorganic species, nonmetal elements, and nonmetal element containing inorganic species.

Exemplary metal elements are transition metal elements, inner transition metal elements, and non-transition metal elements. Exemplary transition metal elements are zinc [Zn], cadmium [Cd], chromium [Cr], manganese [Mn], molybdenum [Mo], vanadium [V], iron [Fe], cobalt [Co], nickel [Ni], copper [Cu], silver [Ag], tungsten [W], and technetium [Tc]. Exemplary inner transition metal elements are uranium [U], plutonium [Pu], cesium [Cs]. Exemplary non-transition metal elements are lead [Pb], tin [Sn], antimony [Sb], aluminum [Al], strontium [Sr], and radium [Ra]. In general, any of the above metal elements is in a neutral (elemental, or zero valent) form, or in a charged (cationic) form. Moreover, any of the above metal elements may be a radionuclide, such as technetium-99 [Tc-99], cesium-137 [Cs-137], strontium-90 [Sr-90], and radium-226 [Ra-226].

Exemplary nonmetal elements are arsenic [As], and selenium [Se]. In general, the nonmetal element is in a neutral (elemental, or zero valent) form, or in a charged (cationic) form.

Exemplary nonmetal element containing inorganic species are oxygen containing inorganic species. Exemplary oxygen containing inorganic species are oxygen containing ions (also known as oxyions, or as oxo-anions). Exemplary oxygen containing ions are borate ions, nitrate ions, sulfate ions, phosphate ions, halogenate ions (i.e., containing a halogen), and metal oxide ions.

On-going Problem of Water Contaminated with Halogenated Organic Compounds:

Among the wide variety of the above described different types or kinds of water contaminants, halogenated (especially, chlorinated) organic compounds are arguably the most common, pervasive (widespread), persistent (e.g., having half-lives ranging from days to 10,000 years), proven or potentially hazardous (poisonous or toxic), undesirable contaminants in various forms of water, such as sub-surface water, surface water, above-surface water, water vapor, gaseous water, and combinations thereof, which contain contaminants. Many such forms of water are, or/and come in direct contact with, or/and lead to, sources of drinking water. Currently, numerous halogenated (especially, chlorinated) organic compounds are still being applied in large quantities on large scales, in a wide variety of different agricultural and other industrial processes, by exploiting their high performance, in addition to their relatively high stability and resistance to chemical and biological degradation. It is now recognized that these properties, which are essential to agriculture and other industries, have devastating effects on the environment, translating to undesirable short and long term health problems.

The fate of anthropogenic (human originating or synthesized) halogenated organic compound contaminants in the environment is of great concern because of their proven or potential proven or potentially hazardous (poisonous or toxic) properties and characteristics. Discharge of these compounds into sub-surface, surface, or/and above-surface, water containing environments has led to extensive water contamination. Largely based on the fact that sub-surface water (for example, ground water, water of an aquifer, wells or springs, rivers, streams, lakes, ponds, pools, or sub-surface water reservoirs, which are entirely located below or beneath the ground or earth) account for about 95% of the earth's usable fresh water resources, sub-surface water contamination is particularly a critical issue. Intensive efforts are continuously being invested in the development of improved and new technologies for treating or remediating sub-surface water, surface water, or/and above-surface water, contaminated with halogenated organic compounds.

Carbon tetrachloride (CT) is an exemplary widespread water contaminant, used mostly in the production of refrigeration fluids and propellants, and has the potential to cause cancer after long-term exposure to a maximum contaminant level (MCL), corresponding to a maximum allowable concentration, established by the Safe Drinking Act as being safe for human health and the environment, of 5 ppb. From 1987 to 1993, according to the Toxic Release Inventory of the US Environmental Protection Agency (US EPA), releases of CT to the environment totaled nearly 76,000 pounds. Perchloroethylene, in particular, tetrachloroethylene (PCE) and trichloroethylene (TCE) are solvents widely used for dry cleaning and metal degreasing, and can be found in household products. Their maximum contaminant level (MCL) is 5 ppb. Both PCE and TCE were found to have toxic effects on humans and are considered as potential carcinogenic substances. According to the US EPA Toxic Chemical Release Inventory, releases of PCE and TCE to land and water from 1987 to 1993 totaled over 1 million pounds, and about 300,000 pounds, respectively. PCE and TCE are present in at least 771 of 852 National Priority List sites identified by the US EPA. It has been shown [1] that 130 liters (about 0.6 drum) of the organic contaminants trichloroethane (TCA), 1,1-dichloroethylene (1,1 D CE), and Freon 113, were sufficient to pollute 5,000,000,000 liters of water in San Jose, Calif. Similarly, a release of 1500 liters (about 7 drums) of TCE, PCE, and detergents, contaminated 40,000,000,000 liters of water in Cape Cod, Mass.

In spite of proven and potential environmental and health hazards, many halogenated compounds, among the wide variety of different types of persistent water contaminants, currently remain in widespread international use, thereby perpetuating a continuously on-going problem. The main concern lies in the large quantities of persistent contaminants, and their degradation products, present in, or in close proximity to, forms of water which either are, or lead to, sources of water to which humans or/and animals are directly or indirectly exposed.

Current Techniques, and Limitations Thereof, for Treating or Remediating Contaminated Water:

Although not a technique per se for treating or remediating the above stated forms of contaminated water, the concept or principle of 'natural attenuation' is currently practiced for attempting to achieve or accomplish such treatment or remediation. 'Natural attenuation' (NA) generally refers to the natural occurrence or taking place of any number of various different physical, chemical, or/and biological types of natural phenomena, mechanisms, and processes, for example, involving degradation, transformation, conversion, sorption, among others, which under favorable conditions cause or lead to 'natural' reduction or attenuation of various quantifiable parameters or properties, such as mass, toxicity, mobility, volume, or/and concentration, of contaminants in contaminated water.

A main limitation of practicing natural attenuation (NA) is based on the fact that it essentially entirely depends upon 'naturally' reducing or attenuating the various quantifiable parameters or properties, such as mass, toxicity, mobility, volume, or/and concentration, of the water contaminants in the contaminated water. Meaningful natural attenuation can require time periods of on the order of years, thus accounting for the relatively long persistence of water contaminants in contaminated water.

In particular cases where the contaminated water is a form of sub-surface water, for example, ground water, water of an aquifer, well or spring, pond, pool, or sub-surface water reservoir, which is entirely located below or beneath the ground or earth, then, by practicing natural attenuation, long time periods of continuous underground water flow are often required for the various quantifiable parameters or properties of the water contaminants, and possible degradation products, to be sufficiently decreased or attenuated in the underground water. In contrast to river water, which has a turnover time on the order of two weeks, such forms of sub-surface water have residence times on the order of about 2 weeks to about 10,000 years. Additionally, the large horizontally or/and vertically extending, and heterogeneous, contaminant zones or regions (contaminant plumes) of underground water types of water contaminants tend to be very difficult to locate, detect, characterize, and treat or remediate.

Aside from the continued practice of 'natural attenuation', there exists a plethora of numerous different types of well known and used prior art techniques (methods, materials, compositions, devices, and systems) for treating or remediating contaminated water, where the contaminated water is a form of sub-surface water, surface water, above-surface water, water vapor, gaseous water, or any combination thereof. Each particular technique is primarily based on principles, phenomena, mechanisms, and processes, in one of the following main categories: (a) physical/physical chemical, (b) biological, or (c) chemical. A common ultimate objective of each water treatment or remediation technique is to in-situ or/and ex-situ eliminate, or at least decrease, concentrations of the hazardous (poisonous or toxic) or potentially hazardous water contaminants, and desirably, also, any of their degradation products, in the contaminated water.

The scope of the present invention encompasses treating contaminated water, wherein the contaminated water is, for example, a form of sub-surface water, surface water, above-surface water, water vapor, gaseous water, or any combination thereof. For the purpose of providing exemplary background, following are brief descriptions of the above categorized techniques, along with selected examples of prior art teachings thereof, for treating or remediating contaminated water.

(a) Physical/Physical Chemical Techniques for Treating or Remediating Contaminated Water:

Physical/physical chemical techniques for treating or remediating contaminated water are based on exploiting physical or physicochemical types of phenomena, mechanisms, and processes. Exemplary prior art physical/physical chemical techniques for treating or remediating contaminated water are: air stripping, and air sparging, whereby a forced flow of air is used for moving or transporting, and removing, water contaminants from contaminated water; filtration, whereby a filter medium or substrate is used for absorbing, adsorbing, and removing, water contaminants from contaminated water; and chemical destruction (without chemical reagents), whereby extreme conditions of temperature or/and pressure are used for breaking chemical bonds of water contaminants in contaminated water. In each technique, water contaminants are 'physically' or 'physicochemically' moved or transported, and removed, from contaminated water to another medium, such as air, or a filter, or are degraded, transformed, or/and converted, in the contaminated water to non-hazardous or/and less hazardous species.

Air stripping, as an exemplary physical/physical chemical technique for treating or remediating contaminated water, is based on physically transferring volatile water contaminants from contaminated water into air. Air stripping is considered a 'pump and treat' type of technique. Contaminated water is pumped into a tank containing packing material. The contaminated water trickles down through spaces between the packing material towards the bottom of the tank, while at the same time a fan operating at the bottom of the tank blows and forces air upward. Forced air upwardly passing through the contaminated water and between the packing material causes volatile water contaminants to evaporate out from the top of the tank, thereby removing the water contaminants from the contaminated water.

Air sparging, as another exemplary physical/physical chemical technique for treating or remediating contaminated water, is based on injecting air directly into contaminated water. Injected air passing through the contaminated water physically contacts and removes water contaminants from the contaminated water. The water contaminants become partitioned between the contaminated water and the passing air, according to Henry's law, and are subsequently moved or transported, and removed, from the contaminated water to another zone or region. For example, in the case of ground water, to a zone or region of soil unsaturated with contaminated water. As the water contaminants are driven or diffused to the unsaturated zone or region, a soil vapor extraction system is usually used to remove water contaminant vapors. The addition of oxygen to contaminated ground water and soils also enhances biodegradation, as the oxygen acts as a nutrient for bacteria.

Filtration, as another exemplary physical/physical chemical technique for treating or remediating contaminated water, is based on activated carbon filtration. Typically, a carbon filter is used for this technique. A typical activated carbon filter is made of tiny clusters of carbon atoms, in the bulk form of granular or powder sized particles derived from any number of various sources, creating a highly porous and active material with an extremely high surface area for contaminant adsorption. The contaminated water is exposed to the activated carbon filter, during which the water contaminants diffuse and are adsorbed by, and become concentrated on, the activated carbon, and are thereby removed from the contaminated water. After significant build up of the water contaminants on the activated carbon, the water contaminant containing de-activated carbon filter is removed from the contaminated water, and disposed of, or, flushed or otherwise treated (regenerated) to remove the water contaminants and re-activate the carbon for re-use.

Each of the above described air stripping, air sparging, and filtration, techniques has limitations for treating or remediating contaminated water. Air stripping and air sparging techniques are effective only for relatively large concentrations (over 100 ppm) of volatile contaminants. Both techniques merely move or transfer water contaminants from the contaminated water to the air, without degrading, transforming, or/and converting, the water contaminants to non-hazardous or/and less hazardous environmentally acceptable species. Similarly, a significant limitation of the filtration technique is that water contaminants are essentially only transferred from the contaminated water to the filter medium or substrate, without being degraded, transformed, or converted, to non-hazardous or/and less hazardous environmentally acceptable species. Additionally, implementation of this technique requires resources (manpower and equipment) for removing, and disposing of, or, regenerating, the de-activated filter medium or substrate which is contaminated with the water contaminants.

Chemical destruction (without chemical reagents), as another exemplary physical/physical chemical technique for treating or remediating contaminated water, is based on using machine generated extreme or destructive conditions of temperature or/and pressure, in the absence of destructive chemical reagents, for breaking chemical bonds of the water contaminants, for the objective of destroying the water contaminants. Destruction of the water contaminants may involve degrading, transforming, or/and converting, the water contaminants to non-hazardous or/and less hazardous species. Such a technique has been proposed [2] for degrading atrazine (being an exemplary halogenated organic compound) under high temperature (150-200° C.) and pressure (3.0-6.0 MPa).

A first significant limitation of using the technique of chemical destruction (without chemical reagents) for treating or remediating contaminated water is that the machine generated extreme conditions (typically, high temperatures or/and pressures) are relatively difficult and expensive to apply to large (areal or/and volumetric) scale forms of contaminated water. A second significant limitation of this technique is that use of the machine generated extreme conditions may be accompanied by undesirable consequences, such as partial or complete change of the immediate environment or ecosystem, and geological matter present therein, surrounding or encompassing the form of contaminated water being treated. This is particularly problematic if the form of contaminated water is surrounded or encompassed by a naturally existing environment or ecosystem.

(b) Biological Techniques for Treating or Remediating Contaminated Water:

Biological techniques for treating or remediating contaminated water are based on exploiting biological (microbiological) types of phenomena, mechanisms, and processes, involving the use of biological organisms (such as microbes, microorganisms, bacteria), for 'biologically' degrading, transforming, converting, or/and immobilizing, the water contaminants in the contaminated water to non-hazardous or/and less hazardous species.

It is well known that different types of biological microorganisms are effective for treating water contaminated with halogenated organic compounds. For example, anaerobic type microorganisms are known for being able to degrade, transform, or/and convert, a wide variety of halogenated organic compounds. Important advantages of using microorganisms are that the process of dehalogenation (especially, dechlorination) occurs in-situ, and the compounds are typically completely degraded, transformed, or/and converted, thereby precluding the need for using another method for degrading intermediate degradation products of the halogenated organic compounds. However, a significant limitation of using microbiological techniques for treating contaminated water is that, typically, they are strongly influenced, and may be inactivated, by changes in environmental conditions, such as pH, temperature, or/and nutrient supply, which take place during the water treatment, especially during long term water treatment.

Another significant limitation of using microbiological systems for treating water contaminated with halogenated organic compounds is that high contaminant concentrations can be poisonous or toxic to the contaminant degrading bacteria. For example, it has been shown [3] that during dechlorination of trichloroethylene (TCE) and vinyl chloride (VC), acetylene is an abiotically formed intermediate species which can inhibit the biotic transformation, conversion, or degradation, of the initial halogenated organic compound contaminants.

Origin and Main Processes of Sub-surface Water Contamination:

Any given prior art technique for treating or remediating contaminated water, in general, and contaminated sub-surface water, in particular (e.g., ground water, water of an aquifer, well or spring, pond, pool, or sub-surface water reservoir), contaminated with organic compound contaminants, typically has any number and types of advantages and disadvantages, depending upon the actual properties, parameters, characteristics, types and forms, and behavior, of the water contaminants, and of the sub-surface water. Before describing specific problems and limitations of current techniques which are particularly problematic, and difficult to overcome, for treating or remediating contaminated sub-surface water, in addition to those already described hereinabove, it is useful to first briefly describe the origin and main processes of sub-surface water contamination.

Following exposure of the ground or earth to chemical wastes (i.e., contaminants), particularly involving a wide variety of numerous different types or kinds of industrial or commercial processes, then, eventually, occurrence of any number and types or kinds of natural processes, such as formation of moisture (i.e., from the air or atmosphere), dew, rain, snow, or/and sleet, or/and, occurrence of human or/and machine generated processes, such as watering, or/and irrigating, among others, result in wetting the ground or earth (including the chemical wastes (contaminants) thereupon). Thereafter, the water soluble and mobile chemical wastes (contaminants), and possible initial degradation products thereof, become dissolved, transported, and, as a result of various diffusion, adsorption, desorption, and mass transfer processes, become heterogeneously distributed into, throughout, and among, various different horizontally or/and vertically extending zones or regions of the above stated types and forms of sub-surface water.

Such zones or regions of the different forms of sub-surface water begin at, and extend to, varying depths below or beneath the top or uppermost surface layer of the ground or earth. For example, such zones or regions of sub-surface water typically begin from a depth of about 5 centimeters, and can extend to a depth of about 2000 meters, below or beneath the top or uppermost surface layer of the ground or earth. In the particular case where the sub-surface water is a form of ground water, water of an aquifer, well or spring, pond, pool, or sub-surface water reservoir, then, dissolution, transport, and heterogeneous distribution, of the chemical contaminants may generate relatively large horizontally or/and vertically extending concentrated contaminant zones or regions, which are well known in the field and art as contaminant plumes (i.e., specific sub-surface water zones or regions concentrated with contaminants).

Limitations and Problems Particularly Relevant to Treating or Remediating Contaminated Sub-surface Water:

In particular cases where the contaminated water is a form of sub-surface water, for example, ground water, water of an aquifer, well or spring, pond, pool, or sub-surface water reservoir, which is entirely located below or beneath the ground or earth, then, there exist several limitations and problems particularly relevant to treating or remediating such contaminated sub-surface water. As stated hereinabove, practicing natural attenuation is often limited by requiring long time periods, for example, possibly up to 10,000 years, of continuous underground water flow for the various quantifiable parameters or properties of the water contaminants, and possible degradation products, to be sufficiently decreased or attenuated in the underground water. Additionally, large horizontally or/and vertically extending, and heterogeneous, concentrated contaminant zones or regions (contaminant plumes) of underground water types of water contaminants tend to be very difficult to locate, detect, characterize, and treat or remediate.

Another limitation and problem particularly relevant to treating or remediating contaminated sub-surface water concerns non-aqueous phase liquids (NAPLs), for example, trichloroethylene (TCE), tetrachloroethylene (PCE), and carbon tetrachloride (CT). During release to the ground or earth, followed by subsequent migration into sub-surface water, the total mass of each contaminant is distributed among various sub-surface phases by diffusion of liquids and vapors. Additionally, various adsorption or/and desorption processes involving the NAPLs take place throughout sub-surface ground or earth types of geological matter (e.g., soil, sand, rocks, stones, pebbles, sediment, or/and gravel), which are typically present in the immediate environment surrounding or encompassing the contaminated sub-surface water. Dissolution of NAPLs and subsequent transport of dissolved constituents by sub-surface water generate the above described large horizontally or/and vertically extending, and heterogeneous, concentrated contaminant zones or regions (contaminant plumes).

A similar limitation and problem particularly relevant to treating or remediating contaminated sub-surface water concerns dense non-aqueous phase liquids (DNAPLs), which, because of their relatively high density and low water solubility, sink through soil and water and follow topographic lows within the sub-surface water environment, displace the lower lying sub-surface water, and accumulate upon the underlying clay stratum in the form of concentrated contaminant zones or regions (contaminant plumes). Further, since most DNAPLs are sparingly soluble in water, they are adsorbed on to sub-surface ground or earth types of geological matter, particularly soil particles, producing tenacious underground plumes of dissolved organic contaminants which cannot be readily and permanently removed by standard 'pump and treat' technologies.

Such sub-surface concentrated contaminant zones or regions (contaminant plumes), and residuals thereof, eventually become primary sources of sub-surface water contamination. Under natural conditions, the time required for complete dissolution or degradation of DNAPLs can be hundreds of years. Not knowing the location, characteristics, and size, of DNAPL sub-surface concentrated contaminant zones or regions (contaminant plumes), make it practically impossible to predict how long a pump and treat system must operate in order to sufficiently treat or remediate the contaminated sub-surface water. Moreover, heterogeneous, such as perched, topographies of DNAPL sub-surface concentrated contaminant zones or regions (contaminant plumes), complicate sub-surface water site investigations. It is very easy to unknowingly drill through the concentrated contaminant zone or region (contaminant plume) and the bed it sits on, causing contaminated water in the concentrated contaminant zone or region to drain down through the drilled hole into a deeper part of the sub-surface water environment, or/and into a different sub-surface water zone or region and contaminate the sub-surface water contained therein.

(c) Chemical Techniques for Treating or Remediating Water Contaminated with Halogenated Organic Compounds:

Chemical techniques for treating or remediating water contaminated with halogenated organic compounds are based on exploiting non-catalytic chemical reaction, or (homogeneous or heterogeneous) catalytic chemical reaction, types of phenomena, mechanisms, and processes, involving the use of (inorganic or/and organic) chemical reagents, for 'chemically' degrading, transforming, or/and converting, the halogenated organic compound water contaminants in the contaminated water to non-hazardous or/and less hazardous species.

In a non-catalytic chemical reaction type of chemical technique, at least one of the chemical reagents is a main reactant which directly reacts (without a catalyst) with the halogenated organic compound contaminant(s) in a non-catalyzed chemical reaction, typically, a redox (reduction-oxidation) chemical reaction, for degrading, transforming, or/and converting, the halogenated organic compounds in the contaminated water to non-hazardous or/and less hazardous compounds. In a homogeneous or heterogeneous catalytic chemical reaction type of chemical technique, at least one of the chemical reagents is a participant, facilitator, or expediter, functioning as a homogeneous or heterogeneous catalyst in a homogeneous or heterogeneous catalytic chemical reaction, typically, a homogeneous or heterogeneous redox (reduction-oxidation) catalytic chemical reaction, involving the halogenated organic compound contaminant(s), for transforming, converting, or degrading, the halogenated organic compounds in the contaminated water.

Herein, for the purpose of clearly understanding, without ambiguity, the following presentation of prior art teachings, as well as of the subject matter of the present invention, a homogeneous catalytic chemical reaction is wherein the catalyst (particularly, e.g., an electron transfer mediator) is an initially solid (typically, particulate) substance that is non-supported, non-matrixed, non-intercalated, or/and non-trapped, by another material, and subsequently becomes freely mobile and soluble throughout the contaminated water. A heterogeneous catalytic chemical reaction is wherein the catalyst (particularly, e.g., an electron transfer mediator) is an initially solid (typically, particulate) substance that is supported, matrixed, intercalated, incorporated, or/and trapped, and generally immobile, on or/and inside of a (particulate or/and non-particulate) solid support or matrix material which subsequently becomes dispersed (i.e., not dissolved) throughout the contaminated water. Ordinarily, the initially immobilized catalyst similarly becomes dispersed (i.e., not dissolved) throughout the contaminated water, but, may at least partially dissolve in the contaminated water, depending upon actual parameters and conditions of a given heterogeneous catalytic chemical reaction system.

Chemical Destruction (with Chemical Reagents):

Chemical destruction (with chemical reagents), as an exemplary chemical technique for treating or remediating contaminated water, is based on using 'destructive' chemical reagents (e.g., strong chemical oxidizers), under existing conditions of temperature or/and pressure, or, alternatively, under machine generated extreme or destructive conditions of temperature or/and pressure, for breaking chemical bonds of the water contaminants, for the objective of destroying the water contaminants. Destruction of the water contaminants may involve degrading, transforming, or/and converting, the water contaminants to non-hazardous or/and less hazardous species.

A first significant limitation of using the technique of chemical destruction (with chemical reagents) for treating or remediating contaminated water is that use of the destructive chemicals can be difficult, potentially hazardous, and expensive, to apply to large (areal or/and volumetric) scale forms of contaminated water. A second significant limitation of this technique is that the types or kinds of destructive chemicals which are required for being sufficiently effective in destroying the water contaminants are usually non-specific, whereby their use may be accompanied by undesirable consequences, such as partial or complete change of the immediate environment or ecosystem, and geological matter present therein, surrounding or encompassing the form of contaminated water being treated. This is particularly problematic if the form of contaminated water is surrounded or encompassed by a naturally existing environment or ecosystem. For example, the destructive chemical reagents used for degrading, transforming, or/and converting, the water contaminants to non-hazardous or/and less hazardous species, may themselves be hazardous or/and potentially hazardous, or/and may introduce hazardous or/and potentially hazardous conditions, in the immediate environment or ecosystem, and geological matter present therein, surrounding or encompassing the form of contaminated water being treated.

Reductive Dehalogenation:

Currently, most chemical techniques used for treating or remediating water contaminated with halogenated organic compounds are based on reductive dehalogenation (typically, dechlorination) types of non-catalytic or (homogeneous or heterogeneous) catalytic, redox chemical reactions, phenomena, mechanisms, and processes, involving the use of (organic or/and inorganic) chemical reagents, for 'chemically' dehalogenating (dechlorinating) the halogenated organic compounds in the contaminated water. In general, reductive dehalogenation involves transfer of a number of electrons ($ne^-$), either in the absence or presence of a catalyst (such as an electron transfer mediator type catalyst), from a bulk electron donor or reducing agent (being any of a wide variety and combinations of numerous possible organic or/and inorganic chemicals (for example, naturally existing in, originating from, or synthetically derived from, mineral matter, plant matter, or biological matter)), to an electron acceptor, being the halogenated (typically, chlorinated) organic compound contaminant ([R—X]; X=halogen, typically, chlorine [Cl]). The reductive dehalogenation chemical reaction is a form of (non-catalytic or catalytic) hydrogenolysis whose general scheme (without or with a catalyst) is indicated by chemical equation (1), wherein $Y^+$ is a proton [$H^+$] or any other positively charged atom or moiety:

$$R—X + ne^- + Y^+ \rightarrow R—Y + X^- \tag{1}$$

Phytochemical Reductive Dehalogenation For Treating or Remediating (Phytoremediating) Water Contaminated with Halogenated Organic Compounds:

A first exemplary type of reductive dehalogenation for treating or remediating water contaminated with halogenated organic compounds is based on phytochemistry (plant chemistry). Phytochemical types of reductive dehalogenation (typically, dechlorination) non-catalytic or catalytic redox chemical reactions, involving the use of aquatic or terrestrial plants or plant derived chemicals as the bulk electron donors or reducing agents, for 'phytochemically' dehalogenating (dechlorinating) or 'phytodegrading' various different kinds of halogenated organic compounds in contaminated or polluted water, have been well studied [e.g., 4-8].

Zero Valent Metal (ZVM) Reductive Dehalogenation for Treating or Remediating Water Contaminated with Halogenated Organic Compounds:

A second exemplary type of reductive dehalogenation for treating or remediating water contaminated with halogenated organic compounds is based on the use of elemental metal or a zero valent metal (ZVM). The zero valent metal (ZVM) reductive dehalogenation (typically, dechlorination) technique is generally based on exposing water contaminated with halogenated organic compounds to a bulk quantity of granular or/and powdered elemental metal particles in the metallic or zero valent state, during which the contaminants are degraded, transformed, or/and converted, to non-hazardous or/and less hazardous species, or/and are immobilized on the surface of the metal particles, for example, by adsorption or/and precipitation processes. Typically, exposing the contaminated water to the zero valent metal particles is performed in a manner, for example, under reducing (anaerobic or anoxic) conditions, such that only contaminant species in the contaminated water, and not non-contaminant species (such as oxygen gas) in the contaminated water or/and in the immediate vicinity of the contaminated water, are reduced by the zero valent metal particles.

The general mechanism of zero valent metal (ZVM) reductive dehalogenation involves a two-electron transfer which occurs either directly on the metal surface, or/and through some intermediary (catalyst), in particular, depending upon the absence or presence of a catalyst, from the bulk electron donor or reducing agent (which becomes oxidized), to the halogenated organic compound contaminant ([R—X]; X=halogen, typically, chlorine [Cl]) as the electron acceptor, thereby reducing the halogenated organic compound contaminant, for example, to a reduced form [R—H], as generally indicated by chemical equation (2), wherein $Y^+$ is a proton [$H^+$] or any other positively charged atom or moiety:

$$R-X+M^0+Y^+ \rightarrow M^{2+}+R-Y+X^- \quad (2)$$

Although different elemental or zero valent metals, for example, iron [$Fe^0$], cobalt [$Co^0$], nickel [$Ni^0$], copper [$Cu^0$], and zinc [$Zn^0$], are applicable, zero valent iron [$Fe^0$] (ZVI) is most commonly used for implementing the ZVM technique. The zero valent metal reductive dehalogenation process has been known for years, however, only during the past decade has the use of ZVM, in general, and ZVI, in particular, become accepted as one of the most effective means of sub-surface water (e.g., ground water, aquifer water) remediation. ZVI particles are relatively inexpensive, and reasonably effective for in-situ or ex-situ catalytically reducing concentrations of a wide variety of different types of water contaminants, such as organic species, for example, halogenated organic compounds and halogen containing degradation products thereof, and inorganic species, for example, metal elements, metal element containing inorganic species, and oxygen containing inorganic species (e.g., oxygen containing ions (oxyions, or oxo-anions), such as borate ions, nitrate ions, sulfate ions, phosphate ions, halogenate ions (i.e., containing a halogen), and metal oxide ions).

In particular cases where the contaminated water is a form of sub-surface water, for example, ground water, water of an aquifer, well or spring, pond, pool, or sub-surface water reservoir, then, in actual field applications, the ZVM technique is typically implemented by placing a bulk quantity of granular or/and powdered zero valent metal (ZVM) particles, alone or with other reactive or/and inactive materials, in a sub-surface permeable reactive barrier (PRB). A sub-surface permeable reactive barrier (PRB) is a closed or open structure or configuration, such as a filled in trench, wall, or well, or a system of several closed or/and open structures or configurations, that provides passive interception and in-situ treatment of contaminated sub-surface water (e.g., ground water, aquifer water). A sub-surface permeable reactive barrier is characterized by having a permeable zone containing or creating a reactive treatment area, including a highly reactive material, for example, ZVM particles, and optionally, also including a less reactive, an inactive, or/and a non-reactive material, oriented to intercept and remediate or purify a sub-surface water (e.g., ground water, aquifer water) contaminant plume (i.e., a specific sub-surface region or zone concentrated with contaminants), by direct exposure of the water contaminants to the reactive material.

Ideally, a sub-surface permeable reactive barrier provides a preferential flow path of the contaminated sub-surface water (e.g., ground water, aquifer water) through the reactive material, and the other possibly present materials, and degrades, transforms, or/and converts, the water contaminants into environmentally acceptable (non-hazardous or/and less hazardous) species which exit the barrier, while minimally disrupting natural flow of the sub-surface water (e.g., ground water, aquifer water). Typically, the contaminated sub-surface water (e.g., ground water, aquifer water) flows by natural flow (pressure or current) gradients through the sub-surface PRB, however, pumping schemes configured upstream, within, or/and downstream, the sub-surface PRB, can also be used for implementing a sub-surface PRB setup. A sub-surface PRB can be installed as a permanent or semi-permanent closed or open structure or configuration spanning along or/and across the flow path of a sub-surface water contaminant plume. Alternatively, a sub-surface PRB can be installed as a construction or configuration as part of an in-situ reactor which is readily accessible to facilitate the removal or/and replacement of the spent (deactivated) reactive zero valent metal material, and the other possibly present materials.

There are extensive prior art teachings [e.g., 9-16] about the ZVM technique, typically involving use of zero valent iron (ZVI) in non-catalytic reaction systems, for non-catalytically reductively dechlorinating chlorinated organic solvents, such as carbon tetrachloride (CT) [$C(Cl)_4$], dichloroethylene (dichloroethene) (DCE) [$C_2H_2Cl_2$], trichloroethylene (trichloroethene) (TCE) [$C_2HCl_3$], perchloroethylene (PCE) (tetrachloroethylene, tetrachloroethene) [$C_2Cl_4$], among many others, which are of significant environmental concern.

Electron Transfer Mediators as Catalysts of Reductive Dehalogenation Reactions:

An active area in the field of environmental science and technology, focusing on treating or remediating water contaminated or polluted with halogenated organic compounds, concerns the use of electron transfer mediators for (homogeneously or heterogeneously) catalyzing reductive dehalogenation (typically, dechlorination) of halogenated organic compounds under reducing (typically, anaerobic or anoxic) conditions.

Electron transfer mediators are chemical substances, functioning as catalysts or co-catalysts, which are catalytically active, and expedite (catalyze) redox (reduction-oxidation) types of chemical reactions, such as reductive dehalogenation, by participating in, mediating, and expediting, the transfer of electrons from a bulk electron donor or reducing agent to an electron acceptor, or/and by stabilizing intermediate forms of the redox reactants. An electron transfer mediator which specifically functions by participating in, mediating, and expediting, the transfer of electrons from a bulk electron donor or reducing agent to an electron acceptor is also known as an electron carrier or as an electron shuttle, since electrons are carried and shuttled by such a chemical species.

Based on the above described general mechanism of reductive dehalogenation, along with reference to chemical equation (1), the general mechanism of an electron shuttle type of reductive dehalogenation system which includes an electron transfer mediator type catalyst is as follows. Under reducing conditions, in the presence of an electron transfer mediator type catalyst, the bulk electron donor or reducing agent transfers the electrons (ne$^-$) to an electron transfer mediator molecule, which becomes reduced, during which the bulk electron donor or reducing agent becomes oxidized. The reduced electron transfer mediator molecule then carries (shuttles) and transfers the electrons to a halogenated organic compound contaminant [R—X] electron acceptor, which becomes reduced [R—Y], during which the electron transfer mediator molecule becomes oxidized. The oxidized electron transfer mediator molecule is then reduced again by the bulk electron donor or reducing agent, thus enabling the electron transfer mediated catalytic reductive dehalogenation cycle to repeat.

Numerous laboratory studies [e.g., 17-22] have shown that reductive degradation, transformation, or/and conversion, of certain relatively oxidized organic compounds (such as halogenated organic compounds) can be expedited (i.e., catalyzed) by use of electron transfer mediator type catalysts in electron shuttle systems.

In general, electron shuttle systems involve the use of naturally occurring organic macrocycles complexed with transition metals, as electron transfer mediators, to carry and shuttle electrons from the bulk electron donor or reducing agent to the electron acceptor, thereby reductively degrading, transforming, or/and converting, the electron acceptor (halogenated organic compound). These relatively simple laboratory abiotic (but biomimetic) systems typically exhibit faster reaction rates relative to systems utilizing direct biological reduction reactions. Several naturally occurring biogeochemical substances, such as mineral substances, naturally occurring organic matter (NOM), bacterial transition metal coenzymes, and other biomimetic macrocycles, have been proposed and studied for use as electron transfer mediator type catalysts [e.g., 17, 20; 23-29].

Prior art also includes various teachings of such electron transfer mediated catalytic reductive dehalogenation reaction systems, where the electron transfer mediator type catalyst is a humic substance [e.g., 30-32]; a quinone [e.g., 33]; or a protein [e.g., 28].

Porphyrinogenic Organometallic Complexes (Electron Transfer Mediator Catalytic Functionality):

The term 'porphyrinogenic organometallic complex' refers to an organometallic complex formed between a neutral metal atom or a metal ion and a porphyrinogenic or porphyrinogenic-like ring system, and is further defined and exemplified hereinbelow in the Description of the present invention.

Metalloporphyrin complexes (commonly known and referred to as metalloporphyrins), being porphyrinogenic organometallic complexes of metal ions and porphyrin ligands, are organic tetrapyrrole macrocycles composed of four pyrrole type rings joined by methane (methylidene) bridges and complexed to a central metal ion. They form a near planar structure of aromatic macrocycles containing up to 22 conjugated π electrons, 18 of which are incorporated into the delocalization pathway in accordance with Huckel's [4n+2] rule of aromaticity. One or two of the peripheral double bonds of the porphyrin ligands of a metalloporphyrin can undergo an addition reaction to form a metalloporphyrin derivative, such as a metallocorrin or a metallochlorin type of porphyrinogenic organometallic complex.

There are extensive teachings [e.g., 34] about the origin, and the numerous physical, chemical, and biological, properties, characteristics, and behavior, of porphyrinogenic organometallic complexes, of which thousands have been identified and studied [e.g., 35, 36]. Exemplary well known metalloporphyrin complexes are chlorophylls, which are magnesium (II) complexes; hemes, which are iron (II) complexes; and cytochromes (e.g., cytochrome P450, and cytochrome P430) Vitamin $B_{12}$ (cyanocobalamin) a naturally occurring, or synthesized, metalloporphyrin-like complex of related structure and function, is a metallocorrin type of porphyrinogenic organometallic complex composed of a corrin ligand (a porphyrin analog in which some of the methylene bridges are substituted or/and absent) complexed to a cobalt (III) ion.

Porphyrinogenic organometallic complexes, such as metalloporphyrins, metalloporphyrin-like complexes, and their derivatives, exist in many biochemical environments, such as living cells, soils, sediments, bitumens, coal, oil shales, petroleum, and other types of naturally occurring deposits rich in organic matter [e.g., 37-39]. Porphyrinogenic organometallic complexes are well known for functioning as electron transfer mediators, and play an important role in various biochemical pathways, such as oxygen transport and storage (hemoglobin and myoglobin, respectively) and electron transfer in redox (reduction-oxidation) reactions (cytochromes).

Porphyrinogenic organometallic complexes exhibit several particular properties, characteristics, and behavior, which make them especially well applicable for functioning as electron transfer mediator type catalysts in homogeneous or heterogeneous electron transfer mediated catalytic reductive dehalogenation (typically, dechlorination) reaction systems, for catalyzing reductive dehalogenation of halogenated organic compound contaminants in water under reducing (anaerobic or anoxic) conditions. Porphyrinogenic organometallic complexes are: (1) effective redox catalysts for many reactions, and have a long range of redox activity; (2) electrochemically active with almost any core metal; (3) active catalysts in aqueous solution under conditions particularly pertinent to environments of various different forms of contaminated sub-surface water and surface water; and (4) relatively highly stable, thereby enabling reactions to take place under severe conditions, where other types of reactions probably would not take place.

Porphyrinogenic organometallic complexes, such as metalloporphyrins and metalloporphyrin-like complexes, are well known for being used as electron transfer mediator type catalysts in homogeneous catalytic reduction processes. There are numerous prior art teachings [e.g., 17-22; 40-51] about electron transfer mediated homogeneous catalytic reductive dehalogenation (typically, dechlorination) reaction systems, involving the use of various different porphyrinogenic organometallic complexes as homogeneous electron transfer mediator type catalysts (i.e., an initially solid (typically, particulate) substance that is non-supported, non-matrixed, non-intercalated, or/and non-trapped, by another material, and subsequently becomes freely mobile and soluble throughout the contaminated water), for homogeneously catalyzing reductive dehalogenation of halogenated organic compounds, such as halogenated organic solvents or other non-herbicide type halogenated organic compounds, particularly those which are known problematic contaminants or pollutants in water. In the above cited prior art, halogenated (chlorinated) organic compounds most extensively and frequently studied are: chlorinated methanes, chlorinated ethanes, chlorinated ethylenes (ethenes), chlorinated phenols (chlorophenols), and polychlorinated biphenyls (PCBs).

There are also prior art teachings [e.g., 8] of using hematin (reduced form of the porphyrin heme), or the metalloporphyrin hemoglobin, as an electron transfer mediator type catalyst, in the presence of dithionite (hydrosulfite) $[S_2O_4^{-2}]$ as a bulk electron donor or reducing agent, for homogeneous catalytic reductive dehalogenation (dechlorination) and degradation, in aqueous solutions, of various enantiomeric forms and analogs of the (bridged diphenyl) halogenated organic compound DDT (p,p'-DDT) (DichloroDiphenylTrichloroethane) $[C_{14}H_9Cl_5]$, historically well known as an extremely hazardous water contaminant.

Electron Transfer Mediators as Catalysts in Heterogeneous Composites, for Reductive Dehalogenation:

Studies have shown that porphyrinogenic organometallic complexes, such as metalloporphyrins, can be incorporated (via intercalation) and immobilized on or/and in layered minerals, or amorphous silica gel surfaces, for forming heterogeneous composites that can be used for heterogeneously catalyzing electron transfer mediated reactions. For example, heterogeneous composites composed of the cobalt metalloporphyrin, tetramethylpyridilporphyrin [5, 10, 15, 20-tetrakis(1-methyl-4-pyridinio)-porphine-cobalt] [TMPyP-Co], incorporated on or/and in silica gel and double-layered clays were used for heterogeneously catalyzing reductive dechlorination of carbon tetrachloride $[CCl_4]$ in water [52]. Prior art [e.g., 53] also includes teachings about incorporating and immobilizing metalloporphyrins on or/and in sepharose, sephadex, or polystyrene, types of solid support or matrix materials, for forming heterogeneous composites that can be used for heterogeneously catalyzing electron transfer mediated reductive dechlorination reactions.

Diatomite (Diatomaceous Earth, Kieselguhr):

Diatoms (bacillariophyceae) are microscopic, about 1 to 500 μm sized, unicellular algae found in both freshwater and marine environments. These single-celled plants develop external, amorphous silica skeletons (frustules) possessing pores having sizes on the order of nanometers. These pores are uniform in diameter, with dimensions that are species specific. The smallest of these pores have diameters in the range of about 20 to 200 nm. The structure of a diatom is similar to that of a pillbox. The siliceous shell or 'test' is made of opaline silica $(SiO_2.nH_2O)$. Diatoms are found in fresh, salt, or brackish, water, wherein many species are found floating in the surface layers of the water, although the majority are benthic, 'floor dwelling' species.

Diatomite, also known as diatomaceous earth or kieselguhr, is a porous, chalk-like, sedimentary rock, formed by fossil accumulation of diatoms in the form of amorphous, hydrated silica. Diatomite is highly absorbent, physically and chemically stable, nearly indestructible, and ordinarily chemically inert to most common water contaminants. Diatomite is readily crushed or/and physically processed into a powdered form, and sieved into specific average particle size ranges according to particular applications.

Due to the ability of diatomite to absorb its own weight in liquid, its major uses are as absorbent materials and industrial filters. Diatomite is used in a variety of food production applications, such as clarification and filtration of beer and wines, refining sugar and sweeteners, and, filtering fruit juices, oils, and syrups. Heavier industry uses diatomite filters for filtration and stabilization of pharmaceuticals, serums, and other pharmaceutical and biotechnology applications, and chemicals that include liquid acids and other liquid wastes. The porous characteristic of diatomaceous earth allows industries to exploit this quality and use it as an absorbent for gases, noxious materials, soluble fertilizing agents, sealing wax, pasteboard, rubber erasers, and, fatty and acidic materials. Diatomite is also used as a filler, to 'bulk out' finished manufactured products, as it is ordinarily non-reactive. Such products are paints, lacquers, rubbers, plastics, polishes, agricultural chemicals (agrochemicals), insulation, anti-caking agent, cement, concrete, animal feeds, and fertilizers. Diatomite is also well known and widely used as a non-reactive or minimally reactive support, substrate, carrier, matrix, or dispersing agent, material, singly, or in combination with other similar types of materials, for heterogeneous catalysts, including, for example, ZVM types of catalysts.

Vermiculite:

Vermiculite is the mineralogical name given to any of a group of micaceous hydrated silicates of varying composition, related to the chlorites. Vermiculite exfoliates or expands upon heating. In the exfoliated or expanded state, vermiculite has many applications in a wide variety of different types of fields and industries, such as horticulture and agriculture. Among the many applications, vermiculite is commonly used in the horticultural and botanical industries because it provides both aeration and drainage, it retains and holds substantial amounts of water and later releases it as needed, it is sterile and free from diseases, it has a fairly neutral pH, and it is readily available, non-toxic, safe to use, and relatively inexpensive.

Several specific horticultural and botanical applications involving the use of vermiculite are blocking mixes, hydroponics, micro-propagation, potting mixes, rooting cuttings, seed germination, seedling wedgemix, sowing composts, and twin scaling bulbs. Several specific agricultural applications involving the use of vermiculite are animal feeds, anti-caking materials, bulking agents, fertilizers, pesticides, seed encapsulants, and soil conditioners. Additional industrial applications involving the use of vermiculite are absorbent packing materials, dispersions, drilling muds, filtration, fixation of hazardous materials, and nuclear waste disposal. Vermiculite is also used as a filler, to 'bulk out' finished manufactured products, as it is ordinarily non-reactive. Vermiculite is also known and used as a non-reactive or minimally reactive support, substrate, carrier, matrix, or dispersing agent, material, singly, or in combination with other similar types of materials, for heterogeneous catalysts. Due to its chemical composition including the presence of $Fe^{+2}$, vermiculite has been reported to be an active compound in the reduction of halogenated (e.g., chlorinated) organic compounds present in contaminated water.

Although there exists a plethora of numerous different types of well known and used prior art techniques (methods, materials, compositions, devices, and systems) for treating or remediating contaminated water, there remains on-going need for improving current techniques, as well as for identifying, developing, and implementing, new techniques, for example, with respect to techniques based on the use of zero valent metal materials, for treating or remediating contaminated water. Accordingly, new, technologically and economically feasible, and effective treatment and remediation techniques need to be developed and implemented in order to meet stringent water quality standards, and to reduce environmental and health risks associated with pervasive (widespread), persistent (e.g., having half-lives ranging from days to 10,000 years), proven or potentially hazardous (poisonous or toxic), undesirable contaminants in various forms of water, especially such forms of water which are, or/and come in direct contact with, or/and lead to, sources of drinking water.

There is thus a need for, and it would be highly advantageous to have a zero valent metal composite, a method for manufacturing thereof, a method using thereof, a system including thereof, and an article-of-manufacture including thereof, wherein the zero valent metal composite is used for (in-situ or ex-situ) catalytically treating contaminated water. Moreover, there is a need for such an invention which is generally applicable to (in-situ or ex-situ) catalytically treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants. Furthermore, there is a need for such an invention which is particularly applicable to (in-situ or ex-situ) catalytically treating such forms of contaminated water wherein the water contaminants are organic species, for example, halogenated organic compounds and halogen containing degradation products thereof; inorganic species, for example, metal elements, metal element containing inorganic species, nonmetal elements, and nonmetal element containing inorganic species; or any combination thereof.

SUMMARY OF THE INVENTION

The present invention relates to a zero valent metal composite, a method for manufacturing thereof, a method using thereof, a system including thereof, and an article-of-manufacture including thereof. The zero valent metal composite is used for (in-situ or ex-situ) catalytically treating contaminated water. The present invention is generally applicable to (in-situ or ex-situ) catalytically treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants. The present invention is particularly applicable to (in-situ or ex-situ) catalytically treating such forms of contaminated water wherein the water contaminants are organic species, for example, halogenated organic compounds and halogen containing degradation products thereof; inorganic species, for example, metal elements, metal element containing inorganic species, nonmetal elements, and nonmetal element containing inorganic species; or any combination thereof. The present invention is also applicable to (in-situ or ex-situ) catalytically treating contaminated non-aqueous fluids (in liquid, vapor, or/and gaseous forms), for decreasing contaminant concentrations therefrom.

The zero valent metal composite, of the present invention, is composed of a powdered diatomite matrix on or/and in which is incorporated zero valent metal particles having a size in a range of between about 1 nm and about 1000 nm and at least one electron transfer mediator. In a particular embodiment of the present invention, the zero valent metal composite is composed of a composition consisting essentially of a powdered diatomite matrix on or/and in which is incorporated zero valent metal particles having a size in a range of between about 1 nm and about 1000 nm and at least one electron transfer mediator.

Exemplary applicable zero valent metals are zero valent transition metals, for example, iron, cobalt, nickel, copper, zinc, palladium, platinum, gold, or any combination thereof.

In general, essentially any electron transfer mediator functioning as an active redox catalyst under reducing (anaerobic or anoxic) conditions can be used for implementing the present invention. Preferably, the at least one electron transfer mediator is selected from the group consisting of a porphyrinogenic organometallic complex, an analog thereof, a derivative thereof, and any combination thereof. For implementing the present invention, preferably, the at least one porphyrinogenic organometallic complex is selected from the group consisting of metalloporphyrin complexes, metallocorrin complexes, metallochlorin complexes, and any combination thereof.

Preferably, the metalloporphyrin complex is composed of a transition metal complexed to a (initially free base) porphyrin selected from the group consisting of:

tetramethylpyridilporphyrin [5,10,15,20-tetrakis(1-methyl-4-pyridinio)-porphine], abbreviated as [TMPyP], tetrahydroxyphenylporphyrin [5,10,15,20-tetrakis(4-hydroxyphenyl)-21H,23H-porphine], abbreviated as [TP(OH)P], tetraphenylporphyrin [5,10,15,20-tetraphenyl-21H,23H-porphine], abbreviated as [TPP], and meso-tetraphenylporphyrin-4,4',4'',4'''-tetrasulfonic acid [5,10,15,20-tetrakis(benzenesulfonic acid)porphine], abbreviated as [TBSAP].

The transition metal is essentially any transition metal capable of complexing with the just stated porphyrins for forming the corresponding metalloporphyrin complex. Preferably, the transition metal is selected from the group consisting of cobalt [Co], nickel [Ni], iron [Fe], zinc [Zn], and copper [Cu].

Accordingly, for implementing the present invention, preferably, the metalloporphyrin complexes are selected from the group consisting of:

tetramethylpyridilporphyrin-transition metal[5,10,15,20-tetrakis(1-methyl-4-pyridinio)-porphine-transition metal], abbreviated as [TMPyP-transition metal], tetrahydroxyphenylporphyrin-transition metal [5,10,15,20-tetrakis(4-hydroxyphenyl)-21H, 23H-porphine-transition metal], abbreviated as [TP(OH)P-transition metal], tetraphenylporphyrin-transition metal [5,10,15,20-tetraphenyl-21H,23H-porphine-transition metal], abbreviated as [TPP-transition metal], meso-tetraphenylporphyrin-4,4',4'',4'''-tetrasulfonic acid-transition metal [5, 10, 15, 20-tetrakis (benzenesulfonic acid) porphine-transition metal], abbreviated as [TBSAP-transition metal], and any combination thereof, where, in each metalloporphyrin complex the transition metal is cobalt [Co], nickel [Ni], iron [Fe], zinc [Zn], or copper [Cu].

Additional exemplary metalloporphyrin complexes which are suitable for implementing the present invention are selected from the group consisting of chlorophylls [magnesium (II) complexes], hemes [iron (II) complexes], cytochromes (e.g., cytochrome P450, and cytochrome P430), and any combination thereof. An exemplary metallocorrin complex which is suitable for implementing the present invention is vitamin $B_{12}$ [corrin ligand (porphyrin analog) complexed to a cobalt (III) ion].

The zero valent metal composite, optionally, additionally includes vermiculite.

The method for manufacturing the zero valent metal composite, of the present invention, includes the main procedure of incorporating zero valent metal particles having a size in a range of between about 1 nm and about 1000 nm and at least one electron transfer mediator on or/and in a powdered diatomite matrix. In a preferred embodiment, the procedure of incorporating the zero valent metal particles and the at least one electron transfer mediator on or/and in the powdered diatomite matrix is performed by the following exemplary order or sequence of procedures (a)-(i): (a) preparing an aqueous solution of a metal salt; (b) preparing an aqueous solution of the at least one electron transfer mediator; (c) adding the aqueous solution of the at least one electron transfer mediator to the aqueous solution of the metal salt, for forming an aqueous solution of the metal salt and the at least one electron transfer mediator; (d) adding the powdered diatomite matrix to the aqueous solution of the metal salt and the at least one electron transfer mediator, for forming an aqueous slurry of the metal salt, the at least one electron transfer mediator, and the powdered diatomite matrix; (e) preparing an aqueous solution of a strong reducing agent; (f) forming and initiating reaction of a redox reaction mixture of the aqueous slurry of the metal salt, the at least one electron transfer mediator, and the powdered diatomite matrix, with the aqueous solution of the strong reducing agent; (g) allowing the redox reaction mixture to react to completion, for forming a product mixture of the zero valent metal composite in water; (h) collecting the zero valent metal composite; and (i) drying the collected zero valent metal composite, for forming dry zero valent metal composite.

The method for manufacturing the zero valent metal composite of the present invention, optionally, further includes adding vermiculite, for forming the zero valent metal composite composed of the powdered diatomite matrix on or/and in which is incorporated zero valent metal particles having the size in the range of between about 1 nm and about 1000 nm and the at least one electron transfer mediator, and includes vermiculite. In a first exemplary alternative preferred embodiment of the manufacturing method, adding vermiculite is included as a procedure, for example, as (a'), following (a) of preparing an aqueous solution of a metal salt, and before (b) of preparing an aqueous solution of the at least one electron transfer mediator. In a second exemplary alternative preferred embodiment of the manufacturing method, the step of adding vermiculite is included as a procedure, for example, as procedure (h'), following procedure (h) of collecting the zero valent metal composite, and before procedure (i) of drying the collected zero valent metal composite.

The method for catalytically treating contaminated water, of the present invention, includes the main procedure of exposing the contaminated water to a catalytically effective amount of the zero valent metal composite, to thereby decrease concentration of at least one contaminant in the contaminated water. Preferably, exposing the contaminated water to the zero valent metal composite is performed in a manner, for example, under anaerobic conditions, such that only contaminants in the contaminated water, and not non-contaminant species (such as oxygen gas) in the contaminated water or/and in the immediate vicinity of the contaminated water, are catalytically reduced by the zero valent metal particles in the composite. The components of the zero valent metal composite, singly, or in a synergistic combination, catalytically decrease contaminant concentrations in contaminated water.

The system for catalytically treating contaminated water, of the present invention, includes the main components of: (a) the zero valent metal composite, and (b) at least one in-situ or/and ex-situ unit for containing a catalytically effective amount of the zero valent metal composite, for exposing the contaminated water to the zero valent metal composite. Exemplary applicable in-situ units for containing the zero valent metal composite are either in a form as at least part of a sub-surface water permeable reactive barrier (PRB) configured as a continuous filled in trench, wall, or stand-alone well, or, in a form as part of a sub-surface water pumping and treatment system. An exemplary applicable ex-situ unit for containing the zero valent metal composite is in a form as part of an above-surface reactor which is part of an above-surface water pumping and treatment system. For treating contaminated water particularly being a form of water vapor or/and gaseous water, an exemplary applicable in-situ or ex-situ unit for containing the zero valent metal composite is in a form as part of a variably locatable (sub-surface or above-surface) water treatment reactor system.

Exposing contaminated water to the zero valent metal composite of the present invention can be performed according to any of a variety of different ways. For implementing the present invention, preferably, the manner of exposure is such that the contaminated water, for example, in the form of contaminated sub-surface water, surface water, or above-surface water, naturally or forcibly, flows through, and is brought into physicochemical contact with, the zero valent metal composite while the zero valent metal composite remains essentially stationary. Moreover, preferably, the manner of exposure is such that the volumetric or mass flow rate of the contaminated water, naturally or forcibly, flowing through the zero valent metal composite is at least equal to or larger than the volumetric or mass flow rate of the contaminated water, naturally or forcibly, flowing through the ground or material immediately surrounding the zero valent metal composite. Accordingly, preferably, the manner of exposure is such that the permeability, k, of the zero valent metal composite is at least equal to or larger than the permeability, k, of the ground or material immediately surrounding the zero valent metal composite.

The article-of-manufacture, of the present invention, includes a packaging material, and the hereinabove illustratively described zero valent metal composite composed of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water. In a particular embodiment of the present invention, the article-of-manufacture includes a packaging material, and the hereinabove illustratively described zero valent metal composite composed of a composition consisting essentially of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water.

Thus, according to the present invention, there is provided a zero valent metal composite comprising a powdered diatomite matrix on or/and in which is incorporated zero valent metal particles having a size in a range of between about 1 nm and about 1000 nm and at least one electron transfer mediator.

According to another aspect of the present invention, there is provided a zero valent metal composite comprising a composition consisting essentially of a powdered diatomite matrix on or/and in which is incorporated zero valent metal particles having a size in a range of between about 1 nm and about 1000 nm and at least one electron transfer mediator.

According to another aspect of the present invention, there is provided a method for manufacturing a zero valent metal composite, the method comprising incorporating zero valent metal particles having a size in a range of between about 1 nm and about 1000 nm and at least one electron transfer mediator on or/and in a powdered diatomite matrix.

According to another aspect of the present invention, there is provided a method for catalytically treating contaminated water, the method comprising exposing the contaminated water to a catalytically effective amount of a zero valent metal composite composed of a powdered diatomite matrix on or/and in which is incorporated zero valent metal particles having a size in a range of between about 1 nm and about 1000 nm and at least one electron transfer mediator, to thereby decrease concentration of at least one contaminant in the contaminated water.

According to another aspect of the present invention, there is provided a system for catalytically treating contaminated water, comprising: (a) a zero valent metal composite comprised of a powdered diatomite matrix on or/and in which is incorporated zero valent metal particles having a size in a range of between about 1 nm and about 1000 nm and at least one electron transfer mediator, and (b) at least one unit for containing a catalytically effective amount of the zero valent metal composite, for exposing the contaminated water to the zero valent metal composite.

According to another aspect of the present invention, there is provided an article-of-manufacture comprising a packaging material, and the above described zero valent metal composite comprising a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water.

According to another aspect of the present invention, there is provided an article-of-manufacture comprising a packaging material, and the above described zero valent metal composite comprising a composition consisting essentially of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. In the drawings.

DESCRIPTION OF THE PREFERRED EMBODIMENTS

Figure 1A:
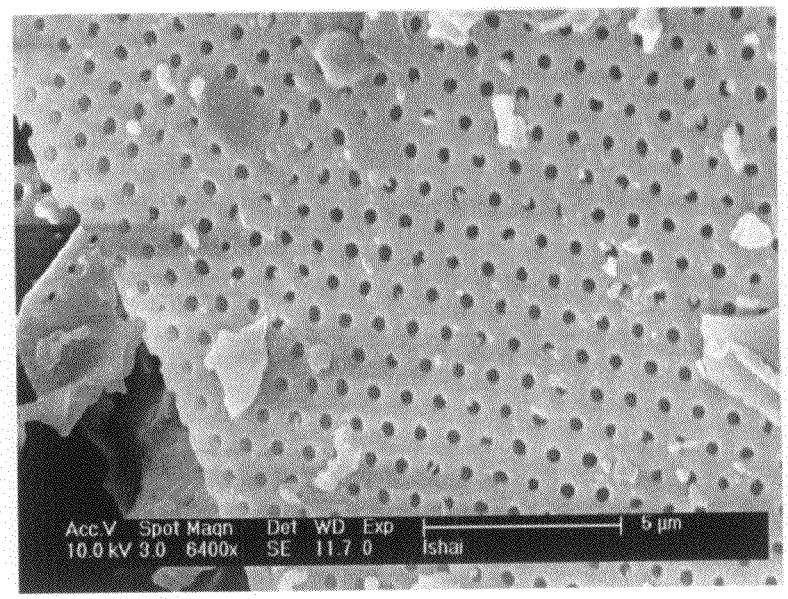
FIGS. 1A and 1B are SEM (scanning electron microscope) photographs showing a 5 μm and 1 μm scale, respectively, of a portion of a 'clean' (pretreated, pre-reacted) powdered diatomite used for manufacturing (synthesizing) different specific embodiments of an exemplary zero valent metal composite, being a zero valent iron composite, as described hereinbelow and exemplified in Examples 1, 2, and 3, in accordance with the present invention.

The present invention relates to a zero valent metal composite, a method for manufacturing thereof, a method using thereof, a system including thereof, and an article-of-manufacture including thereof. The zero valent metal composite is used for (in-situ or ex-situ) catalytically treating contaminated water. The present invention is generally applicable to (in-situ or ex-situ) catalytically treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants. The present invention is particularly applicable to (in-situ or ex-situ) catalytically treating such forms of contaminated water wherein the water contaminants are organic species, for example, halogenated organic compounds and halogen containing degradation products thereof; inorganic species, for example, metal elements, metal element containing inorganic species, nonmetal elements, and nonmetal element containing inorganic species; or any combination thereof. The present invention is also applicable to (in-situ or ex-situ) catalytically treating contaminated non-aqueous fluids (in liquid, vapor, or/and gaseous forms), for decreasing contaminant concentrations therefrom.

The zero valent metal composite, of the present invention, is composed of a powdered diatomite matrix on or/and in which is incorporated zero valent metal particles having a size in a range of between about 1 nm and about 1000 nm and at least one electron transfer mediator. In a particular embodiment of the present invention, the zero valent metal composite is composed of a composition consisting essentially of a powdered diatomite matrix on or/and in which is incorporated zero valent metal particles having a size in a range of between about 1 nm and about 1000 nm and at least one electron transfer mediator.

Exemplary applicable zero valent metals are zero valent transition metals, for example, iron, cobalt, nickel, copper, zinc, palladium, platinum, gold, or any combination thereof.

In general, essentially any electron transfer mediator functioning as an active redox catalyst under reducing (anaerobic or anoxic) conditions can be used for implementing the present invention. Preferably, the at least one electron transfer mediator is selected from the group consisting of a porphyrinogenic organometallic complex, an analog thereof, a derivative thereof, and any combination thereof. For implementing the present invention, preferably, the at least one porphyrinogenic organometallic complex is selected from the group consisting of metalloporphyrin complexes, metallocorrin complexes, metallochlorin complexes, and any combination thereof.

Preferably, the metalloporphyrin complex is composed of a transition metal complexed to a (initially free base) porphyrin selected from the group consisting of:

tetramethylpyridilporphyrin [5,10,15,20-tetrakis(1-methyl-4-pyridinio)-porphine], abbreviated as [TMPyP], tetrahydroxyphenylporphyrin [5,10,15,20-tetrakis(4-hydroxyphenyl)-21H,23H-porphine], abbreviated as [TP(OH)P], tetraphenylporphyrin [5,10,15,20-tetraphenyl-21H,23H-porphine], abbreviated as [TPP], and meso-tetraphenylporphyrin-4,4',4",4'''-tetrasulfonic acid [5,10,15,20-tetrakis(benzenesulfonic acid) porphine], abbreviated as [TBSAP].

The transition metal is essentially any transition metal capable of complexing with the just stated porphyrins for forming the corresponding metalloporphyrin complex. Preferably, the transition metal is selected from the group consisting of cobalt [Co], nickel [Ni], iron [Fe], zinc [Zn], and copper [Cu].

Accordingly, for implementing the present invention, preferably, the metalloporphyrin complexes are selected from the group consisting of:

tetramethylpyridilporphyrin-transition metal [5,10,15,20-tetrakis(1-methyl-4-pyridinio)-porphine-transition metal], abbreviated as [TMPyP-transition metal], tetrahydroxyphenylporphyrin-transition metal [5,10,15,20-tetrakis(4-hydroxyphenyl)-21H,23H-porphine-transition metal], abbreviated as [TP(OH)P-transition metal], tetraphenylporphyrin-transition metal [5,10,15,20-tetraphenyl-21H,23H-porphine-transition metal], abbreviated as [TPP-transition metal], meso-tetraphenylporphyrin-4,4',4",4'''-tetrasulfonic acid-transition metal [5,10,15,20-tetrakis (benzenesulfonic acid) porphine-transition metal], abbreviated as [TBSAP-transition metal], and any combination thereof, where, in each metalloporphyrin complex the transition metal is cobalt [Co], nickel [Ni], iron [Fe], zinc [Zn], or copper [Cu].

Additional exemplary metalloporphyrin complexes which are suitable for implementing the present invention are selected from the group consisting of chlorophylls [magnesium (II) complexes], hemes [iron (II) complexes], cytochromes (e.g., cytochrome P450, and cytochrome P430), and any combination thereof. An exemplary metallocorrin complex which is suitable for implementing the present invention is vitamin $B_{12}$ [corrin ligand (porphyrin analog) complexed to a cobalt (III) ion].

The zero valent metal composite, optionally, additionally includes vermiculite.

The method for manufacturing the zero valent metal composite, of the present invention, includes the main procedure of incorporating zero valent metal particles having a size in a range of between about 1 nm and about 1000 nm and at least one electron transfer mediator on or/and in a powdered diatomite matrix. In a preferred embodiment, the procedure of incorporating the zero valent metal particles and the at least one electron transfer mediator on or/and in the powdered diatomite matrix is performed by the following exemplary order or sequence of procedures (a)-(i): (a) preparing an aqueous solution of a metal salt; (b) preparing an aqueous solution of the at least one electron transfer mediator; (c) adding the aqueous solution of the at least one electron transfer mediator to the aqueous solution of the metal salt, for forming an aqueous solution of the metal salt and the at least one electron transfer mediator; (d) adding the powdered diatomite matrix to the aqueous solution of the metal salt and the at least one electron transfer mediator, for forming an aqueous slurry of the metal salt, the at least one electron transfer mediator, and the powdered diatomite matrix; (e) preparing an aqueous solution of a strong reducing agent; (f) forming and initiating reaction of a redox reaction mixture of the aqueous slurry of the metal salt, the at least one electron transfer mediator, and the powdered diatomite matrix, with the aqueous solution of the strong reducing agent; (g) allowing the redox reaction mixture to react to completion, for forming a product mixture of the zero valent metal composite in water; (h) collecting the zero valent metal composite; and (i) drying the collected zero valent metal composite, for forming dry zero valent metal composite.

The method for manufacturing the zero valent metal composite of the present invention, optionally, further includes adding vermiculite, for forming the zero valent metal composite composed of the powdered diatomite matrix on or/and in which is incorporated zero valent metal particles having the size in the range of between about 1 nm and about 1000 nm and the at least one electron transfer mediator, and includes vermiculite. In a first exemplary alternative preferred embodiment of the manufacturing method, adding vermiculite is included as a procedure, for example, as (a'), following (a) of preparing an aqueous solution of a metal salt, and before (b) of preparing an aqueous solution of the at least one electron transfer mediator. In a second exemplary alternative preferred embodiment of the manufacturing method, the step of adding vermiculite is included as a procedure, for example, as procedure (h'), following procedure (h) of collecting the zero valent metal composite, and before procedure (i) of drying the collected zero valent metal composite.

The method for catalytically treating contaminated water, of the present invention, includes the main procedure of exposing the contaminated water to a catalytically effective amount of the zero valent metal composite, to thereby decrease concentration of at least one contaminant in the contaminated water. Preferably, exposing the contaminated water to the zero valent metal composite is performed in a manner, for example, under anaerobic conditions, such that only contaminants in the contaminated water, and not non-contaminant species (such as oxygen gas) in the contaminated water or/and in the immediate vicinity of the contaminated water, are catalytically reduced by the zero valent metal particles in the composite. The components of the zero valent metal composite, singly, or in a synergistic combination, catalytically decrease contaminant concentrations in contaminated water.

The system for catalytically treating contaminated water, of the present invention, includes the main components of: (a) the zero valent metal composite, and (b) at least one in-situ or/and ex-situ unit for containing a catalytically effective amount of the zero valent metal composite, for exposing the contaminated water to the zero valent metal composite. Exemplary applicable in-situ units for containing the zero valent metal composite are either in a form as at least part of a sub-surface water permeable reactive barrier (PRB) configured as a continuous filled in trench, wall, or stand-alone well, or, in a form as part of a sub-surface water pumping and treatment system. An exemplary applicable ex-situ unit for containing the zero valent metal composite is in a form as part of an above-surface reactor which is part of an above-surface water pumping and treatment system. For treating contaminated water particularly being a form of water vapor or/and gaseous water, an exemplary applicable in-situ or ex-situ unit for containing the zero valent metal composite is in a form as part of a variably locatable (sub-surface or above-surface) water treatment reactor system.

Exposing contaminated water to the zero valent metal composite of the present invention can be performed according to any of a variety of different ways. For implementing the present invention, preferably, the manner of exposure is such that the contaminated water, for example, in the form of contaminated sub-surface water, surface water, or above-surface water, naturally or forcibly, flows through, and is brought into physicochemical contact with, the zero valent metal composite while the zero valent metal composite remains essentially stationary. Moreover, preferably, the manner of exposure is such that the volumetric or mass flow rate of the contaminated water, naturally or forcibly, flowing through the zero valent metal composite is at least equal to or larger than the volumetric or mass flow rate of the contaminated water, naturally or forcibly, flowing through the ground or material immediately surrounding the zero valent metal composite. Accordingly, preferably, the manner of exposure is such that the permeability, k, of the zero valent metal composite is at least equal to or larger than the permeability, k, of the ground or material immediately surrounding the zero valent metal composite.

The article-of-manufacture, of the present invention, includes a packaging material, and the hereinabove illustratively described zero valent metal composite composed of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water. In a particular embodiment of the present invention, the article-of-manufacture includes a packaging material, and the hereinabove illustratively described zero valent metal composite composed of a composition consisting essentially of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water.

The present invention includes several aspects of novelty and inventiveness over prior art teachings of zero valent metal composite materials, manufacturing zero valent metal composite materials, methods using zero valent composite materials, systems including zero valent metal composite materials, and articles-of-manufacture including zero valent metal composite materials, in the relevant fields and arts thereof.

It is to be understood that the present invention is not limited in its application to the details of the compositions, structures, components, and types, of the zero valent metal composite, or of the article-of-manufacture including the zero valent metal composite, or to the details of the order or sequence, and number, of procedures, steps, and sub-steps, peripheral equipment, utilities, accessories, chemical reagents, and materials, of operation or implementation of the methods, or to the details of type, composition, construction, arrangement, order, and number, of the system units, system sub-units, devices, assemblies, sub-assemblies, mechanisms, structures, components, elements, and configurations, and, peripheral equipment, utilities, accessories, and materials, of the system, set forth in the following illustrative description, accompanying drawings, and examples, unless otherwise specifically stated herein. Moreover, although the present invention is primarily focused on applications involving treatment of contaminated water, wherein the contaminated water is, for example, a form of sub-surface water, surface water, above-surface water, water vapor, gaseous water, or any combination thereof, it is to be fully understood that the present invention is also applicable to catalytically treating contaminated non-aqueous fluids (in liquid, vapor, or/and gaseous forms), for decreasing contaminant concentrations therefrom.

Accordingly, the present invention is capable of other embodiments and of being practiced or carried out in various ways. Although compositions, structures, components, and types, of the zero valent metal composite, or of the article-of-manufacture including the zero valent metal composite, or orders or sequences, and numbers, of procedures, steps, and sub-steps, peripheral equipment, utilities, accessories, chemical reagents, and materials, of operation or implementation of the disclosed methods, or types, compositions, constructions, arrangements, orders, and numbers, of system units, system sub-units, devices, assemblies, sub-assemblies, mechanisms, structures, components, elements, and configurations, and, peripheral equipment, utilities, accessories, and materials, of the disclosed system, which are equivalent or similar to those illustratively described and exemplified herein can be used for practicing or testing the present invention, suitable compositions, structures, components, and types, of the zero valent metal composite, or of the article-of-manufacture including the zero valent metal composite, or orders or sequences, and numbers, of procedures, steps, and sub-steps, peripheral equipment, utilities, accessories, chemical reagents, and materials, of operation or implementation of the disclosed methods, or types, compositions, constructions, arrangements, orders, and numbers, of system units, system sub-units, devices, assemblies, sub-assemblies, mechanisms, structures, components, elements, and configurations, and, peripheral equipment, utilities, accessories, and materials, of the disclosed system, are illustratively described and exemplified herein.

It is also to be understood that all technical and scientific words, terms, or/and phrases, used herein throughout the present disclosure have either the identical or similar meaning as commonly understood by one of ordinary skill in the art to which this invention belongs, unless otherwise specifically defined or stated herein. Phraseology, terminology, and, notation, employed herein throughout the present disclosure are for the purpose of description and should not be regarded as limiting. Moreover, all technical and scientific words, terms, or/and phrases, introduced, defined, described, or/and exemplified, in the above Background section, are equally or similarly applicable in the illustrative description of the preferred embodiments, examples, and appended claims, of the present invention. As used herein, the term 'about' refers to ±10% of the associated value. Additionally, as used herein, the phrase 'room temperature' refers to a temperature in a range of between about 20° C. and about 25° C. The following notation is used throughout the present disclosure: %=percent; ppm=parts per million; Å=angstroms; nm=nanometers; mg=milligrams; l=liter; mg/l=milligrams per liter; ml=milliliter; and rpm=rounds per minute.

Exemplary preferred embodiments, alternative preferred embodiments, specific configurations, and, additional and optional aspects, characteristics, or features, thereof, of compositions, structures, components, and types, of the zero valent metal composite, and of the article-of-manufacture including the zero valent metal composite, and, the order or sequence, and number, of procedures, steps, and sub-steps, peripheral equipment, utilities, accessories, chemical reagents, and materials, of operation or implementation of the methods, and, the type, composition, construction, arrangement, order, and number, of the system units, system sub-units, devices, assemblies, sub-assemblies, mechanisms, structures, components, elements, and configurations, and, peripheral equipment, utilities, accessories, and materials, of the system, for (in-situ or ex-situ) catalytically treating contaminated water, according to the present invention, are better understood with reference to the following illustrative description and accompanying drawings. Throughout the following illustrative description and accompanying drawings, same reference numbers refer to same structures, components, or elements.

In the following illustrative description of the present invention, included are main or principal compositions, structures, components, and types, of the zero valent metal composite, and, of the article-of-manufacture including the zero valent metal composite, and, main or principal orders or sequences, and numbers, of procedures, steps, and sub-steps, peripheral equipment, utilities, accessories, chemical reagents, and materials, of operation or implementation of the disclosed methods, and, main or principal types, compositions, constructions, arrangements, orders, and numbers, of system units, system sub-units, devices, assemblies, sub-assemblies, mechanisms, structures, components, elements, and configurations, and, peripheral equipment, utilities, accessories, and materials, of the disclosed system, needed for sufficiently understanding proper 'enabling' utilization and implementation of the disclosed invention. Accordingly, description of various possible preliminary, intermediate, minor, or/and optional, compositions, structures, components, and types, of the zero valent metal composite, and, of the article-of-manufacture including the zero valent metal composite, and, main or principal orders or sequences, and numbers, of procedures, steps, and sub-steps, peripheral equipment, utilities, accessories, chemical reagents, and materials, of operation or implementation of the disclosed methods, and, main or principal types, compositions, constructions, arrangements, orders, and numbers, of system units, system sub-units, devices, assemblies, sub-assemblies, mechanisms, structures, components, elements, and configurations, and, peripheral equipment, utilities, accessories, and materials, of the disclosed system, of secondary importance with respect to enabling implementation of the invention, which are readily known by one of ordinary skill in the art, or/and which are available in the relevant prior art and technical literature, are at most only briefly indicated herein.

Thus, according to a main aspect of the present invention, there is provision of a zero valent metal composite composed of a powdered diatomite matrix on or/and in which is incorporated zero valent metal particles having a size in a range of between about 1 nm and about 1000 nm and at least one electron transfer mediator.

Following are selected details regarding types, and, structural properties and parameters, of the components of the zero valent metal composite of the present invention.

Unless otherwise explicitly stated, the hereinbelow described and numerically valued structural properties and parameters, in particular, particle size, pore size, and concentration (in terms of weight (mass) percent), of the components of the zero valent metal composite, are with respect to a 'dry basis'. As used herein, a dry basis means that a numerical value of a structural property or parameter of a component of the zero valent metal composite is evaluated from empirical or/and theoretical data and information obtained from, and corresponding to, the zero valent metal composite, or/and components thereof, being either in a 'dry' (water-free) environment or in an environment of room temperature (20-25° C.) and room pressure (about 1 atmosphere). In other words, the numerical values of these particular structural properties or parameters of a component of the zero valent metal composite are 'not' evaluated from empirical or/and theoretical data and information obtained from, or corresponding to, the zero valent metal composite, or/and components thereof, being in a 'wet' (for example, water filled) environment. By contrast, for example, the physicochemical property or parameter of permeability, k, of the zero valent metal composite, defined and described hereinbelow, is evaluated from empirical or/and theoretical data and information obtained from, or corresponding to, the zero valent metal composite, and components thereof, being in a 'wet' (water filled and flowing) environment.

Powdered Diatomite Matrix Included in the Zero Valent Metal Composite:

The powdered diatomite matrix included in the zero valent metal composite originates from a powdered form of the well known and readily available diatomite, also known as diatomaceous earth or kieselguhr, being a porous, chalk-like, sedimentary rock, formed by fossil accumulation of diatoms in the form of amorphous, hydrated silica. The powdered diatomite matrix is highly absorbent, physically and chemically stable, nearly indestructible, and ordinarily chemically inert to most common water contaminants.

The particle size, in terms of a 'characteristic' particle size dimension, of the particles of the powdered diatomite matrix included in the zero valent metal composite, on a dry basis, is in a range of between about 1 micron and about 150 microns. More preferably, the particle size of the powdered diatomite matrix particles is in a range of between about 5 microns and about 100 microns, and most preferably, is in a range of between about 20 microns and about 50 microns. Taking into account non-uniform or/and irregular geometrical shapes of the particles, a characteristic particle size dimension of the particles of the powdered diatomite matrix can be considered to be, for example, the longest distance (long distance) or longest diameter (long diameter) spanning across two ends of a diatomite particle.

The pore size, in terms of a 'characteristic' pore size dimension, of the pores of the particles of the powdered diatomite matrix included in the zero valent metal composite, on a dry basis, is in a range of between about 1 nm and about 5000 nm. More preferably, the pore size of the pores of the powdered diatomite matrix particles is in a range of between about 50 nm and about 3000 nm, and most preferably, is in a range of between about 100 nm and about 2000 nm. Taking into account non-uniform or/and irregular geometrical shapes of the pores of the particles, a characteristic pore size dimension of the pores of the particles of the powdered diatomite matrix can be considered to be, for example, the longest distance (long distance) or longest diameter (long diameter) spanning across two ends of a pore of a diatomite particle.

Zero Valent Metal Particles Included in the Zero Valent Metal Composite:

Preferably, the zero valent metal particles which are incorporated on or/and in the powdered diatomite matrix of the zero valent metal composite are of at least one zero valent metal selected from the group consisting of zero valent transition metals. Preferably, the at least one zero valent metal which is applicable for implementing the present invention is at least one zero valent transition metal selected from the group consisting of iron, cobalt, nickel, copper, zinc, palladium, platinum, gold, and any combination thereof. More preferably, the zero valent transition metal which is used for implementing the present invention is iron.

As stated, the particle size, in terms of a 'characteristic' particle size dimension, of the zero valent metal particles incorporated on or/and in the powdered diatomite matrix of the zero valent metal composite, on a dry basis, is in a range of between about 1 nm and about 1000 nm. More preferably, the particle size of the zero valent metal particles is in a range of between about 5 nm and about 500 nm, and most preferably, is in a range of between about 20 nm and about 200 nm. Taking into account non-uniform or/and irregular geometrical shapes of the particles, a characteristic particle size dimension of the particles of the zero valent metal can be considered to be, for example, the longest distance (long distance) or longest diameter (long diameter) spanning across two ends of a zero valent metal particle.

The concentration, in terms of weight (mass) percent, of the zero valent metal particles incorporated on or/and in the powdered diatomite matrix of the zero valent metal composite, on a dry basis, is in a range of between about 0.1% and about 20%. More preferably, the weight percent of the zero valent metal particles is in a range of between about 0.5% and about 15%, and most preferably, is in a range of between about 1% and about 10%. As used herein, the concentration, in terms of weight percent, of the zero valent metal particles incorporated on or/and in the powdered diatomite matrix of the zero valent metal composite corresponds to the weight of the zero valent metal particles as a percent of the total weight of the zero valent metal composite, which can be written as (weight of the zero valent metal particles/total weight of the zero valent metal composite)×100.

Electron Transfer Mediator Included in the Zero Valent Metal Composite:

As used herein, an 'electron transfer mediator' is a chemical substance, functioning as a catalyst or co-catalyst, which is catalytically active, and expedites (catalyzes) redox (reduction-oxidation) types of chemical reactions, such as reductive dehalogenation, by participating in, mediating, and expediting, the transfer of electrons from a bulk electron donor or reducing agent to an electron acceptor, or/and by stabilizing intermediate forms of the redox reactants. An electron transfer mediator which specifically functions by participating in, mediating, and expediting, the transfer of electrons from an electron donor or reducing agent to an electron acceptor is also known as an electron carrier or as an electron shuttle, since electrons are carried and shuttled by such a chemical species. Description, general mechanisms (with reference to chemical equations (1) and (2)), and prior art teachings, of reductive dehalogenation, in general, and of zero valent metal (ZVM) reductive dehalogenation, in particular, of halogenated organic compounds, catalyzed by an electron transfer mediator catalyst, are provided hereinabove in the Background section.

In general, essentially any electron transfer mediator functioning as an active redox catalyst under reducing (anaerobic or anoxic) conditions can be used for implementing the present invention. Preferably, the at least one electron transfer mediator is selected from the group consisting of at least one porphyrinogenic organometallic complex, at least one analog thereof, at least one derivative thereof, and any combination thereof.

As used herein, a 'porphyrinogenic organometallic complex' means an organometallic complex formed between a neutral metal atom or a metal ion and a porphyrinogenic or porphyrinogenic-like ring system. As used herein, a 'porphyrinogenic or porphyrinogenic-like ring system' means a system in which 5-membered heterocyclic rings are linked in a macrocyclic ring structure by linking groups. The linking groups are saturated or/and unsaturated and have saturated or/and unsaturated side chains such that a complete or partial pi-conjugation is formed between the macrocyclic rings and the unsaturated linking groups or/and side chains in the system. The porphyrinogenic or porphyrinogenic-like ring system preferably also has sufficient non-conjugated electrons to form covalent or coordinate bonds with the metal.

It is to be fully understood that the term 'porphyrinogenic organometallic complex' as used herein encompasses an organometallic complex formed between a neutral metal atom or a metal ion, and an analog or derivative of the just defined porphyrinogenic or porphyrinogenic-like ring system.

As used herein, the term 'analog' of a subject (parent) compound refers to a compound whose molecular structure is structurally related or analogous to the subject (parent) compound molecular structure, and therefore, such a compound is expected to exhibit similar (physical, or/and chemical, or/and biological) activity(ies) as that exhibited by the subject (parent) compound.

As used herein, the term 'derivative' of a subject (parent) compound refers to a compound whose molecular structure is derived as a result of 'chemical modification' of the molecular structure of the subject (parent) compound, such that a major portion of the subject (parent) compound molecular structure remains unchanged or intact in the molecular structure of the derivative compound. The chemical modification of the molecular structure of the subject (parent) compound takes place in an active manner, e.g., using synthetic organic chemistry methods and techniques, for forming an active type of derivative of the subject (parent) compound. Alternatively, or additionally, the chemical modification of the molecular structure of the subject (parent) compound takes place in a passive manner, i.e., using naturally occurring methods and techniques, for forming a passive type of derivative of the subject (parent) compound. For example, a compound whose molecular structure is derived by (active or/and passive) addition of at least one substituent to, or/and by a change of at least one substituent from, the molecular structure of a subject (parent) compound. For example, a compound whose molecular structure is derived by (active or/and passive) oxidation or hydrolysis of molecules of a subject (parent) compound.

The preceding definitions of analog and derivative of a subject compound are applicable to analogs and derivatives, respectively, of a porphyrinogenic organometallic complex subject (parent) compound.

As previously stated hereinabove in the Background section, there are extensive teachings [e.g., 34] about the origin, and the numerous physical, chemical, and biological, properties, characteristics, and behavior, of porphyrinogenic organometallic complexes, of which thousands have been identified and studied [e.g., 35, 36]. Exemplary well known metalloporphyrin complexes are chlorophylls, which are magnesium (II) complexes; hemes, which are iron (II) complexes; and cytochromes (e.g., cytochrome P450, and cytochrome P430). Vitamin $B_{12}$ (cyanocobalamin) a naturally occurring, or synthesized, metalloporphyrin-like complex of related structure and function, is a metallocorrin type of porphyrinogenic organometallic complex composed of a corrin ligand (a porphyrin analog in which some of the methylene bridges are substituted or/and absent) complexed to a cobalt (III) ion.

Porphyrinogenic organometallic complexes, such as metalloporphyrins, metalloporphyrin-like complexes, and their derivatives, exist in many biochemical environments, such as living cells, soils, sediments, bitumens, coal, oil shales, petroleum, and other types of naturally occurring deposits rich in organic matter [e.g., 37-39]. Porphyrinogenic organometallic complexes are well known for functioning as electron transfer mediators, and play an important role in various biochemical pathways, such as oxygen transport and storage (hemoglobin and myoglobin, respectively) and electron transfer in redox (reduction-oxidation) reactions (cytochromes).

Porphyrinogenic organometallic complexes exhibit several particular properties, characteristics, and behavior, which make them especially well applicable for functioning as electron transfer mediator type catalysts in homogeneous or heterogeneous electron transfer mediated catalytic reductive dehalogenation (typically, dechlorination) reaction systems, for catalyzing reductive dehalogenation of halogenated organic compound contaminants in water under reducing (anaerobic or anoxic) conditions. Porphyrinogenic organometallic complexes are: (1) effective redox catalysts for many reactions, and have a long range of redox activity; (2) electrochemically active with almost any core metal; (3) active catalysts in aqueous solution under conditions particularly pertinent to environments of various different forms of contaminated sub-surface water and surface water; and (4) relatively highly stable, thereby enabling reactions to take place under severe conditions, where other types of reactions probably would not take place.

For implementing the present invention, preferably, the at least one porphyrinogenic organometallic complex is selected from the group consisting of metalloporphyrin complexes, metallocorrin complexes, metallochlorin complexes, and any combination thereof. Metalloporphyrin complexes (commonly known and referred to as metalloporphyrins), being porphyrinogenic organometallic complexes of metal ions and porphyrin ligands, are organic tetrapyrrole macrocycles composed of four pyrrole type rings joined by methane (methylidene) bridges and complexed to a central metal ion. They form a near planar structure of aromatic macrocycles containing up to 22 conjugated $\pi$ electrons, 18 of which are incorporated into the delocalization pathway in accordance with Huckel's [4n+2] rule of aromaticity. One or two of the peripheral double bonds of the porphyrin ligands of a metalloporphyrin can undergo an addition reaction to form a metalloporphyrin derivative, such as a metallocorrin or a metallochlorin type of porphyrinogenic organometallic complex.

Preferably, the metalloporphyrin complex is composed of a transition metal complexed to a (initially free base) porphyrin selected from the group consisting of:

tetramethylpyridilporphyrin [5,10,15,20-tetrakis(1-methyl-4-pyridinio)-porphine], herein, abbreviated as [TMPyP], tetrahydroxyphenylporphyrin [5,10,15,20-tetrakis(4-hydroxyphenyl)-21H,23H-porphine], herein, abbreviated as [TP(OH)P], tetraphenylporphyrin [5,10,15,20-tetraphenyl-21H,23H-porphine], herein, abbreviated as [TPP], and meso-tetraphenylporphyrin-4,4',4'',4'''-tetrasulfonic acid [5,10,15,20-tetrakis(benzenesulfonic acid) porphine], herein, abbreviated as [TBSAP].

The transition metal is essentially any transition metal capable of complexing with the just stated porphyrins for forming the corresponding metalloporphyrin complex. Preferably, the transition metal is selected from the group consisting of cobalt [Co], nickel [Ni], iron [Fe], zinc [Zn], and copper [Cu].

Accordingly, for implementing the present invention, preferably, the metalloporphyrin complexes are selected from the group consisting of:

tetramethylpyridilporphyrin-transition metal [5,10,15,20-tetrakis(1-methyl-4-pyridinio)-porphine-transition metal], herein, abbreviated as [TMPyP-transition metal], tetrahydroxyphenylporphyrin-transition metal [5,10,15,20-tetrakis(4-hydroxyphenyl)-21H,23H-porphine-transition metal], herein, abbreviated as [TP(OH)P-transition metal], tetraphenylporphyrin-transition metal [5,10,15,20-tetraphenyl-21H,23H-porphine-transition metal], herein, abbreviated as [TPP-transition metal], meso-tetraphenylporphyrin-4,4',4'',4'''-tetrasulfonic acid-transition metal [5,10,15,20-tetrakis(benzenesulfonic acid) porphine-transition metal], herein, abbreviated as [TBSAP-transition metal], and any combination thereof, where, in each metalloporphyrin complex the transition metal is cobalt [Co], nickel [Ni], iron [Fe], zinc [Zn], or copper [Cu].

The above indicated [TMPyP-transition metal], [TP(OH)P-transition metal], [TPP-transition metal], and [TBSAP-transition metal], preferred metalloporphyrin complexes are either commercially available, or are synthesized from the commercially available respective [TMPyP], [TP(OH)P], [TPP], or [TBSAP], (free base) porphyrins and transition metal solutions using published methods and techniques [e.g., 54, 55].

Additional exemplary metalloporphyrin complexes which are suitable for implementing the present invention are selected from the group consisting of chlorophylls [magnesium (II) complexes], hemes [iron (II) complexes], cytochromes (e.g., cytochrome P450, and cytochrome P430), and any combination thereof. An exemplary metallocorrin complex which is suitable for implementing the present invention is vitamin $B_{12}$ [corrin ligand (porphyrin analog) complexed to a cobalt (III) ion].

The concentration, in terms of weight percent, of the at least one electron transfer mediator incorporated on or/and in the powdered diatomite matrix of the zero valent metal composite, on a dry basis, is in a range of between about 0.001% and about 1%. More preferably, the weight percent of the electron transfer mediator is in a range of between about 0.005% and about 0.5%, and most preferably, is in a range of between about 0.01% and about 0.1%. As used herein, the concentration, in terms of weight percent, of the electron transfer mediator incorporated on or/and in the powdered diatomite matrix of the zero valent metal composite corresponds to the weight of the electron transfer mediator as a percent of the total weight of the zero valent metal composite, which can be written as (weight of the electron transfer mediator/total weight of the zero valent metal composite)× 100.

The zero valent metal particles and the at least one electron transfer mediator are preferably incorporated on or/and in the powdered diatomite matrix by means of being dispersed throughout the matrix surface or/and pores, supported by the matrix surface or/and pores, adhered in a chemical bonding manner to the matrix surface or/and pores, or/and entrapped in the matrix pores.

In a particular embodiment of the present invention, the zero valent metal composite is composed of a composition consisting essentially of a powdered diatomite matrix on or/and in which is incorporated zero valent metal particles having a size in a range of between about 1 nm and about 1000 nm and at least one electron transfer mediator. This particular embodiment of the zero valent metal composite corresponds to another main aspect of the present invention.

Figure 1B:
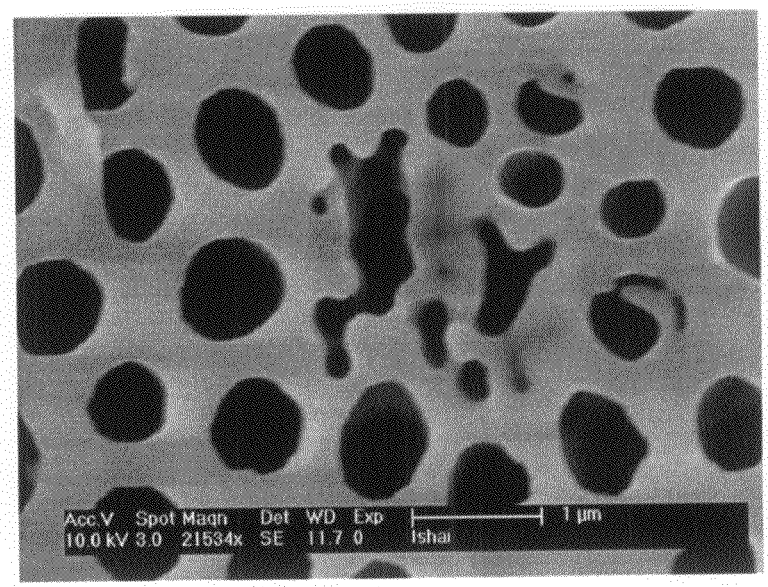
Figure 2A:
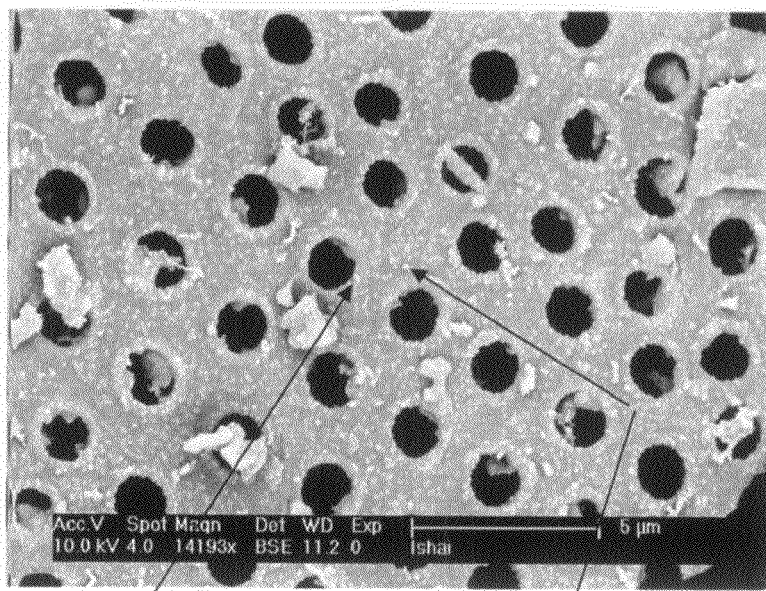
FIGS. 2A and 2B are SEM photographs showing a 5 μm and 1 μm scale, respectively, of a portion of an exemplary zero valent metal composite, being the (dry) zero valent iron composite manufactured (synthesized) as described hereinbelow and exemplified in Example 1, composed of a powdered diatomite matrix on or/and in which is incorporated zero valent iron particles having a size in a range of between about 1 nm and about 1000 nm and vitamin $B_{12}$ (metallocorrin complex type of porphyrinogenic organometallic complex, as an exemplary electron transfer mediator), in accordance with the present invention.
Figure 2B:
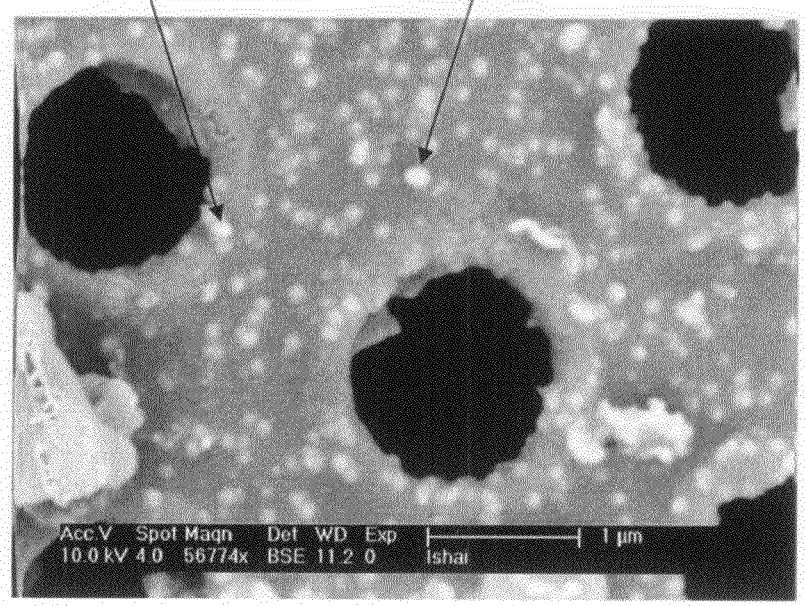

FIGS. 1A and 1B are SEM (scanning electron microscope) photographs showing a 5 μm and 1 μm scale, respectively, of a portion of a 'clean' (pre-treated, pre-reacted) powdered diatomite used for manufacturing (synthesizing) different specific embodiments of an exemplary zero valent metal composite, being a zero valent iron composite, as described herein and exemplified in Examples 1, 2, and 3, in accordance with the present invention. FIGS. 2A and 2B are SEM photographs showing a 5 μm and 1 μm scale, respectively, of a portion of an exemplary zero valent metal composite, being the (dry) zero valent iron composite manufactured (synthesized) as described herein and exemplified in Example 1, composed of a powdered diatomite matrix on or/and in which is incorporated zero valent iron particles (for example, which appear as white colored relatively small circularly shaped spots, as pointed to by the paired arrows) having a size in a range of between about 1 nm and about 1000 nm and vitamin $B_{12}$ (metallocorrin complex type of porphyrinogenic organometallic complex, as an exemplary electron transfer mediator), in accordance with the present invention.

Comparison of the SEM photographs of FIGS. 2A and 2B with those of FIGS. 1A and 1B, respectively, clearly shows that nanometer sized zero valent iron particles are incorporated on or/and in (as described hereinabove) the powdered diatomite matrix of the zero valent iron composite. Elemental analysis of the surface layer of a portion of the zero valent iron composite, encompassing the powdered diatomite matrix and a plurality of the nanometer sized zero valent iron particles, indicates the presence of silica and iron. The SEM instrument was unable to resolve elemental analysis at the size scale of individual nanometer sized zero valent iron particles observed in the SEM photographs.

Figure 3:
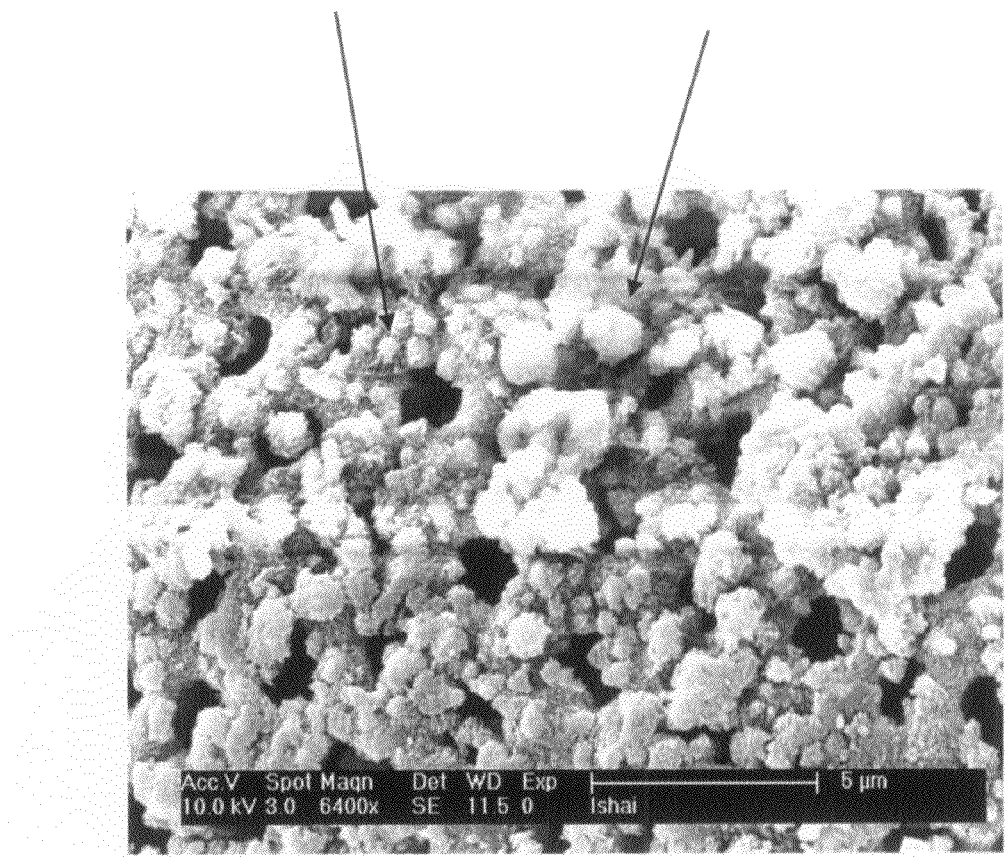
FIG. 3 is a SEM photograph showing a 5 μm scale of a portion of an exemplary 'comparative reference' zero valent metal composite (without an electron transfer mediator), being a (dry) zero valent iron composite manufactured (synthesized) 'similar' to that as described hereinbelow and exemplified in Example 1, composed of a powdered diatomite matrix on or/and in which is incorporated zero valent iron particles (aggregates) having an average size larger than about 600 nm, without an electron transfer mediator, for serving as an exemplary reference zero valent metal composite when compared to the exemplary zero valent metal composite of the present invention which appears in the SEM photographs of FIGS. 2A and 2B.

FIG. 3 is a SEM photograph showing a 5 μm scale of a portion of an exemplary 'comparative reference' zero valent metal composite (without an electron transfer mediator), being a (dry) zero valent iron composite manufactured (synthesized) 'similar' to that as described hereinbelow and exemplified in Example 1, composed of a powdered diatomite matrix on or/and in which is incorporated zero valent iron particles (for example, which appear as white colored relatively large irregularly shaped aggregates, as pointed to by the arrows) having an average size larger than about 600 nm, without an electron transfer mediator, for serving as an exemplary reference zero valent metal composite when compared to the exemplary zero valent metal composite of the present invention which appears in the SEM photographs of FIGS. 2A and 2B. Comparison of the SEM photographs of FIGS. 2A and 2B with that of FIG. 3 clearly shows the significantly different geometrical shape or form of the zero valent iron particles, in particular, relatively small circularly shaped particles (FIGS. 2A and 2B) vs. relatively large irregularly shaped aggregates (FIG. 3), according to the presence or absence, respectively, of an electron transfer mediator (for example, vitamin $B_{12}$) incorporated on or/and in the powdered diatomite matrix of the zero valent iron composite.

These exemplary empirical observations based on comparisons of the SEM photographs of FIGS. 2A and 2B with those of FIGS. 1A, 1B, and 3, convincingly support several main general inventive aspects of the present invention. Firstly, wherein the presence of an electron transfer mediator (for example, vitamin $B_{12}$) incorporated on or/and in the powdered diatomite matrix of the zero valent metal composite, significantly influences the geometrical shape or form of the zero valent metal particles additionally incorporated on or/and in the powdered diatomite matrix of the zero valent metal composite. Secondly, wherein the presence of an electron transfer mediator (for example, vitamin $B_{12}$) during the manufacturing (synthesizing) of the zero valent metal composite, significantly influences the geometrical shape or form of the zero valent metal particles in the manufactured (synthesized) zero valent metal composite. Thirdly, wherein, apparently, the presence of an electron transfer mediator (for example, vitamin $B_{12}$) incorporated on or/and in the powdered diatomite matrix of the zero valent metal composite, significantly influences the physicochemical properties, characteristics, and behavior, of the zero valent metal particles additionally incorporated on or/and in the powdered diatomite matrix of the zero valent metal composite, in particular, and therefore, of the zero valent metal composite, in general. This includes, for example, with respect to applications involving the use of the zero valent metal composite for treating contaminated water.

In an alternative preferred embodiment of the present invention, the zero valent metal composite, as described hereinabove, optionally, additionally includes vermiculite. The vermiculite additionally included in the zero valent metal composite originates from a piece, flake, sheet, or chip, form of the well known and readily available vermiculite.

In such an alternative preferred embodiment of the present invention, the vermiculite additionally included in the zero valent metal composite is, for example, in the form of pieces, flakes, sheets, or chips, herein, generally referred to as pieces, being of any combination of various possible regular or/and irregular polygonal (for example, rectangular, square, hexagonal), elliptical, or spherical, shapes. Accordingly, the piece size, in terms of a 'characteristic' piece size dimension, of the vermiculite additionally included in the zero valent metal composite, on a dry basis, is in a range of between about 0.01 mm and about 20 mm. More preferably, the piece size of the vermiculite is in a range of between about 0.05 mm and about 10 mm, and most preferably, is in a range of between about 0.1 mm and about 5 mm. Taking into account non-uniform or/and irregular geometrical shapes of the pieces, flakes, sheets, or chips, a characteristic piece size dimension of the pieces of the vermiculite can be considered to be, for example, the longest distance (long distance) or longest diameter (long diameter) spanning across two ends of a piece, flake, sheet, or chip, of the vermiculite.

In such an alternative preferred embodiment of the present invention, the concentration, in terms of weight percent, of the vermiculite additionally included in the zero valent metal composite, on a dry basis, is in a range of between about 20% and about 95%. More preferably, the weight percent of the vermiculite is in a range of between about 25% and about 75%, and most preferably, is in a range of between about 35% and about 65%. As used herein, the concentration, in terms of weight percent, of the vermiculite additionally included in the zero valent metal composite corresponds to the weight of the vermiculite as a percent of the total weight of the zero valent metal composite (including the vermiculite), which can be written as (weight of the vermiculite/total weight of the zero valent metal composite)×100.

The hereinabove described and numerically valued structural properties and parameters, in particular, particle size, pore size, and weight (mass) percent, of the components of the zero valent metal composite, with respect to a 'dry basis', are useful for characterizing the zero valent metal composite of the present invention. For additionally characterizing the zero valent metal composite, in particular, with respect to applications of treating contaminated water, especially in the form of 'flowing' contaminated sub-surface water, surface water, or above-surface water, there is the physicochemical property or parameter of permeability, k, of the zero valent metal composite, which is evaluated from empirical or/and theoretical data and information obtained from, or corresponding to, the zero valent metal composite, and components thereof, being in a 'wet' (for example, water filled and flowing) environment.

As used herein, consistent with that known in the fields of fluid dynamics, hydraulics, and geology, the permeability, k, is an intrinsic physicochemical property or parameter of a porous substance or material that quantifies the ability of the porous substance or material to transmit a fluid, for example, liquid phase water, through it, naturally or forcibly, evaluated at specified operating and environmental conditions (for example, temperature, pressure, natural/forced flow, absence or presence of surrounding materials which may influence the bulk packing and density of the porous substance or material), and has dimensions of distance times distance (for example, $cm^2$). Porous substances or materials (for example, diatomite, vermiculite) obtained from natural (in particular, geologic) sources are typically heterogeneous, and the extent of heterogeneity of the porous substance or material, in addition to being a function of operating and environmental conditions, is also a function of volume and mass scales of measurement. Accordingly, the permeability, k, of such porous substances or materials corresponds to an 'average' physicochemical property or parameter, relevant to the volume and mass scales of measurement.

Regarding the permeability, k, of the zero valent metal composite, according to another main aspect of the present invention, to be illustratively described hereinbelow, there is provided a method for catalytically treating contaminated water, including the step of exposing the contaminated water to a catalytically effective amount of the hereinabove described zero valent metal composite, to thereby decrease concentration of at least one contaminant in the contaminated water. For implementing the method, a system (further described hereinbelow and illustrated in FIGS. 4-8) can be used, which preferably includes any of the hereinabove previously described embodiments of the zero valent metal composite, and at least one (in-situ or/and ex-situ) unit for containing a catalytically effective amount of the zero valent metal composite, for exposing the contaminated water to the zero valent metal composite.

Exemplary applicable in-situ units for containing the zero valent metal composite are either in a form as at least part of a sub-surface water permeable reactive barrier (PRB) configured as a continuous filled in trench, wall, or stand-alone well, or, in a form as part of a sub-surface water pumping and treatment system. An exemplary applicable ex-situ unit for containing the zero valent metal composite is in a form as part of an above-surface reactor which is part of an above-surface water pumping and treatment system. For treating contaminated water particularly being a form of water vapor or/and gaseous water, an exemplary applicable in-situ or ex-situ unit for containing the zero valent metal composite is in a form as part of a variably locatable (sub-surface or above-surface) water treatment reactor system.

Exposing contaminated water to the zero valent metal composite of the present invention can be performed according to any of a variety of different ways. For implementing the present invention, preferably, the manner of exposure is such that the contaminated water, for example, in the form of contaminated sub-surface water, surface water, or above-surface water, naturally or forcibly, flows through, and is brought into physicochemical contact with, the zero valent metal composite while the zero valent metal composite remains essentially stationary. Moreover, preferably, the manner of exposure is such that the volumetric or mass flow rate of the contaminated water, naturally or forcibly, flowing through the zero valent metal composite is at least equal to or larger than the volumetric or mass flow rate of the contaminated water, naturally or forcibly, flowing through the ground or material immediately surrounding the zero valent metal composite. Accordingly, preferably, the manner of exposure is such that the permeability, k, of the zero valent metal composite is at least equal to or larger than the permeability, k, of the ground or material immediately surrounding the zero valent metal composite. As described hereinbelow and illustrated in FIGS. 4-8, such preferred ways of exposure are applicable to an embodiment of the system of the present invention wherein the zero valent metal composite is contained in at least one unit located in a flow path as part of an overall system used for processing or treating the contaminated water.

Thus, for additionally characterizing the zero valent metal composite of the present invention, the permeability, k, of the zero valent metal composite as described hereinabove (for the preferred embodiment without vermiculite, or for the alternative preferred embodiment which additionally includes vermiculite), in a 'wet' (for example, water filled and flowing) environment, is on the order of at least equal to or greater than about $10^{-9}$ cm$^2$.

Following are selected details regarding the chemical bonding between the components (powdered diatomite matrix, zero valent metal particles, electron transfer mediator, and, optionally, vermiculite) of the zero valent metal composite of the present invention.

The nanometer sized particles (crystals) of the zero valent metal chemically adhere to the silica surface of the powdered diatomite matrix in an apparently covalent type of chemical bonding configuration. Apparently, the covalent type of chemical bonding configuration arises as a result of formation of a covalent type of interface bond between the zero valent metal particles and an oxide form of the powdered diatomite matrix surface. This is supported by several well known alternative mechanisms which are used for explaining and characterizing the formation of covalent bonds between elemental (zero valent) transition metals and silica (silicon oxide) surfaces.

According to a first mechanism, the nature of interactions between an elemental (zero valent) transition metal and a silica (silicon oxide) surface is considered to drive the formation of covalent polar bonds via mixing of 3d orbitals of the metal with 2p orbitals of O bands of the silicon oxide. According to a second mechanism, the nature of interactions is based on activation of the silica (silicon oxide) surface which drives covalent bonding of the metal via formation of siloxane links. According to a third mechanism, the nature of interactions is based on reaction of the metal with silica surface silanols freed from adsorbed water by cavitation, for forming positively charged metal on the silica surface, in the form of Si—O—M+ sites. These Si—O—M+ sites apparently serve as nucleating centers for the further agglomeration of the metal.

Electron transfer mediator molecules chemically adhere primarily to the silica surface of the powdered diatomite matrix via covalent or/and other types of chemical bonding configurations, such as ionic, coordinative, or/and hydrogen bonding configurations. To some extent, electron transfer mediator molecules also chemically adhere to the metallic surface of the zero valent metal particles via covalent or/and other types of chemical bonding configurations, such as ionic, coordinative, or/and hydrogen bonding configurations. For the hereinabove described alternative preferred embodiment of the zero valent metal composite which additionally includes vermiculite, electron transfer mediator molecules may also chemically adhere to the hydrated silicate surface of the vermiculite via covalent or/and other types of chemical bonding configurations, such as ionic, coordinative, or/and hydrogen bonding configurations, or/and may also physically adhere to the hydrated silicate surface of the vermiculite via various types of physical bonding configurations.

Following are selected details regarding the functions of the components (powdered diatomite matrix, zero valent metal particles, electron transfer mediator, and, optionally, vermiculite) of the zero valent metal composite of the present invention.

The powdered diatomite matrix primarily functions as a physicochemical matrix, or support, for the catalytically active zero valent metal particles and the at least one electron transfer mediator. More specifically, the surface or/and pores of the powdered diatomite matrix primarily function as hosts for the dispersion, support, entrapment and adherence, in a chemical or/and physical bonding manner, of the zero valent metal particles and the at least one electron mediator which are incorporated on or/and in the powdered diatomite matrix.

The zero valent metal particles primarily function as a bulk electron donor or reducing agent (which becomes oxidized) during occurrence of the redox (reduction-oxidation) reactions which take place during exposure of contaminated water to a catalytically effective amount of the zero valent metal composite, to thereby decrease concentration of at least one contaminant in the contaminated water. Inclusion of the zero valent metal particles (functioning as a bulk electron donor or reducing agent) in the zero valent metal composite provides for, and enables, the various heterogeneous catalytic reaction processes to take place under reducing (anaerobic or anoxic) conditions within the contaminated water, for heterogeneously catalytically treating the contaminated water, to thereby decrease the concentration of at least one of the chemical contaminants in the contaminated water. Accordingly, exposure of contaminated water to a catalytically effective amount of the zero valent metal composite takes place under reducing (anaerobic or anoxic) conditions, i.e., as opposed to oxidizing conditions.

As stated hereinabove, an 'electron transfer mediator' is a chemical substance, functioning as a catalyst or co-catalyst, which is catalytically active, and expedites (catalyzes) redox (reduction-oxidation) types of chemical reactions, such as reductive dehalogenation, by participating in, mediating, and expediting, the transfer of electrons from a bulk electron donor or reducing agent to an electron acceptor, or/and by stabilizing intermediate forms of the redox reactants. An electron transfer mediator which specifically functions by participating in, mediating, and expediting, the transfer of electrons from an electron donor or reducing agent to an electron acceptor is also known as an electron carrier or as an electron shuttle, since electrons are carried and shuttled by such a chemical species.

Accordingly, each electron transfer mediator which is/are incorporated on or/and in the powdered diatomite matrix of the zero valent metal composite of the present invention primarily functions as a chemical substance which is catalytically active. Moreover, each electron transfer mediator facilitates at least one redox (reduction-oxidation) reaction, for example, taking place between contaminants in contaminated water and the zero valent metal composite of the present invention, by mediating, and participating in, the transfer of electrons between an electron donor, for example, a catalyst, such as the zero valent metal particles in the composite of the present invention, and an electron acceptor, for example, a water contaminant, such as a halogenated organic compound, or/and by stabilizing an intermediate form of a redox reactant. An electron transfer mediator which specifically functions by mediating, and participating in, the transfer of electrons between an electron donor, such as the zero valent metal particles in the composite of the present invention, and an electron acceptor, for example, a water contaminant, such as a halogenated organic compound, therefore, specifically functions as an electron carrier or as an electron shuttle.

The vermiculite primarily functions as a physical scaffold, being a frame or platform, for physically supporting the powdered diatomite matrix on or/and in which are incorporated the zero valent metal particles and the at least one electron mediator. The vermiculite may also function by increasing the adsorption, in addition to the porosity and permeability (permeability, k), properties, parameters, characteristics, and behavior, of the zero valent metal composite. The vermiculite may also function as a chemically active species, for example, by serving as an additional support for chemisorption of reaction species, participating in the redox (reduction-oxidation) reaction(s) taking place between contaminants in contaminated water and the zero valent metal composite of the present invention, during the catalytic treatment of the contaminated water.

The components (powdered diatomite matrix, zero valent metal particles, electron transfer mediator, and, optionally, vermiculite) of the zero valent metal composite, when present in a catalytically effective amount, and exposed to contaminated water, singly, or in a synergistic combination, catalytically decrease concentration of at least one contaminant in the contaminated water.

According to another main aspect of the present invention, there is provision of a method for manufacturing a zero valent metal composite, which is effected by incorporating zero valent metal particles having a size in a range of between about 1 nm and about 1000 nm and at least one electron transfer mediator on or/and in a powdered diatomite matrix.

There is a wide variety of different possible procedures, steps and sub-steps, alternative steps and sub-steps, optional steps and sub-steps, and, orders or sequences thereof, for implementing the method for manufacturing a zero valent metal composite, in accordance with the present invention. Moreover, actual procedures, steps and sub-steps, alternative steps and sub-steps, optional steps and sub-steps, and, orders or sequences thereof, which are used for implementing the method for manufacturing a zero valent metal composite, in accordance with the present invention, are performed according to the actual type and size scale (e.g., laboratory, pilot-plant, commercial), of implementation.

For the objective of illustrating implementation of the present invention, in a non-limiting manner, there is described hereinbelow, an exemplary preferred embodiment of the method for manufacturing the zero valent metal composite of the present invention, wherein the procedure of incorporating the zero valent metal particles having a size in a range of between about 1 nm and about 1000 nm and the electron transfer mediator(s) on or/and in a powdered diatomite matrix, is performed by the following exemplary order or sequence of procedures (a)-(i):

(a) preparing an aqueous solution of a metal salt; (b) preparing an aqueous solution of the electron transfer mediator(s); (c) adding the aqueous solution of the electron transfer mediator(s) to the aqueous solution of the metal salt, for forming an aqueous solution of the metal salt and the electron transfer mediator(s); (d) adding the powdered diatomite matrix to the aqueous solution of the metal salt and the electron transfer mediator(s), for forming an aqueous slurry of the metal salt, the electron transfer mediator(s), and the powdered diatomite matrix; (e) preparing an aqueous solution of a strong reducing agent; (f) forming and initiating reaction of a redox reaction mixture of the aqueous slurry of the metal salt, the electron transfer mediator(s), and the powdered diatomite matrix, with the aqueous solution of the strong reducing agent; (g) allowing the redox reaction mixture to react to completion, for forming a product mixture of the zero valent metal composite in water; (h) collecting the zero valent metal composite; and (i) drying the collected zero valent metal composite, for forming dry zero valent metal composite.

Immediately following are details of each of the above indicated procedures (a)-(i), as part of the exemplary preferred embodiment of the method for manufacturing the zero valent metal composite of the present invention.

In (a), there is preparing an aqueous solution of a metal salt.

For performing this procedure, there is dissolving a metal salt in water, for forming the aqueous solution of the metal salt. The aqueous solution of the metal salt is placed in a filter flask in an anaerobic chamber.

Preferably, the metal salt used for preparing the aqueous solution of the metal salt is selected from the group consisting of transition metal salts. More preferably, the transition metal salt is selected from the group consisting of iron salts, cobalt salts, nickel salts, copper salts, zinc salts, palladium salts, platinum salts, gold salts, or any combination thereof. Most preferably, the transition metal salt is an iron salt.

In a non-limiting manner, selected specific examples of each of these types of exemplary transition metal salts, which are applicable for performing this procedure of preparing an aqueous solution of a metal salt, are provided immediately hereinbelow. Herein, consistent with standard chemical nomenclature and terminology, with respect to the hydrate forms of any of the below listed transition metal salts, the term 'n' represents a real, but not necessarily whole, number, such as 0.5 (semi-hydrate), 1.0 (monohydrate), 1.5, 2 (dihydrate), 3 (trihydrate), 4 (tetrahydrate), 5 (pentahydrate), 6 (hyxahydrate), 7 (heptahydrate), 8 (octahydrate), . . . , etc.

An exemplary iron salt is selected from the group consisting of iron alkali salts, iron sulfate salts, iron nitrate salts, and iron phosphate salts. An exemplary iron alkali salt is selected from the group consisting of iron chloride salts, iron bromide salts, and iron iodide salts. An exemplary iron chloride salt is selected from the group consisting of iron(III) chloride hexahydrate [$FeCl_3.6H_2O$], iron(II) chloride [$FeCl_2$], and iron(II) chloride tetrahydrate [$FeCl_2.4H_2O$]. An exemplary iron bromide salt is selected from the group consisting of iron(II) bromide [$FeBr_2$], and iron(III) bromide [$FeBr_3$]. An exemplary iron iodide salt is selected from the group consisting of iron(II) iodide [$FeI_2$], and iron(II) iodide tetrahyrate [$FeI_2.4H_2O$]. An exemplary iron sulfate salt is selected from the group consisting of iron sulfate hydrates [$FeSO_4.nH_2O$], such as iron sulfate heptahyrate [$FeSO_4.7H_2O$]. An exemplary iron nitrate salt is iron nitrate nonahydrate [$Fe(NO_3)_3.9H_2O$]. An exemplary iron phosphate salt is iron (III) phosphate tetrahydrate [$FePO_4.4H_2O$].

An exemplary cobalt salt is selected from the group consisting of cobalt alkali salts, cobalt sulfate salts, cobalt nitrate salts, and cobalt phosphate salts. An exemplary cobalt alkali salt is selected from the group consisting of cobalt chloride salts, cobalt bromide salts, and cobalt iodide salts. An exemplary cobalt chloride salt is selected from the group consisting of cobalt(II) chloride [$CoCl_2$], and cobalt(II) chloride hydrates [$CoCl_2.nH_2O$], such as cobalt(II) chloride hexahydrate [$CoCl_2.6H_2O$]. An exemplary cobalt bromide salt is selected from the group consisting of cobalt(II) bromide [$CoBr_2$], and cobalt(II) bromide hydrates [$CoBr_2.nH_2O$]. An exemplary cobalt iodide salt is cobalt(II) iodide [$CoI_2$]. An exemplary cobalt sulfate salt is selected from the group consisting of cobalt(II) sulfate hydrates [$CoSO_4.nH_2O$], such as cobalt(II) sulfate heptahydrate [$CoSO_4.7H_2O$]. An exemplary cobalt nitrate salt is cobalt(II) nitrate hexahydrate [$Co(NO_3)_2.6H_2O$]. An exemplary cobalt phosphate salt is selected from the group consisting of cobalt(II) phosphate hydrates [$Co(PO_4)_2.nH_2O$].

An exemplary nickel salt is selected from the group consisting of nickel alkali salts, nickel sulfate salts, and nickel nitrate salts. An exemplary nickel alkali salt is selected from the group consisting of nickel chloride salts, nickel bromide salts, and nickel iodide salts. An exemplary nickel chloride salt is selected from the group consisting of nickel(II) chloride [$NiCl_2$], and nickel(II) chloride hydrates [$NiCl_2.nH_2O$], such as nickel(II) chloride hexahydrate [$NiCl_2.6H_2O$]. An exemplary nickel bromide salt is selected from the group consisting of nickel(II) bromide [$NiBr_2$], and nickel(II) bromide hydrates [$NiBr_2.nH_2O$], such as nickel(II) bromide trihydrate [$NiBr_2.3H_2O$]. An exemplary nickel iodide salt is nickel(II) iodide [$NiI_2$]. An exemplary nickel sulfate salt is selected from the group consisting of nickel(II) sulfate hexahydrate [$NiSO_4.6H_2O$], and nickel(II) sulfate heptahydrate [$NiSO_4.7H_2O$].

An exemplary nickel nitrate salt is nickel(II) nitrate hexahydrate [$Ni(NO_3)_2.6H_2O$].

An exemplary copper salt is selected from the group consisting of copper alkali salts, copper sulfate salts, copper nitrate salts, and copper phosphate salts. An exemplary copper alkali salt is selected from the group consisting of copper chloride salts, copper bromide salts, and copper iodide salts. An exemplary copper chloride salt is selected from the group consisting of copper(II) chloride [$CuCl_2$], and copper(II) chloride dihydrate [$CuCl_2.2H_2O$]. An exemplary copper bromide salt is copper(II) bromide [$CuBr_2$]. An exemplary copper iodide salt is copper(II) iodide [$CuI_2$]. An exemplary copper sulfate salt is selected from the group consisting of copper(II) sulfate [$CuSO_4$], and copper(II) sulfate hydrates [$CuSO_4.nH_2O$], such as copper(II) sulfate pentahydrate [$CuSO_4.5H_2O$]. An exemplary copper nitrate salt is selected from the group consisting of copper(II) nitrate trihydrate [$Cu(NO_3)_2.3H_2O$], and copper(II) nitrate hexahydrate [$Cu(NO_3)_2.6H_2O$]. An exemplary copper phosphate salt is copper(II) phosphate dihydrate [$Cu_3(PO_4)_2.2H_2O$].

An exemplary zinc salt is selected from the group consisting of zinc alkali salts, zinc sulfate salts, and zinc nitrate salts. An exemplary zinc alkali salt is selected from the group consisting of zinc chloride salts, zinc bromide salts, and zinc iodide salts. An exemplary zinc chloride salt is zinc chloride [$ZnCl_2$]. An exemplary zinc bromide salt is selected from the group consisting of zinc bromide [$ZnBr_2$], and zinc bromide dihydrate [$ZnBr_2.2H_2O$]. An exemplary zinc iodide salt is zinc iodide [$ZnI_2$]. An exemplary zinc sulfate salt is selected from the group consisting of zinc sulfate monohydrate [$ZnSO_4.H_2O$], and zinc sulfate heptahydrate [$ZnSO_4.7H_2O$]. An exemplary zinc nitrate salt is selected from the group consisting of zinc nitrate hydrates [$Zn(NO_3)_2.nH_2O$], such as zinc nitrate hexahydrate [$Zn(NO_3)_2.6H_2O$].

An exemplary palladium salt is selected from the group consisting of palladium alkali salts, palladium sulfate salts, palladium nitrate salts, and palladium cyanide salts. An exemplary palladium alkali salt is selected from the group consisting of palladium chloride salts, palladium bromide salts, palladium fluoride, and palladium iodide salts. An exemplary palladium chloride salt is selected from the group consisting of palladium chloride [$PdCl_2$], and palladium chloride dihydrate [$PdCl_2.2H_2O$]. An exemplary palladium bromide salt is palladium bromide [$PdBr_2$]. An exemplary palladium fluoride salt is selected from the group consisting of palladium difluoride [$PdF_2$], and palladium trifluoride [$PdF_3$]. An exemplary palladium iodide salt is palladium iodide [$PdI_2$]. An exemplary palladium sulfate salt is palladium sulfate dihydrate [$PdSO_4.2H_2O$]. An exemplary palladium sulfide salt is selected from the group consisting of palladium monosulfide [$PdS$], palladium disulfide [$PdS_2$], and palladium subsulfide [$Pd_2S$]. An exemplary palladium nitrate salt is palladium nitrate [$Pd(NO_3)_2$]. An exemplary palladium cyanide salt is palladium cyanide [$Pd(CN)_2$].

An exemplary platinum salt is selected from the group consisting of platinum alkali salts, platinum sulfate salts, platinum sulfide salts, and platinum cyanide salts. An exemplary platinum alkali salt is selected from the group consisting of platinum chloride salts, platinum bromide salts, platinum fluoride, and platinum iodide salts. An exemplary platinum chloride salt is selected from the group consisting of platinum dichloride [$PtCl_2$], platinum tetrachloride [$PtCl_4$], platinum trichloride [$PtCl_3$], and platinum tetrachloride pentahydrate [$PtCl_4.5H_2O$]. An exemplary platinum bromide salt is selected from the group consisting of platinum dibromide [$PtBr_2$], and platinum tetrabromide [$PdBr_4$]. An exemplary platinum fluoride salt is selected from the group consisting of platinum difluoride [$PtF_2$], and platinum tetrafluoride [$PdF_4$]. An exemplary platinum iodide salt is selected from the group consisting of platinum iodide [$PtI_2$], and platinum tetraiodide [$PtI_4$]. An exemplary platinum sulfate salt is platinum sulfate tetrahydrate [$Pt(SO_4)_2.4H_2O$]. An exemplary platinum sulfide salt is selected from the group consisting of platinum monosulfide [$PtS$], and platinum (II) disulfide [$PtS_2$]. An exemplary platinum cyanide salt is platinum cyanide [$Pt(CN)_2$].

An exemplary gold salt is selected from the group consisting of gold alkali salts, gold sulfide salts, and gold cyanide salts. An exemplary gold alkali salt is selected from the group consisting of gold chloride salts, gold bromide salts, and gold iodide salts. An exemplary gold chloride salt is selected from the group consisting of gold chloride [$AuCl$], and gold trichloride [$AuCl_3$] or [$Au_2Cl_6$]. An exemplary gold bromide salt is selected from the group consisting of gold bromide [$AuBr$], and gold tribromide [$AuBr_3$]. An exemplary gold iodide salt is selected from the group consisting of gold iodide [$AuI$], and gold triiodide [$AuI_3$]. An exemplary gold sulfide salt is selected from the group consisting of gold sulfide [$Au_2S$], and digold trisulfide [$Au_2S_3$]. An exemplary gold cyanide salt is gold cyanide [$AuCN$].

In (b), there is preparing an aqueous solution of the electron transfer mediator(s).

Preferably, there is preparing a single aqueous solution of the electron transfer mediator(s). For example, for the case of incorporating a single electron transfer mediator on or/and in the powdered diatomite matrix of the zero valent metal composite, there is preparing a single aqueous solution of the single electron transfer mediator. For the case of incorporating at least two electron transfer mediators on or/and in the powdered diatomite matrix of the zero valent metal composite, there is preparing a single aqueous solution of all of the at least two electron transfer mediators. Alternatively, there is separately preparing a single aqueous solution of each of the at least two electron transfer mediators.

Preferably, the at least one electron transfer mediator which is/are used for preparing the aqueous solution of the at least one electron transfer mediator, is selected from the group of porphyrinogenic organometallic complexes, analogs thereof, and derivatives thereof, as defined and detailed hereinabove.

In (c), there is adding the aqueous solution of the at least one electron transfer mediator to the aqueous solution of the metal salt, for forming an aqueous solution of the metal salt and the at least one electron transfer mediator.

For performing this procedure, the aqueous solution of the at least one electron transfer mediator is poured into the aqueous solution of the metal salt, and then the combined solution is mixed to yield a homogeneous aqueous solution of the metal salt and the at least one electron transfer mediator.

In (d), there is adding the powdered diatomite matrix, being a powdered form of diatomite (kieselguhr), to the aqueous solution of the metal salt and the electron transfer mediator(s), for forming an aqueous slurry of the metal salt, the electron transfer mediator(s), and the powdered diatomite matrix.

For performing this procedure, typically, additional water is added to the aqueous slurry which is initially formed upon commencing addition of the powdered diatomite matrix. Preferably, the aqueous slurry of the metal salt, the electron transfer mediator(s), and the powdered diatomite matrix, is of a consistency which can be mixed by stirring, for example, magnetic stirring, or some other type of preferably, automated, stirring mechanism or device, according to the actual type and size scale (e.g., laboratory, pilot-plant, commercial), required for implementing the overall method for manufacturing (synthesizing) the zero valent metal composite, in accordance with the present invention. The aqueous slurry is then placed in a fume hood, or some other type of fume ventilating assembly, and mixed by stirring, for example, magnetic stirring.

As previously stated hereinabove in the description of the preferred embodiments of the zero valent metal composite of the present invention, the powdered diatomite matrix included in the zero valent metal composite originates from a powdered form of the well known and readily available diatomite (diatomaceous earth or kieselguhr), being a porous, chalk-like, sedimentary rock, formed by fossil accumulation of diatoms in the form of amorphous, hydrated silica. The powdered diatomite making up the powdered diatomite matrix of the zero valent metal composite of the present invention, and used in the method for manufacturing the zero valent metal composite, in accordance with the present invention, is readily obtained from a commercial source of powdered diatomite, in an 'as is' form having any of the hereinabove previously indicated average particle size and pore size ranges. Alternatively, the powdered diatomite is readily obtained from a commercial source of non-powdered diatomite, in an 'as is' form having any of the above indicated average pore size ranges, but having a larger than desired average particle size range, whereby the non-powdered diatomite is then readily crushed or/and physically processed into a powdered form, and sieved into the desired average particle size range according to a particular application.

In (e), there is preparing an aqueous solution of a strong reducing agent.

The aqueous solution of the strong reducing agent is either prepared in, or transferred to, an appropriately sized low light transmitting container (for example, an opaque brown (or amber) glass container (e.g., an amber bottle)), preferably unexposed to sunlight, which is then placed in an anaerobic chamber.

Preferably, the strong reducing agent used for preparing the aqueous solution of the strong reducing agent is selected from the group consisting of hydride types of reducing reagents, dihydrogen types of reducing reagents, metallic types of reducing reagents, and organometallic types of reducing reagents.

Examples of such reducing reagents are alkali borohydrides, such as sodium borohydride ($NaBH_4$), or other alkali borohydrides, for example, cyano derivatives of sodium borohydride ($NaBH_4$), such as $NaBH_3CN$.

In (f), there is forming and initiating reaction of a redox reaction mixture of the aqueous slurry of the metal salt, the electron transfer mediator(s), and the powdered diatomite matrix, with the aqueous solution of the strong reducing agent.

The aqueous slurry of the metal salt, the electron transfer mediator(s), and the powdered diatomite matrix, of (d), and the aqueous solution of the strong reducing agent of (e), are each placed in a reaction vessel, which is magnetically stirred in a fume hood. Forming and initiating reaction of the redox reaction mixture are performed, for example, by pumping and drop-wise adding the aqueous solution of the strong reducing agent to the reaction vessel containing the aqueous slurry of the metal salt, the at least one electron transfer mediator, and the powdered diatomite matrix, while mixing, and supplying an inert gas to the reaction vessel for preventing intrusion of oxygen. Preferred exemplary inert gases suitable for performing this step are nitrogen, argon, or a combination thereof.

In (g), there is allowing the redox reaction mixture to react to completion, for forming a product mixture of the zero valent metal composite in water.

The redox reaction mixture reacts to completion upon delivering the necessary amount of the strong reducing agent to the reaction vessel containing the aqueous slurry.

During reaction among the reactants (the metal salt, the at least one electron transfer mediator, the powdered diatomite matrix, and the strong reducing agent) of the redox reaction mixture, being mixed in an aqueous environment, the oxidized form of the metal in the metal salt is reduced to the zero valent metal, which in turn precipitates onto the silica surface or/and in the silica pores of the powdered diatomite matrix.

As previously stated hereinabove, nanometer sized particles (crystals) of the zero valent metal chemically adhere to the silica surface or/and pores of the powdered diatomite matrix in a covalent type of chemical bonding configuration. Apparently, the covalent type of chemical bonding configuration arises as a result of formation of a covalent type of interface bond between the zero valent metal particles and an oxide form of the powdered diatomite matrix surface. This is supported by several well known alternative mechanisms, briefly described hereinabove, which are used for explaining and characterizing the formation of covalent bonds between elemental (zero valent) transition metals and silica (silicon oxide) surfaces.

Electron transfer mediator molecules chemically adhere primarily to the silica surface or/and pores of the powdered diatomite matrix via covalent or/and other types of chemical bonding configurations, such as ionic, coordinative, or/and hydrogen bonding configurations. To some extent, electron transfer mediator molecules also chemically adhere to the metallic surface of the zero valent metal particles via covalent or/and other types of chemical bonding configurations, such as ionic, coordinative, or/and hydrogen bonding configurations.

During the reaction taking place in (g) for forming the zero valent metal composite, the electron transfer mediator may function as a chemically active species, for example, by actively facilitating (mediating, catalyzing, or co-catalyzing) the reduction of the oxidized form of the metal in the metal salt to the zero valent metal, or/and by actively facilitating (mediating, catalyzing, or co-catalyzing) the bonding of the zero valent metal to the silica surface of the powdered diatomite matrix.

When the redox reaction mixture has completed reacting, the zero valent metal composite formed as part of the product mixture is composed of the powdered diatomite matrix on or/and in which is incorporated zero the valent metal particles having the size in the range of between about 1 nm and about 1000 nm and the at least one electron transfer mediator.

In (h), there is collecting the zero valent metal composite. This procedure is performed, for example, by transferring the zero valent metal composite to an anaerobic chamber, filtering, and then washing the zero valent metal composite with water and a suitable organic solvent, such as acetone.

In (i), there is drying the collected zero valent metal composite, for forming dry zero valent metal composite. This procedure is performed, for example, by drying the collected zero valent metal composite in the anaerobic chamber, by using vacuum pumping. Following the drying procedure, the dry zero valent metal composite is stored in a closed container in the anaerobic chamber until needed for use.

Example 1, hereinbelow in the Examples section, describes an actual example of implementing the just described exemplary preferred embodiment of the method for manufacturing a zero valent metal composite, of the present invention, wherein the zero valent metal composite is a zero valent iron composite composed of a powdered diatomite matrix on or/and in which is incorporated zero valent iron particles having a size in a range of between about 1 nm and about 1000 nm and vitamin $B_{12}$.

The immediately preceding description of the exemplary preferred embodiment of the method for manufacturing the zero valent metal composite of the present invention, including the procedure (a)-(i), is readily implemented for manufacturing the hereinabove previously described zero valent metal composite composed of the powdered diatomite matrix on or/and in which is incorporated the zero valent metal particles having the size in the range of between about 1 nm and about 1000 nm and the at least one electron transfer mediator, and alternatively, is readily implemented for manufacturing the hereinabove previously described zero valent metal composite composed of the composition consisting essentially of the powdered diatomite matrix on or/and in which is incorporated the zero valent metal particles having the size in the range of between about 1 nm and about 1000 nm and the at least one electron transfer mediator.

The immediately preceding description of the exemplary preferred embodiment of the method for manufacturing the zero valent metal composite of the present invention, optionally, further includes the step of adding vermiculite. With inclusion of this additional step, the immediately preceding description of the exemplary preferred embodiment of the method for manufacturing the zero valent metal composite of the present invention, is readily implemented for manufacturing the hereinabove previously described zero valent metal composite composed of the powdered diatomite matrix on or/and in which is incorporated zero valent metal particles having the size in the range of between about 1 nm and about 1000 nm and the at least one electron transfer mediator, and includes vermiculite.

In a first exemplary alternative preferred embodiment of the manufacturing method, the step of adding vermiculite is included as a procedure, for example, as (a'), following (a) of preparing an aqueous solution of a metal salt, and before (b) of preparing an aqueous solution of the at least one electron transfer mediator. Accordingly, a first exemplary alternative preferred embodiment of the method for manufacturing the zero valent metal composite of the present invention, wherein the step of incorporating zero valent metal particles having a size in a range of between about 1 nm and about 1000 nm and at least one electron transfer mediator on or/and in a powdered diatomite matrix, includes the following order or sequence of procedures (a)-(i):

(a) preparing an aqueous solution of a metal salt; (a') adding vermiculite to the aqueous solution of the metal salt, for forming a mixture of the vermiculite and the aqueous solution of the metal salt; (b) preparing an aqueous solution of the at least one electron transfer mediator; (c) adding the aqueous solution of the at least one electron transfer mediator to the mixture of the vermiculite and the aqueous solution of the metal salt, for forming a mixture of the vermiculite and an aqueous solution of the metal salt and the at least one electron transfer mediator; (d) adding the powdered diatomite matrix to the mixture of the vermiculite and the aqueous solution of the metal salt and the at least one electron transfer mediator, for forming a mixture of the vermiculite and an aqueous slurry of the metal salt, the at least one electron transfer mediator, and the powdered diatomite matrix; (e) preparing an aqueous solution of a strong reducing agent; (f) forming and initiating reaction of a redox reaction mixture of the vermiculite and the aqueous slurry of the metal salt, the at least one electron transfer mediator, and the powdered diatomite matrix, with the aqueous solution of the strong reducing agent; (g) allowing the redox reaction mixture to react to completion, for forming a product mixture of the zero valent metal composite (including vermiculite) in water; (h) collecting the zero valent metal composite (including vermiculite); and (i) drying the collected zero valent metal composite (including vermiculite), for forming dry zero valent metal composite (including vermiculite).

In the immediately preceding first exemplary alternative preferred embodiment of the method for manufacturing the zero valent metal composite of the present invention, procedures (a), (b), and (e), are identical to the corresponding procedures (a), (b), and (e), respectively, of the hereinabove previously described exemplary preferred embodiment of the method for manufacturing the zero valent metal composite of the present invention. Procedure (a') of adding vermiculite to the aqueous solution of the metal salt, for forming a mixture of the vermiculite and the aqueous solution of the metal salt, has been inserted between (a) and (b) in the previous sequence of procedures (a)-(i). Procedures (c), (d), and (f), are similar to the corresponding procedures (c), (d), and (f), respectively, in the previous sequence of procedures (a)-(i), except for the explicitly stated additional presence of the vermiculite. Procedures (g), (h), and (i), are similar to the corresponding procedures (g), (h), and (i), respectively, in the previous sequence of procedures (a)-(i), except for the implicitly understood and indicated additional presence of the vermiculite as part of the zero valent metal composite.

Example 2, hereinbelow in the Examples section, describes an actual example of implementing the just described first exemplary alternative preferred embodiment of the manufacturing method (optional addition of vermiculite), of the present invention, wherein the zero valent metal composite is a zero valent iron composite composed of a powdered diatomite matrix on or/and in which is incorporated zero valent iron particles having a size in a range of between about 1 nm and about 1000 nm and vitamin $B_{12}$, and includes vermiculite.

In a second exemplary alternative preferred embodiment of the manufacturing method, the step of adding vermiculite is included as a procedure, for example, as procedure (h'), following procedure (h) of collecting the zero valent metal composite, and before procedure (i) of drying the collected zero valent metal composite. Accordingly, a second exemplary alternative preferred embodiment of the method for manufacturing the zero valent metal composite of the present invention, wherein the procedure of incorporating zero valent metal particles having a size in a range of between about 1 nm and about 1000 nm and at least one electron transfer mediator on or/and in a powdered diatomite matrix, includes the following order or sequence of procedures (a)-(i):

(a) preparing an aqueous solution of a metal salt; (b) preparing an aqueous solution of the at least one electron transfer mediator; (c) adding the aqueous solution of the at least one electron transfer mediator to the aqueous solution of the metal salt, for forming an aqueous solution of the metal salt and the at least one electron transfer mediator; (d) adding the powdered diatomite matrix to the aqueous solution of the metal salt and the at least one electron transfer mediator, for forming an aqueous slurry of the metal salt, the at least one electron transfer mediator, and the powdered diatomite matrix; (e) preparing an aqueous solution of a strong reducing agent; (f) forming and initiating reaction of a redox reaction mixture of the aqueous slurry of the metal salt, the at least one electron transfer mediator, and the powdered diatomite matrix, with the aqueous solution of the strong reducing agent; (g) allowing the redox reaction mixture to react to completion, for forming a product mixture of the zero valent metal composite (absent of vermiculite) in water; (h) collecting the zero valent metal composite (absent of vermiculite); (h') adding vermiculite to the collected zero valent metal composite (absent of vermiculite), for forming the zero valent metal composite (including vermiculite); and (i) drying the zero valent metal composite (including vermiculite), for forming dry zero valent metal composite (including vermiculite).

In the immediately preceding second exemplary alternative preferred embodiment of the method for manufacturing the zero valent metal composite of the present invention, procedures (a)-(h) are identical to the corresponding procedures (a)-(h), respectively, of the hereinabove previously described exemplary preferred embodiment of the method for manufacturing the zero valent metal composite of the present invention. Procedure (h') of adding vermiculite to the collected zero valent metal composite (absent of vermiculite), for forming the zero valent metal composite (including vermiculite), has been inserted between procedures (h) and (i) in the previous sequence of procedures (a)-(i). Preferably, procedure (h') further includes washing the zero valent metal composite (including vermiculite) with water and a suitable organic solvent, such as acetone, in an anaerobic chamber. Procedure (i) is similar to the corresponding procedure (i) in the previous sequence of procedures (a)-(i), except for the indicated additional presence of the vermiculite as part of the zero valent metal composite.

Example 3, hereinbelow in the Examples section, describes an actual example of implementing the just described second exemplary alternative preferred embodiment of the manufacturing method (optional addition of vermiculite), of the present invention, wherein the zero valent metal composite is a zero valent iron composite composed of a powdered diatomite matrix on or/and in which is incorporated zero valent iron particles having a size in a range of between about 1 nm and about 1000 nm and vitamin $B_{12}$, and includes vermiculite.

Following are selected additional details regarding the hereinabove described exemplary preferred embodiment of the method for manufacturing the zero valent metal composite of the present invention, which optionally, further includes the step of adding vermiculite, in accordance with the just described first or second exemplary alternative preferred embodiments thereof.

The vermiculite additionally included in the method for manufacturing the zero valent metal composite originates from a piece, flake, or chip, form of the well known and readily available vermiculite.

In the just described first exemplary alternative preferred embodiment of the manufacturing method, during the reaction taking place in (g) for forming the zero valent metal composite (including vermiculite), in addition to the electron transfer mediator, the vermiculite may also function as a chemically active species, for example, by actively facilitating (mediating, catalyzing, or co-catalyzing) the reduction of the oxidized form of the metal in the metal salt to the zero valent metal, or/and by actively facilitating (mediating, catalyzing, or co-catalyzing) the bonding of the zero valent metal to the silica surface of the powdered diatomite matrix.

Additionally, in the just described first exemplary alternative preferred embodiment of the manufacturing method, as previously stated hereinabove, for the hereinabove described alternative preferred embodiment of the zero valent metal composite which additionally includes vermiculite, electron transfer mediator molecules may also chemically adhere to the hydrated silicate surface of the vermiculite via covalent or/and other types of chemical bonding configurations, such as ionic, coordinative, or/and hydrogen bonding configurations, or/and may also physically adhere to the hydrated silicate surface of the vermiculite via various types of physical bonding configurations.

According to another main aspect of the present invention, there is provision of a method for catalytically treating contaminated water, including the procedure of exposing the contaminated water to a catalytically effective amount of a zero valent metal composite composed of a powdered diatomite matrix on or/and in which is incorporated zero valent metal particles having a size in a range of between about 1 nm and about 1000 nm and at least one electron transfer mediator, to thereby decrease concentration of at least one contaminant in the contaminated water.

The method for catalytically treating contaminated water, of the present invention, is a heterogeneous catalytic chemical technique for treating contaminated water which is based on exploiting 'heterogeneous catalytic chemical reaction' types of mechanisms, processes, and phenomena, involving the use of one or more chemicals functioning as a catalyst for 'catalytically' transforming, converting, or degrading, the contaminants in the contaminated water to non-toxic or/and less toxic species.

As used herein, a 'catalytically effective amount of the zero valent metal composite' means the amount (for example, in terms of mass, weight, or volume) of the zero valent metal composite that catalytically decreases concentration of at least one contaminant in a given amount of contaminated water. The actual catalytically effective amount of the zero valent metal composite needed to practice the invention depends upon several parameters of a given system.

Primary parameters are the types, quantities, concentrations, and, physicochemical and hydrodynamic (flow) properties, characteristics, and behavior, of the contaminated water, of the individual contaminants in the water, and of the zero valent metal composite, throughout the catalytic reaction zone or region. Secondary parameters are the temperatures and pressures, and possible gradients thereof, of the contaminated water, of the individual contaminants in the water, and of the zero valent metal composite, within the catalytic reaction zone or region. Tertiary parameters correspond to the just indicated primary and secondary parameters, but with respect to other material(s) possibly present throughout, or/and in the immediate vicinity surrounding, the catalytic reaction zone or region.

The method for catalytically treating contaminated water is readily implemented by using any of the hereinabove previously described embodiments of the zero valent metal composite of the present invention. In particular, a zero valent metal composite composed of a powdered diatomite matrix on or/and in which is incorporated zero valent metal particles having a size in a range of between about 1 nm and about 1000 nm and at least one electron transfer mediator, or, alternatively, which additionally includes vermiculite.

Accordingly, the zero valent metal used for implementing the method for catalytically treating contaminated water has the hereinabove previously described and numerically valued structural properties and parameters, in particular, particle size, pore size, and weight (mass) percent, of the components (powdered diatomite matrix, nanometer sized zero valent metal particles, at least one electron transfer mediator, and, optionally, vermiculite) of the zero valent metal composite, and has the hereinabove previously described and numerically valued physicochemical property or parameter of permeability, k. Moreover, the zero valent metal used for implementing the method for catalytically treating contaminated water is characterized by the hereinabove previously described selected details regarding the chemical bonding between the components of the zero valent metal composite, and is characterized by the hereinabove previously described selected details regarding the functions of the components (powdered diatomite matrix, zero valent metal particles, electron transfer mediator, and, optionally, vermiculite) of the zero valent metal composite.

Exposing the Contaminated Water to the Zero Valent Metal Composite:

Exposing the contaminated water to the zero valent metal composite of the present invention can be performed according to any of a variety of different ways well known in the art for forming a heterogeneous catalytic reaction mixture. For example, for implementing the present invention, the manner of exposure is such that the contaminated water, for example, in the form of contaminated sub-surface water, surface water, or above-surface water, and the zero valent metal composite, are both stationary in a batch mode, or, alternatively, one or both of which is/are moving in a flow mode, while the various heterogeneous catalytic reaction processes take place for catalytically treating the contaminated water.

Batch Mode:

For the exposure being performed in a stationary or batch mode, the contaminated water is brought into physicochemical contact with the catalytically effective amount of the zero valent metal composite, or, equivalently, the catalytically effective amount of the zero valent metal composite is brought into physicochemical contact with the contaminated water, such that the resulting heterogeneous catalytic reaction mixture is characterized by both the contaminated water and the zero valent metal composite being essentially stationary while the various heterogeneous catalytic reaction processes take place, at the molecular and atomic levels, for catalytically treating the contaminated water. Such manner of exposure is used for operating the well known batch type of heterogeneous catalytic chemical reactor, which is clearly applicable for implementing the present invention.

Flow Mode:

For the exposure being performed in a motion or flow mode, the contaminated water is brought into physicochemical contact with the catalytically effective amount of the zero valent metal composite while the zero valent metal composite remains essentially stationary, such that the resulting heterogeneous catalytic reaction mixture is characterized by the contaminated water being in dynamic motion or flowing relative to the zero valent metal composite, while the various heterogeneous catalytic reaction processes take place, at the molecular and atomic levels, for catalytically treating the contaminated water. Alternatively, the catalytically effective amount of the zero valent metal composite is brought into physicochemical contact with the contaminated water while the contaminated water remains essentially stationary, such that the resulting heterogeneous catalytic reaction mixture is characterized by the zero valent metal composite being in dynamic motion or flowing relative to the contaminated water, while the various heterogeneous catalytic reaction processes take place, at the molecular and atomic levels, for catalytically treating the contaminated water. Alternatively, both the contaminated water and the catalytically effective amount of the zero valent metal composite are brought into physicochemical contact with each other, such that the resulting heterogeneous catalytic reaction mixture is characterized by both the contaminated water and the zero valent metal composite being in dynamic motion or flowing relative to each other, while the various heterogeneous catalytic reaction processes take place for catalytically treating the contaminated water. Such manners of exposure are used for operating the well known flow and fluidized types of heterogeneous catalytic chemical reactors, which are clearly applicable for implementing the present invention.

Extent of Time or Duration of Exposing the Contaminated Water to the Zero Valent Metal Composite:

In general, for the exposure being performed in a stationary or batch mode, or, alternatively, being performed in a motion or flow mode, the extent of time or duration (for example, hours, days, weeks, etc.) of exposing the contaminated water to the zero valent metal composite depends upon the same primary, secondary, and tertiary, parameters of a given system, as described hereinabove, which determine the actual catalytically effective amount of the zero valent metal composite needed to practice the invention. In particular, the extent of time or duration of exposing the contaminated water to the zero valent metal composite depends upon the primary parameters of the types, quantities, concentrations, and, physicochemical and hydrodynamic (flow) properties, characteristics, and behavior, of the contaminated water, of the individual contaminants in the water, and of the zero valent metal composite, throughout the catalytic reaction zone or region; and depends upon the secondary parameters of temperatures and pressures, and possible gradients thereof, of the contaminated water, of the individual contaminants in the water, and of the zero valent metal composite, within the catalytic reaction zone or region; and depends upon the tertiary parameters which correspond to the just indicated primary and secondary parameters, but with respect to other material(s) possibly present throughout, or/and in the immediate vicinity surrounding, the catalytic reaction zone or region.

For implementing the present invention, preferably, the manner of exposure is such that the contaminated water, for example, in the form of contaminated sub-surface water, surface water, or above-surface water, naturally or forcibly, flows through, and is brought into physicochemical contact with, the zero valent metal composite while the zero valent metal composite remains essentially stationary. Moreover, preferably, the manner of exposure is such that the volumetric flow rate of the contaminated water, naturally or forcibly, flowing through the zero valent metal composite is at least equal to or larger than the volumetric flow rate of the contaminated water, naturally or forcibly, flowing through the ground or material immediately surrounding the zero valent metal composite. Accordingly, preferably, the manner of exposure is such that the permeability, k, of the zero valent metal composite is at least equal to or larger than the permeability, k, of the ground or material immediately surrounding the zero valent metal composite. Preferably, exposing the contaminated water to the zero valent metal composite is performed in a manner, for example, under anaerobic conditions, such that only contaminant species in the contaminated water, and not non-contaminant species (such as oxygen gas) in the contaminated water or/and in the immediate vicinity of the contaminated water, are catalytically reduced by the zero valent metal particles in the composite.

As described hereinbelow and illustrated in FIGS. 4-8, such preferred ways of exposing the contaminated water to the zero valent metal composite are applicable to any of several different embodiments of the system of the present invention wherein the zero valent metal composite is contained in at least one unit located in a flow path as part of an overall system used for processing or treating the contaminated water.

For implementing the method for catalytically treating contaminated water, a system (further described hereinbelow and illustrated in FIGS. 4-8) can be used, which preferably includes any of the hereinabove previously described embodiments of the zero valent metal composite, and at least one unit, for example, in the form of at least part of a sub-surface water permeable reactive barrier (PRB) configured as a continuous filled in trench, wall, or well, or, in the form of part of a sub-surface water or above-surface water pumping and treatment system, for containing the catalytically effective amount of the zero valent metal composite, for exposing the contaminated water to the zero valent metal composite.

The hereinabove illustratively described method for catalytically treating contaminated water, of the present invention, is generally applicable to (in-situ or ex-situ) catalytically treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants. The method for catalytically treating contaminated water, of the present invention, is particularly applicable to (in-situ or ex-situ) catalytically treating such forms of contaminated water wherein the water contaminants are organic species, for example, halogenated organic compounds and halogen containing degradation products thereof; inorganic species, for example, metal elements, metal element containing inorganic species, nonmetal elements, and nonmetal element containing inorganic species; or any combination thereof. The method for catalytically treating contaminated water, of the present invention, is also applicable to (in-situ or ex-situ) catalytically treating contaminated non-aqueous fluids (in liquid, vapor, or/and gaseous forms), for decreasing contaminant concentrations therefrom.

According to another main aspect of the present invention, the system for catalytically treating contaminated water includes the main components of: (a) a zero valent metal composite comprised of a powdered diatomite matrix on or/and in which is incorporated zero valent metal particles having a size in a range of between about 1 nm and about 1000 nm and at least one electron transfer mediator, and (b) at least one unit for containing a catalytically effective amount of the zero valent metal composite, for exposing the contaminated water to the zero valent metal composite. Use of the system of the present invention results in decreasing the concentration of at least one contaminant in the contaminated water.

In the same manner as for the method for catalytically treating contaminated water, of the present invention, the system for catalytically treating contaminated water, of the present invention, is readily implemented by using any of the hereinabove previously described embodiments of the zero valent metal composite of the present invention. In particular, a zero valent metal composite composed of a powdered diatomite matrix on or/and in which is incorporated zero valent metal particles having a size in a range of between about 1 nm and about 1000 nm and at least one electron transfer mediator, or, alternatively, a zero valent metal composite composed of a composition consisting essentially of a powdered diatomite matrix on or/and in which is incorporated zero valent metal particles having a size in a range of between about 1 nm and about 1000 nm and at least one electron transfer mediator, or, alternatively, a zero valent metal composite composed of a powdered diatomite matrix on or/and in which is incorporated zero valent metal particles having a size in a range of between about 1 nm and about 1000 nm and at least one electron transfer mediator, and additionally includes vermiculite.

Accordingly, the zero valent metal used for implementing the system for catalytically treating contaminated water has the hereinabove previously described and numerically valued structural properties and parameters, in particular, particle size, pore size, and weight (mass) percent, of the components (powdered diatomite matrix, nanometer sized zero valent metal particles, at least one electron transfer mediator, and, optionally, vermiculite) of the zero valent metal composite, and has the hereinabove previously described and numerically valued physicochemical property or parameter of permeability, k. Moreover, the zero valent metal used for catalytically treating contaminated water is characterized by the hereinabove previously described selected details regarding the chemical bonding between the components of the zero valent metal composite, and is characterized by the hereinabove previously described selected details regarding the functions of the components (powdered diatomite matrix, zero valent metal particles, electron transfer mediator, and, optionally, vermiculite) of the zero valent metal composite.

For implementing the method and system for catalytically treating contaminated water, of the present invention, an in-situ unit is essentially physically (spatially) situated or located, and operative, at or within the actual site, place, or location, of the contaminated water, during the catalytic treatment (remediation, purification) process. Accordingly, an in-situ unit is in hydrodynamic communication with the contaminated water by means associated with, and corresponding to, the coinciding (generally same) physical (spatial) locations of the in-situ unit and the contaminated water. An ex-situ unit is essentially physically (spatially) situated or located, and operative, out of or away from the actual site, place, or location, of the contaminated water, during the catalytic treatment (remediation, purification) process. Accordingly, an ex-situ unit is in hydrodynamic communication with the contaminated water by means associated with, and corresponding to, the non-coinciding (generally separate) physical (spatial) locations of the ex-situ unit and the contaminated water.

Reference is again made to FIGS. 4-8, wherein are shown exemplary applicable in-situ and ex-situ units for containing the catalytically effective amount of the zero valent metal composite. An in-situ unit is in a form as at least part of a sub-surface water permeable reactive barrier (PRB) configured as a continuous filled in trench or wall (for example, in-situ unit 20 (FIG. 4)), or as a stand-alone filled in well (for example, in-situ units 30 (FIG. 5)), or in a form as part of a sub-surface water pumping and treatment system (for example, in-situ unit 32 (FIG. 6)). An exemplary applicable ex-situ unit for containing the catalytically effective amount of the zero valent metal composite is in a form as part of an above-surface water pumping and treatment reactor system (for example, ex-situ unit 48 (FIG. 7)). For treating contaminated water particularly being as a form of water vapor or/and gaseous water, an exemplary applicable in-situ or ex-situ unit for containing the zero valent metal composite is in a form as part of a variably locatable (sub-surface or above-surface) water treatment reactor system (for example, in-situ or ex-situ unit 70 (FIG. 8)).

As used herein, consistent with that used in the art of contaminated sub-surface water treatment (remediation, purification), a sub-surface permeable reactive barrier (PRB) is a closed or open structure or configuration, such as a filled in trench, wall, or well, or a system of several closed or/and open structures or configurations, that provides passive interception and in-situ treatment of contaminated sub-surface water (e.g., ground water, aquifer water). A sub-surface permeable reactive barrier is characterized by having a permeable zone containing or creating a reactive treatment area, including a highly reactive material, for example, zero valent metal (ZVM) particles, and optionally, also including one or more less reactive, inactive, or/and non-reactive, materials, oriented to intercept and remediate or purify a sub-surface water (e.g., ground water, aquifer water) contaminant plume (i.e., a specific sub-surface region or zone concentrated with contaminants), by direct exposure of the water contaminants to the reactive material.

Ideally, a sub-surface permeable reactive barrier provides a preferential flow path of the contaminated sub-surface water (e.g., ground water, aquifer water) through the reactive material, and the other possibly present materials, and degrades, transforms, or/and converts, the water contaminants into environmentally acceptable (non-hazardous or/and less hazardous) species which exit the barrier, while minimally disrupting natural flow of the sub-surface water (e.g., ground water, aquifer water). Typically, the contaminated sub-surface water (e.g., ground water, aquifer water) flows by natural flow (pressure or current) gradients through the sub-surface PRB, however, pumping schemes configured upstream, within, or/and downstream, the sub-surface PRB, can also be used for implementing a sub-surface PRB setup. A sub-surface PRB can be installed as a permanent or semi-permanent closed or open structure or configuration spanning along or/and across the flow path of a sub-surface water contaminant plume. Alternatively, a sub-surface PRB can be installed as a construction or configuration as part of an in-situ reactor which is readily accessible to facilitate the removal or/and replacement of the spent (deactivated) reactive zero valent metal material, and the other possibly present materials.

Reference is made to FIGS. 4-8, which are schematic diagrams each illustrating a cut-away view of different exemplary specific preferred embodiments of implementing the method and system for catalytically treating contaminated water, of the present invention.

Figure 4:
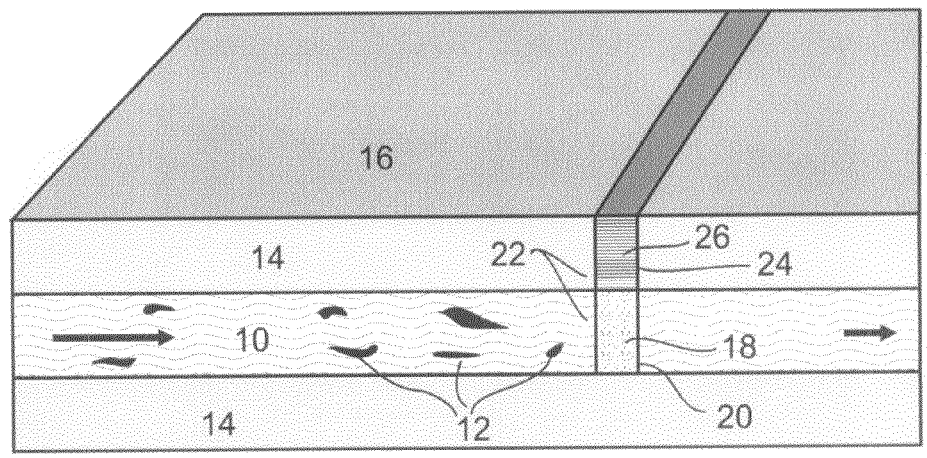
FIG. 4 is a schematic diagram illustrating a cut-away view of exemplary specific preferred embodiments of implementing the method and system for catalytically treating contaminated water, according to heterogeneous catalysis, via a flow mode, wherein the contaminated water is in the form of a natural flow of sub-surface water, and the catalytically effective amount of the zero valent metal composite is dispersed throughout and contained within an in-situ unit being in a form as the lower portion of a sub-surface water permeable reactive barrier (PRB) configured as a continuous filled in trench or wall, in accordance with the present invention.

FIG. 4 is a schematic diagram illustrating a cut-away view of exemplary specific preferred embodiments of implementing the method and system for catalytically treating contaminated water, according to heterogeneous catalysis, via a flow mode, as described hereinabove. The contaminated water is in the form of a natural flow of sub-surface water, and the catalytically effective amount of the zero valent metal composite is dispersed throughout and contained within an in-situ unit being in a form as the lower portion of a sub-surface water permeable reactive barrier (PRB) configured as a continuous filled in trench or wall.

As shown in FIG. 4, sub-surface water 10, contaminated with any number and types or kinds of organic or/and inorganic chemical contaminants 12 (indicated in 10 by the filled in irregularly shaped forms), naturally flows (indicated in 10 by the arrows pointing toward the right direction) between sub-surface regions 14, located beneath top surface region 16. A catalytically effective amount of zero valent metal composite 18 is dispersed throughout and contained within an in-situ unit 20 being in a form as the lower portion of a sub-surface water permeable reactive barrier (PRB) 22 configured as a continuous filled in trench or wall, whose upper portion 24 is filled with an inactive or/and a non-reactive filler material 26.

In-situ unit 20 is structured and functions for containing the catalytically effective amount of zero valent metal composite 18, and for enabling the exposing of the natural flow of contaminated sub-surface water (10 plus 12) to the catalytically effective amount of zero valent metal composite 18. Moreover, in-situ unit 20 is structured and functions according to heterogeneous catalysis, via a flow mode. The various heterogeneous catalytic reaction processes take place (under reducing (anaerobic or anoxic) conditions) within the flowing contaminated sub-surface water (10 plus 12), for heterogeneously catalytically treating the flowing contaminated sub-surface water (10 plus 12), to thereby decrease the concentration of at least one of chemical contaminants 12 in contaminated sub-surface water (10 plus 12). Accordingly, flowing sub-surface water 10 exiting (to the right of) in-situ unit 20 has been catalytically treated (remediated or purified) with respect to a decrease in concentration of at least one of chemical contaminants 12.

Figure 5:
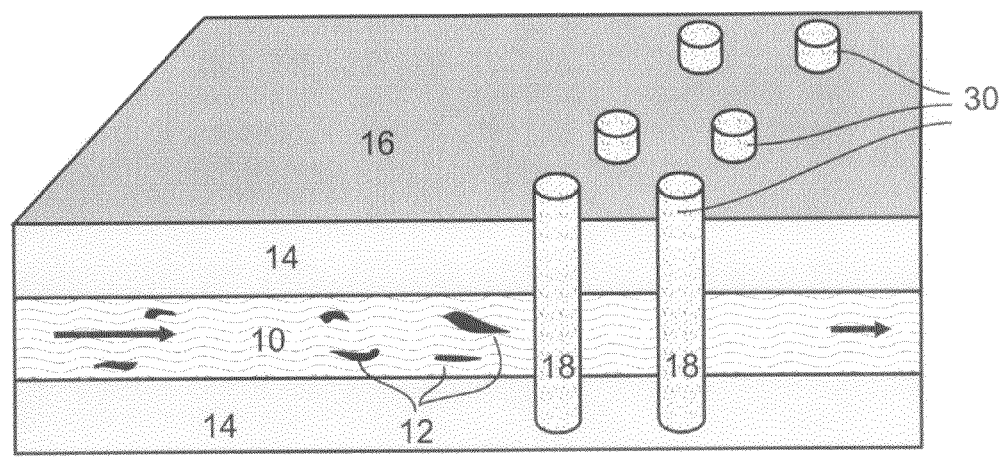
FIG. 5 is a schematic diagram illustrating a cut-away view of exemplary specific preferred embodiments of implementing the method and system for catalytically treating contaminated water, according to heterogeneous catalysis, via a flow mode, wherein the contaminated water is in the form of a natural flow of sub-surface water, and the catalytically effective amount of the zero valent metal composite is dispersed throughout and contained within each of a plurality of in-situ units each being in a form as a sub-surface water permeable reactive barrier (PRB) configured as a stand-alone filled in well, in accordance with the present invention.

FIG. 5 is a schematic diagram illustrating a cut-away view of exemplary specific preferred embodiments of implementing the method and system for catalytically treating contaminated water, according to heterogeneous catalysis, via a flow mode, as described hereinabove. The contaminated water is in the form of a natural flow of sub-surface water, and the catalytically effective amount of the zero valent metal composite is dispersed throughout and contained within each of a plurality of in-situ units each being in a form as a sub-surface water permeable reactive barrier (PRB) configured as a stand-alone filled in well.

As shown in FIG. 5, sub-surface water 10, contaminated with any number and types or kinds of organic or/and inorganic chemical contaminants 12 (indicated in 10 by the filled in irregularly shaped forms), naturally flows (indicated in 10 by the arrows pointing toward the right direction) between sub-surface regions 14, located beneath top surface region 16. A catalytically effective amount of zero valent metal composite 18 is dispersed throughout and contained within each of a plurality of (for example, six) in-situ units 30 each being in a form as a sub-surface water permeable reactive barrier (PRB) configured as a stand-alone filled in well.

Each of the in-situ units 30 is structured and functions for containing the catalytically effective amount of zero valent metal composite 18, and for enabling the exposing of the natural flow of contaminated sub-surface water (10 plus 12) to the catalytically effective amount of zero valent metal composite 18. Moreover, each of the in-situ units 30 is structured and functions according to heterogeneous catalysis, via a flow mode. The various heterogeneous catalytic reaction processes take place (under reducing (anaerobic or anoxic) conditions) within the flowing contaminated sub-surface water (10 plus 12), for heterogeneously catalytically treating the flowing contaminated sub-surface water (10 plus 12), to thereby decrease the concentration of at least one of chemical contaminants 12 in contaminated sub-surface water (10 plus 12). Accordingly, flowing sub-surface water 10 exiting (to the right of) in-situ units 30 has been catalytically treated (remediated or purified) with respect to a decrease in concentration of at least one of chemical contaminants 12.

Figure 6:
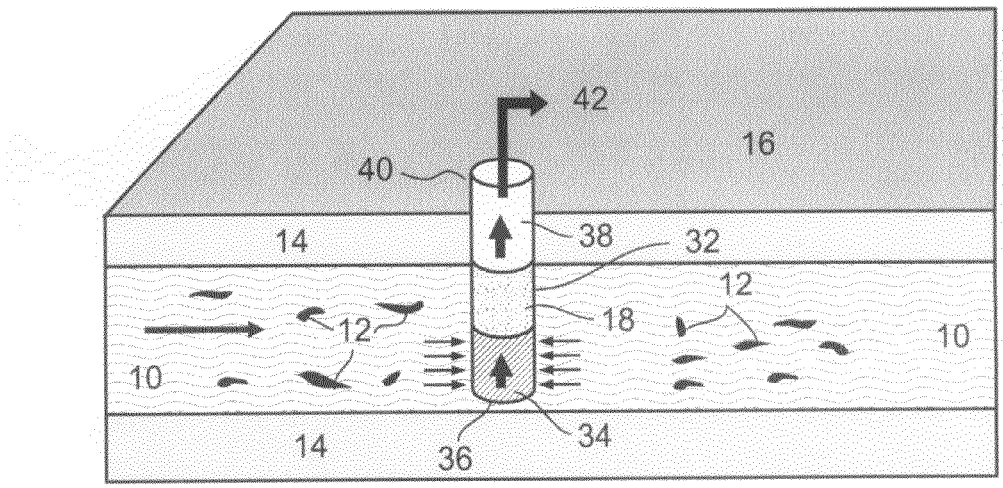
FIG. 6 is a schematic diagram illustrating a cut-away view of exemplary specific preferred embodiments of implementing the method and system for catalytically treating contaminated water, according to heterogeneous catalysis, via a flow mode, wherein the contaminated water is in the form of a natural flow of sub-surface water, and the catalytically effective amount of the zero valent metal composite is dispersed throughout and contained within an in-situ unit being in a form as part of a sub-surface water pumping and treatment system, in accordance with the present invention.

FIG. 6 is a schematic diagram illustrating a cut-away view of exemplary specific preferred embodiments of implementing the method and system for catalytically treating contaminated water, according to heterogeneous catalysis, via a flow mode, as described hereinabove. The contaminated water is in the form of a natural and forced flow of sub-surface water, and the catalytically effective amount of the zero valent metal composite is dispersed throughout and contained within an in-situ unit being in a form as part of a sub-surface water pumping and treatment system.

As shown in FIG. 6, sub-surface water 10, contaminated with any number and types or kinds of organic or/and inorganic chemical contaminants 12 (indicated in 10 by the filled in irregularly shaped forms), in addition to any possible natural flow (indicated in 10 by the single arrow pointing towards the right direction), forcibly flows, via pumping by a sub-surface water pumping device 36, (indicated in 10 by the two sets of arrows each pointing towards water pumping device 36) between sub-surface regions 14, located beneath top surface region 16. A catalytically effective amount of zero valent metal composite 18 is dispersed throughout and contained within an in-situ unit 32 being in a form as the middle part of a sub-surface water pumping and treatment system (36, 32, and 40).

Contaminated sub-surface water (10 plus 12) is pumped and forcibly flows, into and through the volume and contents 34 of sub-surface water pumping device 36, via pumping by water pumping device 36 located at the lower portion of sub-surface water pumping and treatment system (36, 32, and 40). Contaminated sub-surface water (10 plus 12) is then pumped and forcibly flows upward, into, and through, the catalytically effective amount of zero valent metal composite 18 contained within in-situ unit 32 located in the middle portion of sub-surface water pumping and treatment system (36, 32, and 40). Catalytically treated (remediated or purified) sub-surface water 10 is then pumped and forcibly flows upward, into, and through, the volume and contents 38 of a treated water collection/passage chamber 40 located in the upper portion of sub-surface water pumping and treatment system (36, 32, and 40). The catalytically treated sub-surface water 10 then exits through the top portion of treated water collection/passage chamber 40, as indicated by 42.

In-situ unit 32 is structured and functions for containing the catalytically effective amount of zero valent metal composite 18, and for enabling the exposing of the natural and forced flow of contaminated sub-surface water (10 plus 12) to the catalytically effective amount of zero valent metal composite 18, under reducing (anaerobic or anoxic) conditions. Moreover, in-situ unit 32 is structured and functions according to heterogeneous catalysis, via a flow mode. The various heterogeneous catalytic reaction processes take place (under reducing (anaerobic or anoxic) conditions) within the flowing contaminated sub-surface water (10 plus 12), for heterogeneously catalytically treating the flowing contaminated sub-surface water (10 plus 12), to thereby decrease the concentration of at least one of chemical contaminants 12 in contaminated sub-surface water (10 plus 12). Accordingly, flowing sub-surface water 42 exiting through the top portion of treated water collection/passage chamber 40 has been catalytically treated (remediated or purified) with respect to a decrease in concentration of at least one of chemical contaminants 12.

Figure 7:
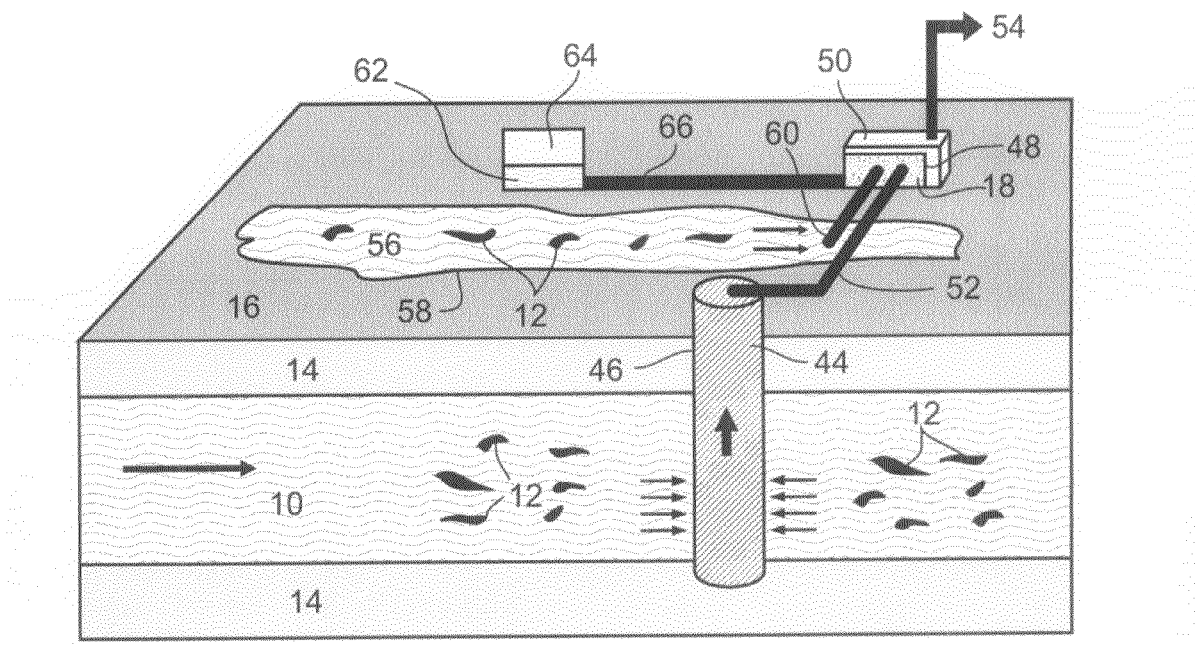
FIG. 7 is a schematic diagram illustrating a cut-away view of three exemplary specific configurations, of exemplary specific preferred embodiments of implementing the method and system for catalytically treating contaminated water, according to heterogeneous catalysis, via a batch or flow mode, wherein the contaminated water is in the form(s) of (natural or/and forced) flow of sub-surface water, surface water, or/and above-surface water, and the catalytically effective amount of the zero valent metal composite is dispersed throughout and contained within an ex-situ unit being in a form as part of an above-surface water treatment reactor system, in accordance with the present invention.

FIG. 7 is a schematic diagram illustrating a cut-away view of three exemplary specific configurations, of exemplary specific preferred embodiments of implementing the method and system for catalytically treating contaminated water, according to heterogeneous catalysis, via a batch or flow mode, as described hereinabove. The contaminated water is in the form(s) of (natural or/and forced) flow of sub-surface water, surface water, or/and above-surface water, and the catalytically effective amount of the zero valent metal composite is dispersed throughout and contained within an ex-situ unit being in a form as part of an above-surface water treatment reactor system.

First Configuration:

According to the first configuration shown in FIG. 7, sub-surface water 10, contaminated with any number and types or kinds of organic or/and inorganic chemical contaminants 12 (indicated in 10 by the filled in irregularly shaped forms), in addition to any possible natural flow (indicated in 10 by the single arrow pointing towards the right direction), forcibly flows, via pumping by a sub-surface water pumping device 46, (indicated in 10 by the two sets of arrows each pointing towards sub-surface water pumping device 46) between sub-surface regions 14, located beneath top surface region 16.

In the first configuration, a catalytically effective amount of zero valent metal composite 18 is contained within an ex-situ unit 48 being in a form as part of an above-surface water treatment reactor system 50. Contaminated sub-surface water (10 plus 12) is pumped and forcibly flows, into and through the volume and contents 44 of sub-surface water pumping device 46, from sub-surface water pumping device 46, via a water transport line (pipe) 52, into ex-situ unit 48 of above-surface water treatment reactor system 50, and is then exposed to the catalytically effective amount of zero valent metal composite 18. Catalytically treated (remediated or purified) sub-surface water 10 then exits out of above-surface water treatment reactor system 50, as indicated by 54.

Ex-situ unit 48 is structured and functions for containing the catalytically effective amount of zero valent metal composite 18, and for enabling the exposing of the natural and forced flow of contaminated sub-surface water (10 plus 12) to the catalytically effective amount of zero valent metal composite 18, under reducing (anaerobic or anoxic) conditions. Moreover, ex-situ unit 48 is structured and functions according to heterogeneous catalysis, via a batch or flow mode. The various heterogeneous catalytic reaction processes take place (under reducing (anaerobic or anoxic) conditions) within a batch or flow of the contaminated sub-surface water (10 plus 12), for heterogeneously catalytically treating the flowing contaminated sub-surface water (10 plus 12), to thereby decrease the concentration of at least one of chemical contaminants 12 in contaminated sub-surface water (10 plus 12). Accordingly, sub-surface water 54 exiting out of above-surface water treatment reactor system 50 has been catalytically treated (remediated or purified) with respect to a decrease in concentration of at least one of chemical contaminants 12.

Second Configuration:

According to the second configuration shown in FIG. 7, surface water 56, for example, of a river, stream, lake, pond, pool, surface water reservoir, or, well or spring, whose top or uppermost surface is located at about ground or earth level, herein, generally indicated as 58, contaminated with any number and types or kinds of organic or/and inorganic chemical contaminants 12 (indicated in 56 by the filled in irregularly shaped forms), is located along top surface region 16.

In the second configuration, the catalytically effective amount of zero valent metal composite 18 is dispersed throughout and contained within an ex-situ unit 48 being in a form as part of an above-surface water treatment reactor system 50. Contaminated surface water (56 plus 12), in addition to any possible natural flow (indicated in 56 by the two arrows pointing toward the right direction), is pumped and forcibly flows, from river, stream, lake, pond, pool, surface water reservoir, or, well or spring, 58, via a water transport line (pipe) 60, into ex-situ unit 48 of above-surface water treatment reactor system 50, and is then exposed to the catalytically effective amount of zero valent metal composite 18. Catalytically treated (remediated or purified) surface water 56 then exits out of above-surface water treatment reactor system 50, as indicated by 54.

Ex-situ unit 48 is structured and functions for containing the catalytically effective amount of zero valent metal composite 18, and for enabling the exposing of the natural and forced flow of contaminated surface water (56 plus 12) to the catalytically effective amount of zero valent metal composite 18, under reducing (anaerobic or anoxic) conditions. Moreover, ex-situ unit 48 is structured and functions according to heterogeneous catalysis, via a batch or flow mode. The various heterogeneous catalytic reaction processes take place (under reducing (anaerobic or anoxic) conditions) within a batch or flow of the contaminated surface water (56 plus 12), for heterogeneously catalytically treating the flowing contaminated surface water (56 plus 12), to thereby decrease the concentration of at least one of chemical contaminants 12 in contaminated surface water (56 plus 12). Accordingly, surface water 56 exiting out of above-surface water treatment reactor system 50 has been catalytically treated (remediated or purified) with respect to a decrease in concentration of at least one of chemical contaminants 12.

Third Configuration:

According to the third configuration shown in FIG. 7, above-surface water 62, for example, of an above-surface water reservoir, or of an above-surface source or supply of residential or commercial drinking water, herein, generally indicated as 64, contaminated with contaminated with any number and types or kinds of organic or/and inorganic chemical contaminants 12 (present, but not indicated, in 62, in FIG. 7) is located on and above top surface region 16.

In the third configuration, the catalytically effective amount of zero valent metal composite 18 is dispersed throughout and contained within an ex-situ unit 48 being in a form as part of an above-surface water treatment reactor system 50. Contaminated above-surface water (62 plus 12) is pumped and forcibly flows, from above-surface water reservoir, or above-surface source or supply of residential or commercial drinking water, 64, via a water transport line (pipe) 66, into ex-situ unit 48 of above-surface water treatment reactor system 50, and is then exposed to the catalytically effective amount of zero valent metal composite 18. Catalytically treated (remediated or purified) above-surface water 62 then exits out of above-surface water treatment reactor system 50, as indicated by 54.

Ex-situ unit 48 is structured and functions for containing the catalytically effective amount of zero valent metal composite 18, and for enabling the exposing of the natural and forced flow of contaminated above-surface water (62 plus 12) to the catalytically effective amount of zero valent metal composite 18, under reducing (anaerobic or anoxic) conditions. Moreover, ex-situ unit 48 is structured and functions according to heterogeneous catalysis, via a batch or flow mode. The various heterogeneous catalytic reaction processes take place (under reducing (anaerobic or anoxic) conditions) within a batch or flow of the contaminated above-surface water (62 plus 12), for heterogeneously catalytically treating the flowing contaminated above-surface water (62 plus 12), to thereby decrease the concentration of at least one of chemical contaminants 12 in contaminated above-surface water (62 plus 12). Accordingly, above-surface water 62 exiting out of above-surface water treatment reactor system 50 has been catalytically treated (remediated or purified) with respect to a decrease in concentration of at least one of chemical contaminants 12.

Figure 8:
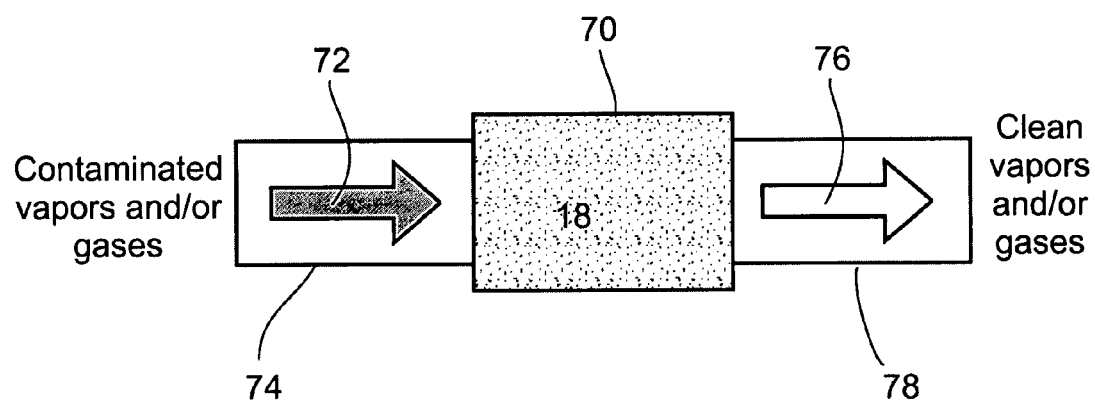
FIG. 8 is a schematic diagram illustrating a cut-away view of exemplary specific preferred embodiments of implementing the method and system for catalytically treating contaminated water, according to heterogeneous catalysis, via a flow mode, wherein the contaminated water is in the form of water vapor or/and gaseous water, and the catalytically effective amount of the zero valent metal composite is dispersed throughout and contained within an in-situ or ex-situ unit being in a form as part of a variably locatable (sub-surface or above-surface) water treatment reactor system, in accordance with the present invention.

FIG. 8 is a schematic diagram illustrating a cut-away view of exemplary specific preferred embodiments of implementing the method and system for catalytically treating contaminated water, according to heterogeneous catalysis, via a flow mode, as described hereinabove. The contaminated water is in the form of water vapor or/and gaseous water, and the catalytically effective amount of the zero valent metal composite is dispersed throughout and contained within an in-situ or ex-situ unit being in a form as part of a variably locatable (sub-surface or above-surface) water treatment reactor system.

As shown in FIG. 8, contaminated water 72, in the form(s) of water vapor or/and gaseous water (which may also include non-water (i.e., non-aqueous) vapor or/and gaseous species as part of a multi-component, multi-phase, vapor or/and gas mixture), contaminated with any number and types or kinds of organic or/and inorganic chemical contaminants, naturally or/and forcibly flows (as indicated by the filled in arrow pointing towards the right direction), into a variably locatable (sub-surface or above-surface) water treatment reactor system (74, 70, and 78). A catalytically effective amount of zero valent metal composite 18 is dispersed throughout and contained within an in-situ or ex-situ unit 70 being in a form as part of variably locatable (sub-surface or above-surface) water treatment reactor system (74, 70, and 78).

Contaminated water vapor or/and gaseous water 72 naturally or/and forcibly flows into and through contaminated water vapor or/and gaseous water input chamber or module 74, and then into and through zero valent metal composite 18 dispersed throughout and contained within in-situ or ex-situ unit 70. Catalytically treated (remediated or purified) water vapor or/and gaseous water 76 then naturally or/and forcibly flows (as indicated by the non-filled in arrow pointing towards the right direction) into, through, and exits out of, treated water vapor or/and gaseous water output chamber or module 78, of (sub-surface or above-surface) water treatment reactor system (74, 70, and 78).

In-situ or ex-situ unit 70 is structured and functions for containing the catalytically effective amount of zero valent metal composite 18, and for enabling the exposing of the natural or/and forced flow of contaminated water vapor or/and gaseous water 72 to the catalytically effective amount of zero valent metal composite 18, under reducing (anaerobic or anoxic) conditions. Moreover, in-situ or ex-situ unit 70 is structured and functions according to heterogeneous catalysis, via a flow mode. The various heterogeneous catalytic reaction processes take place (under reducing (anaerobic or anoxic) conditions) within the flowing contaminated water vapor or/and gaseous water 72, for heterogeneously catalytically treating the flowing contaminated water vapor or/and gaseous water 72, to thereby decrease the concentration of at least one of the chemical contaminants in contaminated water vapor or/and gaseous water 72. Accordingly, flowing water vapor or/and gaseous water 76 exiting (to the right of) in-situ or ex-situ unit 70 has been catalytically treated (remediated or purified) with respect to a decrease in concentration of at least one of the chemical contaminants.

It is important to emphasis that for any of the above described exemplary specific preferred embodiments of implementing the method and system for catalytically treating contaminated water, of the present invention, as illustrated in FIGS. 4-8, according to heterogeneous catalysis, via a flow or batch mode, the in-situ or ex-situ unit is structured and functions according to heterogeneous catalysis, via a flow or batch mode. The inclusion of the zero valent metal particles (functioning as a bulk electron donor or reducing agent) in the zero valent metal composite provides for, and enables, the various heterogeneous catalytic reaction processes to take place under reducing (anaerobic or anoxic) conditions within a flow or batch of the contaminated water, for heterogeneously catalytically treating the flow or batch of contaminated above-surface water, to thereby decrease the concentration of at least one of the chemical contaminants in the contaminated water. Accordingly, exposure of the contaminated water to the catalytically effective amount of the zero valent metal composite takes place under reducing (anaerobic or anoxic) conditions, i.e., as opposed to oxidizing conditions.

As for the hereinabove illustratively described corresponding method, the hereinabove illustratively described system for catalytically treating contaminated water, of the present invention, is generally applicable to (in-situ or ex-situ) catalytically treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants. The system for catalytically treating contaminated water, of the present invention, is particularly applicable to (in-situ or ex-situ) catalytically treating such forms of contaminated water wherein the water contaminants are organic species, for example, halogenated organic compounds and halogen containing degradation products thereof; inorganic species, for example, metal elements, metal element containing inorganic species, non-metal elements, and nonmetal element containing inorganic species; or any combination thereof. The system for catalytically treating contaminated water, of the present invention, is also applicable to (in-situ or ex-situ) catalytically treating contaminated non-aqueous fluids (in liquid, vapor, or/and gaseous forms), for decreasing contaminant concentrations therefrom.

In general, for any of the above described exemplary specific preferred embodiments of implementing the method and system for catalytically treating contaminated water, of the present invention, of the present invention, as illustrated in FIGS. 4-8, according to heterogeneous catalysis, via a flow or batch mode, following heterogeneous catalytic treatment of the contaminated water, the zero valent metal composite 18 can be removed from the associated in-situ unit(s) [e.g., in-situ unit 20 (FIG. 4), in-situ units 30 (FIG. 5), in-situ unit 32 (FIG. 6), in-situ unit 70 (FIG. 8)], or ex-situ unit(s) [e.g., ex-situ unit 48 (FIG. 7), ex-situ unit 70 (FIG. 8)] used for treating the contaminated water, and be recycled for again treating contaminated water. Such recycling can include, for example, subjecting the zero valent metal composite 18 to a cleaning procedure, involving selective removal of the adsorbed contaminants from the solid support or matrix, while non-destructively handling and processing the solid support or matrix.

According to another aspect of the present invention, there is provided an article-of-manufacture including a packaging material, and the hereinabove illustratively described zero valent metal composite composed of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water.

According to another aspect of the present invention, there is provided a an article-of-manufacture including a packaging material, and the hereinabove illustratively described zero valent metal composite composed of a composition consisting essentially of a powdered diatomite matrix on or/and in which is incorporated zero valent metal particles having a size in a range of between about 1 nm and about 1000 nm and at least one electron transfer mediator, being contained within the packaging material, the composite being identified for use in catalytically treating contaminated water.

In general, any of the above illustratively described embodiments or formulations of the zero valent metal composite, of the present invention, is suitable as being contained within the packaging material of the article-of-manufacture, wherein the composite is identified for use in catalytically treating contaminated water. During such use, a catalytically effective amount of the zero valent metal composite is exposed to the contaminated water, to thereby decrease concentration of at least one contaminant in the contaminated water.

For each embodiment of the article-of-manufacture, preferably, the packaging material is made and constructed of materials which are inert to, and minimally, if at all, 'chemically' interact with, any of the components of the zero valent metal composite.

Above illustratively described novel and inventive aspects and characteristics, and advantages thereof, of the present invention further become apparent to one ordinarily skilled in the art upon examination of the following examples, which are not intended to be limiting. Additionally, each of the various embodiments and aspects of the present invention as delineated herein above and as claimed in the claims section below finds experimental support in the following examples.

EXAMPLES

Reference is now made to the following examples, Examples 1-9, which together with the above descriptions, illustrate the invention in a non-limiting fashion.

Example 1

Manufacturing (Synthesis) of a Zero Valent Metal Composite (without Vermiculite)

A zero valent metal composite was manufactured (synthesized) according to the hereinabove described exemplary preferred embodiment of the manufacturing method (without optional addition of vermiculite). The zero valent metal composite was a zero valent iron (ZVI) composite composed of a powdered diatomite matrix on or/and in which is incorporated zero valent iron particles having a size in a range of between about 1 nm and about 1000 nm and vitamin $B_{12}$.

Preparation of an Aqueous Solution of a Metal Salt:

An iron metal alkali salt, ferric (iron (III)) chloride hexahydrate ($FeCl_3 \cdot 6H_2O$) (0.1 mole), was dissolved in water (100 ml). The aqueous solution of the ferric chloride was placed in a 500 ml filter flask in an anaerobic chamber.

Preparation of an Aqueous Solution of the Electron Transfer Mediator:

The electron transfer mediator used in the synthesis was the porphyrinogenic organometallic complex, being the metallocorrin complex, vitamin $B_{12}$. A 2 mM aqueous solution of vitamin $B_{12}$ was prepared.

Addition of the Aqueous Solution of the Electron Transfer Mediator to the Aqueous Solution of the Metal Salt, for Forming an Aqueous Solution of the Metal Salt and the Electron Transfer Mediator:

A volume (9.31 ml) of the 2 mM aqueous solution of vitamin $B_{12}$ was added to the aqueous solution of the ferric chloride, for forming an aqueous solution of the ferric chloride and the vitamin $B_{12}$.

Addition of a Powdered Form of Diatomite (Kieselguhr) to the Aqueous Solution of the Metal Salt and the Electron Transfer Mediator, for Forming an Aqueous Slurry of the Metal Salt, the Electron Transfer Mediator, and the Powdered Diatomite Matrix:

A powdered form of diatomite (kieselguhr) (about 1 mole) was added to the aqueous solution of the ferric chloride and the vitamin $B_{12}$, for forming an aqueous slurry of the ferric chloride, the vitamin $B_{12}$, and the powdered diatomite matrix. Additional water (100 ml) was added to the aqueous slurry which was initially formed upon commencing addition of the powdered form of the diatomite. The aqueous slurry of the ferric chloride, the vitamin $B_{12}$, and the powdered diatomite matrix, was of a consistency which could be mixed by magnetic stirring. The aqueous slurry was then placed in a fume hood and mixed by a magnetic stirrer.

Preparation of an Aqueous Solution of a Strong Reducing Agent:

An aqueous solution of a strong reducing agent was prepared by dissolving sodium borohydride ($NaBH_4$) (0.3 mole) in water (100 ml), in an amber bottle, which was placed in an anaerobic chamber.

Forming and Initiating Reaction of a Redox Reaction Mixture of the Aqueous Slurry of the Metal Salt, the Electron Transfer Mediator, and the Powdered Diatomite Matrix, with the Aqueous Solution of the Strong Reducing Agent:

The aqueous slurry of the ferric chloride, the vitamin $B_{12}$, and the powdered diatomite matrix, and, the aqueous solution of the sodium borohydride, were each placed on a magnetic stirrer in a fume hood. Forming and initiating reaction of the redox reaction mixture was performed by pumping and dropwise adding the aqueous solution of the sodium borohydride to the reaction vessel containing the aqueous slurry, while mixing, and supplying nitrogen inert gas to the reaction vessel for preventing intrusion of oxygen.

Allowing the Redox Reaction Mixture to React to Completion, for Forming a Product Mixture of the Zero Valent Metal Composite in Water:

The redox reactive mixture was allowed to react to completion, upon delivering all of the sodium borohydride to the reaction vessel containing the aqueous slurry, for forming a product mixture of the zero valent iron composite in water.

Collecting the Zero Valent Metal Composite:

The zero valent iron (ZVI) composite was transferred to an anaerobic chamber, filtered, and then washed with water (1000 ml) and acetone (200 ml).

Drying the Collected Zero Valent Metal Composite, for Forming Dry Zero Valent Metal Composite:

The collected zero valent iron (ZVI) composite was dried in the anaerobic chamber, by using vacuum pumping. Following the drying procedure, the dry zero valent iron composite was stored in a closed container in the anaerobic chamber until needed for use.

Components of the zero valent iron composite had the following numerically valued structural properties and parameters, with respect to a 'dry basis'. Particles of the powdered diatomite matrix included in the zero valent iron composite had a particle size in a range of between about 1 micron and about 150 microns, and had a pore size in a range of between about 1 nm and about 5000 nm. Zero valent iron particles incorporated on or/and in the powdered diatomite matrix of the zero valent iron composite had a concentration, in terms of weight (mass) percent, of about 7.7%. The vitamin $B_{12}$ electron transfer mediator incorporated on or/and in the powdered diatomite matrix of the zero valent iron composite had a concentration, in terms of weight percent, of about 0.038%.

Example 2

Manufacturing (Synthesis) of a Zero Valent Metal Composite (Including Vermiculite)

A zero valent metal composite was manufactured (synthesized) according to the hereinabove described first exemplary alternative preferred embodiment of the manufacturing method (with optional addition of vermiculite), i.e., including the optional procedure of adding vermiculite to the aqueous solution of the metal salt, for forming a mixture of the vermiculite and the aqueous solution of the metal salt. The zero valent metal composite was a zero valent iron (ZVI) composite composed of a powdered diatomite matrix on or/and in which is incorporated zero valent iron particles having a size in a range of between about 1 nm and about 1000 nm and vitamin $B_{12}$, and included vermiculite.

Preparation of an Aqueous Solution of a Metal Salt:

An iron metal alkali salt, ferric (iron (III)) chloride hexahydrate ($FeCl_3 \cdot 6H_2O$) (0.1 mole), was dissolved in water (100 ml). The aqueous solution of the ferric chloride was placed in a 500 ml filter flask in an anaerobic chamber.

Addition of Vermiculite to the Aqueous Solution of the Metal Salt, for Forming a Mixture of the Vermiculite and the Aqueous Solution of the Metal Salt:

Vermiculite (0.02 mole) was added to the aqueous solution of the ferric chloride, for forming a mixture of the vermiculite and the aqueous solution of the ferric chloride.

Preparation of an Aqueous Solution of the Electron Transfer Mediator:

The electron transfer mediator used in the synthesis was the porphyrinogenic organometallic complex, being the metallocorrin complex, vitamin $B_{12}$. A 2 mM aqueous solution of vitamin $B_{12}$ was prepared.

Addition of the Aqueous Solution of the Electron Transfer Mediator to the Mixture of the Vermiculite and the Aqueous Solution of the Metal Salt, for Forming a Mixture of the Vermiculite and an Aqueous Solution of the Metal Salt and the Electron Transfer Mediator:

A volume (9.31 ml) of the 2 mM aqueous solution of vitamin $B_{12}$ was added to the mixture of the vermiculite and the aqueous solution of the ferric chloride, for forming a mixture of the vermiculite and an aqueous solution of the ferric chloride and the vitamin $B_{12}$.

Addition of a Powdered Form of Diatomite (Kieselguhr) to the Mixture of the Vermiculite and the Aqueous Solution of the Metal Salt and the Electron Transfer Mediator, for Forming a Mixture of the Vermiculite and an Aqueous Slurry of the Metal Salt, the Electron Transfer Mediator, and the Powdered Diatomite Matrix:

A powdered form of diatomite (kieselguhr) (about 1 mole) was added to the mixture of the vermiculite and the aqueous solution of the ferric chloride and the vitamin $B_{12}$, for forming a mixture of the vermiculite and an aqueous slurry of the ferric chloride, the vitamin $B_{12}$, and the powdered diatomite matrix. Additional water (100 ml) was added to the aqueous slurry which was initially formed upon commencing addition of the powdered form of the diatomite. The mixture of the vermiculite and the aqueous slurry of the ferric chloride, the vitamin $B_{12}$, and the powdered diatomite matrix, was of a consistency which could be mixed by magnetic stirring. The mixture of the vermiculite and the aqueous slurry was then placed in a fume hood and mixed by a magnetic stirrer.

Preparation of an Aqueous Solution of a Strong Reducing Agent:

An aqueous solution of a strong reducing agent was prepared by dissolving sodium borohydride ($NaBH_4$) (0.3 mole) in water (100 ml), in an amber bottle, which was placed in an anaerobic chamber.

Forming and Initiating Reaction of a Redox Reaction Mixture of the Vermiculite and the aqueous slurry of the metal salt, the electron transfer mediator, and the Powdered Diatomite Matrix, with the Aqueous Solution of the Strong Reducing Agent:

The mixture of the vermiculite and the aqueous slurry of the ferric chloride, the vitamin $B_{12}$, and the powdered diatomite matrix, and, the aqueous solution of the sodium borohydride, were each placed on a magnetic stirrer in a fume hood. Forming and initiating reaction of the redox reaction mixture was performed by pumping and drop-wise adding the aqueous solution of the sodium borohydride to the reaction vessel containing the aqueous slurry, while mixing, and supplying nitrogen inert gas to the reaction vessel for preventing intrusion of oxygen.

Allowing the Redox Reaction Mixture to React to Completion, for Forming a Product Mixture of the Zero Valent Metal Composite (Including Vermiculite) in Water:

The redox reactive mixture was allowed to react to completion, upon delivering all of the sodium borohydride to the reaction vessel containing the aqueous slurry, for forming a product mixture of the zero valent iron composite (including vermiculite) in water.

Collecting the Zero Valent Metal Composite (Including Vermiculite):

The zero valent iron (ZVI) composite (including vermiculite) was transferred to an anaerobic chamber, filtered, and then washed with water (1000 ml) and acetone (200 ml).

Drying the Collected Zero Valent Metal Composite (Including Vermiculite), for Forming Dry Zero Valent Metal Composite (Including Vermiculite):

The collected zero valent iron (ZVI) composite (including vermiculite) was dried in the anaerobic chamber, by using vacuum pumping. Following the drying procedure, the dry zero valent iron composite (including vermiculite) was stored in a closed container in the anaerobic chamber until needed for use.

Components of the zero valent iron composite had the following numerically valued structural properties and parameters, with respect to a 'dry basis'. Particles of the powdered diatomite matrix included in the zero valent iron composite had a particle size in a range of between about 1 micron and about 150 microns, and had a pore size in a range of between about 1 nm and about 5000 nm. Zero valent iron particles incorporated on or/and in the powdered diatomite matrix of the zero valent iron composite had a concentration, in terms of weight (mass) percent, of about 7.7%. The vitamin $B_{12}$ electron transfer mediator incorporated on or/and in the powdered diatomite matrix of the zero valent iron composite had a concentration, in terms of weight percent, of about 0.038%.

Vermiculite additionally included in the zero valent iron composite had a piece size in a range of between about 0.01 mm and about 20.0 mm, and had a concentration, in terms of weight percent, of about 50%.

Example 3

Manufacturing (Synthesis) of a Zero Valent Metal Composite (Including Vermiculite)

A zero valent metal composite was manufactured (synthesized) according to the hereinabove described second exemplary alternative preferred embodiment of the manufacturing method (with optional addition of vermiculite), i.e., including the alternative optional procedure of adding vermiculite to the collected zero valent metal composite (absent of vermiculite), for forming the zero valent metal composite (including vermiculite). The zero valent metal composite was a zero valent iron (ZVI) composite composed of a powdered diatomite matrix on or/and in which is incorporated zero valent iron particles having a size in a range of between about 1 nm and about 1000 nm and vitamin $B_{12}$, and included vermiculite.

Preparation of an Aqueous Solution of a Metal Salt:

An iron metal alkali salt, ferric (iron (III)) chloride hexahydrate ($FeCl_3 \cdot 6H_2O$) (0.1 mole), was dissolved in water (100 ml). The aqueous solution of the ferric chloride was placed in a 500 ml filter flask in an anaerobic chamber.

Preparation of an Aqueous Solution of the Electron Transfer Mediator:

The electron transfer mediator used in the synthesis was the porphyrinogenic organometallic complex, being the metallocorrin complex, vitamin $B_{12}$. A 2 mM aqueous solution of vitamin $B_{12}$ was prepared.

Addition of the Aqueous Solution of the Electron Transfer Mediator to the Aqueous Solution of the Metal Salt, for Forming an Aqueous Solution of the Metal Salt and the Electron Transfer Mediator:

A volume (9.31 ml) of the 2 mM aqueous solution of vitamin $B_{12}$ was added to the aqueous solution of the ferric chloride, for forming an aqueous solution of the ferric chloride and the vitamin $B_{12}$.

Addition of a Powdered Form of Diatomite (Kieselguhr) to the Aqueous Solution of the Metal Salt and the Electron Transfer Mediator, for Forming an Aqueous Slurry of the Metal Salt, the Electron Transfer Mediator, and the Powdered Diatomite Matrix:

A powdered form of diatomite (kieselguhr) (about 1 mole) was added to the aqueous solution of the ferric chloride and the vitamin $B_{12}$, for forming an aqueous slurry of the ferric chloride, the vitamin $B_{12}$, and the powdered diatomite matrix. Additional water (100 ml) was added to the aqueous slurry which was initially formed upon commencing addition of the powdered form of the diatomite. The aqueous slurry of the ferric chloride, the vitamin $B_{12}$, and the powdered diatomite matrix, was of a consistency which could be mixed by magnetic stirring. The aqueous slurry was then placed in a fume hood and mixed by a magnetic stirrer.

Preparation of an Aqueous Solution of a Strong Reducing Agent:

An aqueous solution of a strong reducing agent was prepared by dissolving sodium borohydride ($NaBH_4$) (0.3 mole) in water (100 ml), in an amber bottle, which was placed in an anaerobic chamber.

Forming and Initiating Reaction of a Redox Reaction Mixture of the Aqueous Slurry of the Metal Salt, the Electron Transfer Mediator, and the Powdered Diatomite Matrix, with the Aqueous Solution of the Strong Reducing Agent:

The aqueous slurry of the ferric chloride, the vitamin $B_{12}$, and the powdered diatomite matrix, and, the aqueous solution of the sodium borohydride, were each placed on a magnetic stirrer in a fume hood. Forming and initiating reaction of the redox reaction mixture was performed by pumping and dropwise adding the aqueous solution of the sodium borohydride to the reaction vessel containing the aqueous slurry, while mixing, and supplying nitrogen inert gas to the reaction vessel for preventing intrusion of oxygen.

Allowing the Redox Reaction Mixture to React to Completion, for Forming a Product Mixture of the Zero Valent Metal Composite in Water:

The redox reactive mixture was allowed to react to completion, upon delivering all of the sodium borohydride to the reaction vessel containing the aqueous slurry, for forming a product mixture of the zero valent iron composite in water.

Collecting the Zero Valent Metal Composite:

The zero valent iron (ZVI) composite was transferred to an anaerobic chamber, filtered, and then washed with water (1000 ml) and acetone (200 ml).

Adding Vermiculite to the Collected Zero Valent Metal Composite (Absent of Vermiculite), for Forming the Zero Valent Metal Composite (Including Vermiculite):

While still in the anaerobic chamber, vermiculite (0.02 mole) was added to the vermiculite-free collected zero valent iron composite, for forming the zero valent iron composite (including vermiculite). The zero valent iron composite (including vermiculite) was washed with water (1000 ml) and acetone (200 ml).

Drying the Collected Zero Valent Metal Composite (Including Vermiculite), for Forming Dry Zero Valent Metal Composite (Including Vermiculite):

The collected zero valent iron (ZVI) composite (including vermiculite) was dried in the anaerobic chamber, by using vacuum pumping. Following the drying procedure, the dry zero valent iron composite (including vermiculite) was stored in a closed container in the anaerobic chamber until needed for use.

Components of the zero valent iron composite had the following numerically valued structural properties and parameters, with respect to a 'dry basis'. Particles of the powdered diatomite matrix included in the zero valent iron composite had a particle size in a range of between about 1 micron and about 150 microns, and had a pore size in a range of between about 1 nm and about 5000 nm. Zero valent iron particles incorporated on or/and in the powdered diatomite matrix of the zero valent iron composite had a concentration, in terms of weight (mass) percent, of about 7.7%. The vitamin $B_{12}$ electron transfer mediator incorporated on or/and in the powdered diatomite matrix of the zero valent iron composite had a concentration, in terms of weight percent, of about 0.038%.

Vermiculite additionally included in the zero valent iron composite had a piece size in a range of between about 0.01 mm and about 20.0 mm, and had a concentration, in terms of weight percent, of about 50%.

Example 4

Physical and Chemical Analysis and Characterization of a Zero Valent Metal Composite Selected samples of the 'clean' (pre-treated, pre-reacted) powdered diatomite used for manufacturing (synthesizing) the different specific embodiments of the zero valent iron composite, as described hereinabove and exemplified in Examples 1, 2, and 3, and of the zero valent iron composite manufactured (synthesized) as described and exemplified hereinabove in Example 1, in accordance with the present invention, were subjected to visual (naked eye) and, physical and chemical instrumental analysis and characterization, for the purpose of identifying, analyzing, and characterizing physicochemical properties, parameters, characteristics, and features.

Visual (Naked Eye) Observations of the Zero Valent Iron Composite:

The washing solution (1000 ml water and 200 ml acetone) of the zero valent iron composite contained no visually noticeable dissolved iron or/and vitamin $B_{12}$. Each of these chemical species are visually noticeable in dissolved forms even at low concentrations, for example, $B_{12}$ is clearly visible at concentrations as low as about 1 micro-molar (µM).

The zero valent iron composite appeared physically different than the initial 'clean' (pre-treated, pre-reacted) powdered diatomite used in the synthesis reaction.

The zero valent iron composite exhibited magnetic properties, typical for iron, but not for powdered diatomite. For example, when a magnet was brought into direct contact with dry zero valent iron composite, particles of the dry zero valent iron composite stuck to the magnet, clearly indicative of the iron content in the dry zero valent iron composite. By strong contrast, as was obviously expected, the clean (pre-treated, pre-reacted) powdered diatomite did not stick to the magnet.

Upon exposure to air at room temperature, the color of the zero valent iron composite changed from black to gray, then to dark green, and finally to rusty brown, indicative of oxidation of the nanometer sized zero valent iron particles incorporated on or/and in the powdered diatomite matrix. The time frame for the oxidative color change from black to brown was of the order of several hours to days. By contrast, when a separate sample of only nanometer sized zero valent iron particles (which were not part of a composite) in powder form is exposed to air, the oxidation process is immediate, accompanied by release of a relatively large amount of heat and consequent increase of temperature, confirmation of the well known pyrophoric behavior of nanometer sized zero valent iron particles.

It was also particularly observed that initiation and extent of the oxidation process took a significantly longer period of time for the zero valent iron composite including the vitamin $B_{12}$ electron transfer mediator, compared to a similarly synthesized zero valent iron composite without any electron transfer mediator, leading to the hypothesis that the presence of an electron transfer mediator, at least in the case of vitamin $B_{12}$, in the zero valent iron composite, inhibited and slowed down initiation and extent of the oxidation process. This hypothesis is particularly relevant when using a zero valent metal composite, such as the zero valent iron composite described and exemplified herein, for catalytically treating contaminated water, since, in most actual applications, the zero valent metal composite needs to function as a catalyst in an air environment.

Upon exposing contaminated water having halogenated organic compounds to the zero valent iron composite in batch mode experiments (described hereinbelow, in Example 6), there was noticeable evolution of gas, indicative of hydrogen being released as a result of one or more catalytic redox reactions taking place.

Scanning Electron Microscopy (SEM) of the Zero Valent Iron Composite:

Scanning electron microscopy (SEM) measurements were made on selected samples of a 'clean' (pre-treated, pre-reacted) powdered diatomite, of the zero valent iron composite, and of a 'comparative reference' zero valent iron composite not including the vitamin $B_{12}$ electron transfer mediator.

FIGS. 1A and 1B are SEM photographs showing a 5 μm and 1 μm scale, respectively, of a portion of the 'clean' (pre-treated, pre-reacted) powdered diatomite used for manufacturing (synthesizing) the different specific embodiments of the zero valent iron composite, as described hereinabove and exemplified in Examples 1, 2, and 3. FIGS. 2A and 2B are SEM photographs showing a 5 μm and 1 μm scale, respectively, of a portion of the (dry) zero valent iron composite manufactured (synthesized) as described hereinabove and exemplified in Example 1, composed of a powdered diatomite matrix on or/and in which is incorporated zero valent iron particles (for example, which appear as white colored relatively small circularly shaped spots, as pointed to by the paired arrows) having a size in a range of between about 1 nm and about 1000 nm and vitamin $B_{12}$ (metallocorrin complex type of porphyrinogenic organometallic complex, as the exemplary electron transfer mediator).

Comparison of the SEM photographs of FIGS. 2A and 2B with those of FIGS. 1A and 1B, respectively, clearly showed that nanometer sized zero valent iron particles were incorporated on or/and in (dispersed throughout, supported by, and adhered in a chemical bonding manner to) the powdered diatomite matrix of the zero valent iron composite. Elemental analysis of the surface layer of a portion of the zero valent iron composite, encompassing the powdered diatomite matrix and a plurality of the nanometer sized zero valent iron particles, indicated the presence of silica and iron. The SEM instrument was unable to resolve elemental analysis at the size scale of individual nanometer sized zero valent iron particles observed in the SEM photographs.

FIG. 3 is a SEM photograph showing a 5 μm scale of a portion of an exemplary 'comparative reference' zero valent metal composite (without an electron transfer mediator), being a (dry) zero valent iron composite manufactured (synthesized) 'similar' to that as described hereinabove and exemplified in Example 1, composed of a powdered diatomite matrix on or/and in which is incorporated zero valent iron particles (for example, which appear as white colored relatively large irregularly shaped aggregates, as pointed to by the arrows) having an average size larger than about 600 nm, without an electron transfer mediator, for serving as an exemplary reference zero valent metal composite when compared to the exemplary zero valent metal composite of the present invention which appears in the SEM photographs of FIGS. 2A and 2B. Comparison of the SEM photographs of FIGS. 2A and 2B with that of FIG. 3 clearly shows the significantly different geometrical shape or form of the zero valent iron particles, in particular, relatively small circularly shaped particles (FIGS. 2A and 2B) vs. relatively large irregularly shaped aggregates (FIG. 3), according to the presence or absence, respectively, of an electron transfer mediator (for example, vitamin $B_{12}$) incorporated on or/and in the powdered diatomite matrix of the zero valent iron composite.

These exemplary empirical observations based on comparisons of the SEM photographs of FIGS. 2A and 2B with those of FIGS. 1A, 1B, and 3, convincingly support several main general inventive aspects of the present invention. Firstly, wherein the presence of an electron transfer mediator (for example, vitamin $B_{12}$) incorporated on or/and in the powdered diatomite matrix of the zero valent metal composite, significantly influences the geometrical shape or form of the zero valent metal particles additionally incorporated on or/and in the powdered diatomite matrix of the zero valent metal composite. Secondly, wherein the presence of an electron transfer mediator (for example, vitamin $B_{12}$) during the manufacturing (synthesizing) of the zero valent metal composite, significantly influences the geometrical shape or form of the zero valent metal particles in the manufactured (synthesized) zero valent metal composite. Thirdly, wherein, apparently, the presence of an electron transfer mediator (for example, vitamin $B_{12}$) incorporated on or/and in the powdered diatomite matrix of the zero valent metal composite, significantly influences the physicochemical properties, characteristics, and behavior, of the zero valent metal particles additionally incorporated on or/and in the powdered diatomite matrix of the zero valent metal composite, in particular, and therefore, of the zero valent metal composite, in general. This includes, for example, with respect to applications involving the use of the zero valent metal composite for treating contaminated water.

Transmission Electron Microscopy (TEM) of the Zero Valent Iron Composite:

Transmission electron microscopy (TEM) measurements were made on selected samples of the zero valent iron composite, manufactured (synthesized) as described hereinabove and exemplified in Example 1, and which appears in the SEM photographs of FIGS. 2A and 2B.

Preparation of each TEM sample consisted of making an aqueous suspension of the zero valent iron composite and placing an aliquot of the suspension in a vial, manually shaking the vial for a few minutes, and then allowing the zero valent iron composite to settle throughout the length of a vertically positioned graduated column, for a period of about 30 min. Following the settling period, a relatively simple size separation of the suspension was performed by removing small volume samples of the suspended zero valent iron composite at different heights along the column. Each volume sample was then stored at room conditions for a period of several days prior to performing the TEM measurements. During preparation of each TEM sample of the aqueous suspension of the zero valent iron composite, activity of the zero valent iron composite was observed in the form of evolution of hydrogen gas bubbles, clearly indicating dissociation of the water, along with consequent oxidation of the nanometer sized zero valent iron particles in the composite.

Figure 9A:
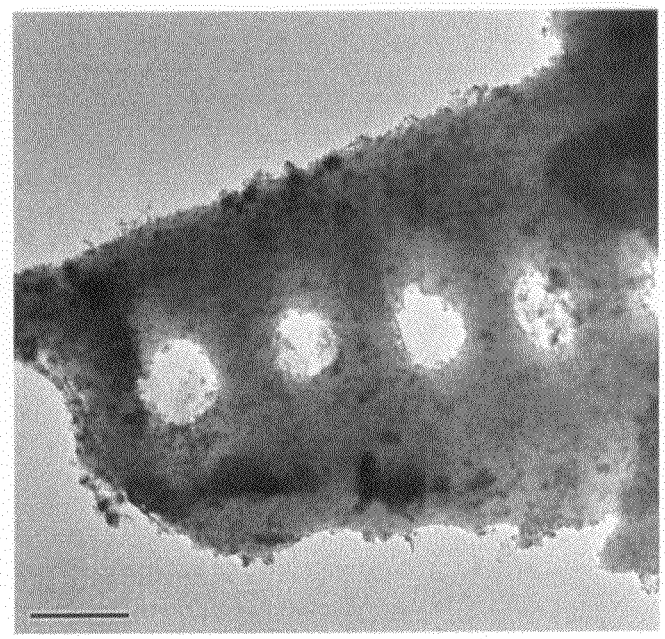
FIGS. 9A and 9B are TEM (transmission electron microscope) photographs showing a 500 nm and 100 nm scale, respectively, of an aqueous suspension sample (stored for several days at room conditions) of the zero valent iron composite manufactured (synthesized) as described hereinbelow and exemplified in Example 1, and which appears in the SEM photographs of FIGS. 2A and 2B, in accordance with the present invention.
Figure 9B:
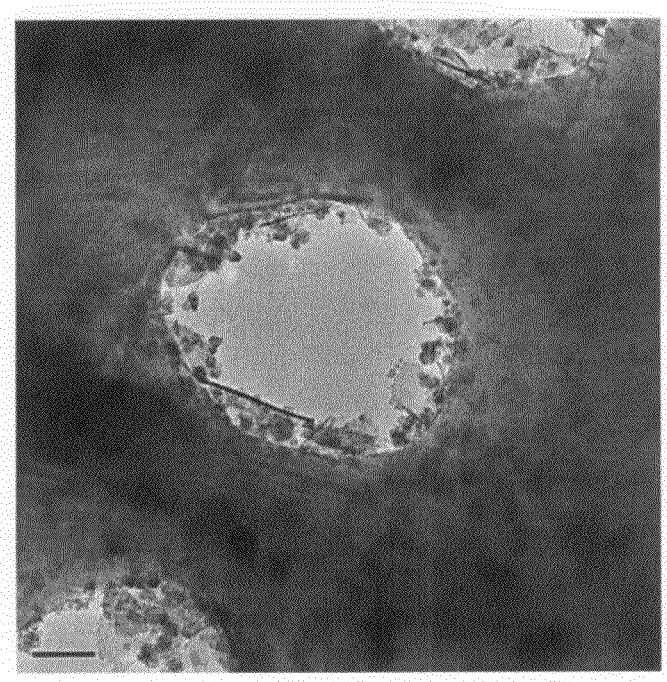

FIGS. 9A and 9B are TEM photographs showing a 500 nm and 100 nm scale, respectively, of a volume sample, removed from near the bottom of the column, of the aqueous suspension (stored for several days at room conditions) of the zero valent iron composite. In FIG. 9A, at the lower magnification (500 nm scale), two distinct types of regions were observed throughout the entire TEM photograph—a plurality of separate small dark regions corresponding to the zero valent iron particles, which were dispersed throughout the background of a single contiguous larger lighter region corresponding to the powdered diatomite matrix surface. The TEM analysis was limited to TEM samples of the aqueous suspension having a thickness of less than about 50 nm, which allowed penetration of the electron beam. Therefore, additional TEM photographs were taken at a higher magnification (100 nm scale) while focusing on the edges of the pores and shell of the powdered diatomite matrix surface observed in the TEM samples of FIG. 9A, as shown in FIG. 9B. In FIG. 9B the same two distinct types of regions were observed throughout the entire TEM photograph. The average diameter of the small dark regions corresponding to the zero valent iron particles was evaluated to be about 10 nm.

Figure 10A:
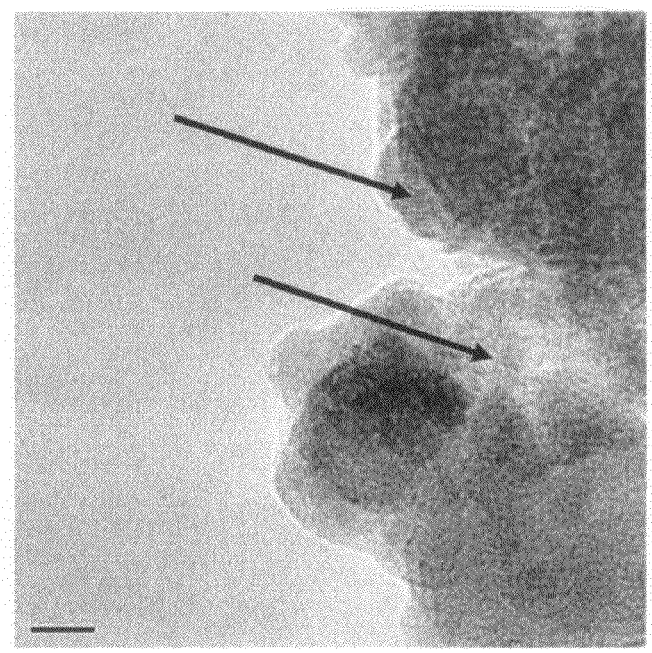
FIGS. 10A and 10B are TEM photographs showing a 5 nm and 10 nm scale, respectively, of the aqueous suspension sample of the zero valent iron composite which appears in the TEM photographs of FIGS. 9A and 9B, in accordance with the present invention.
Figure 10B:
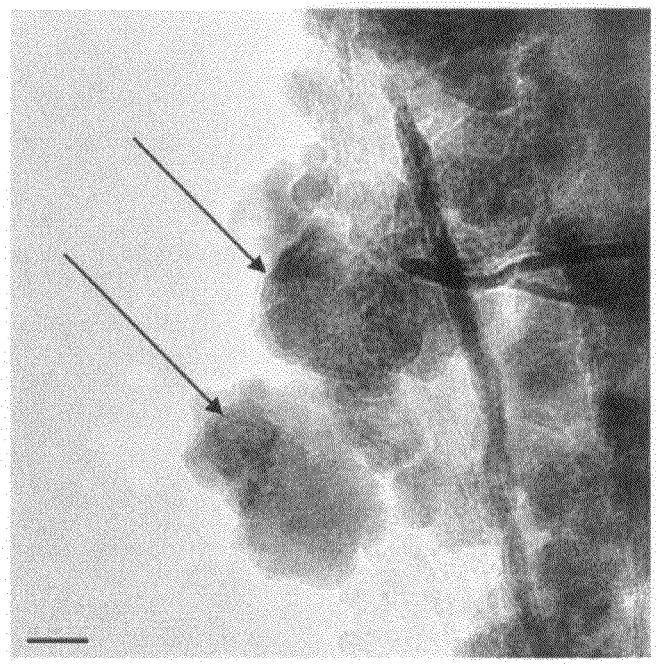

For the objective of further investigating and analyzing the aqueous suspension sample of the zero valent iron composite which appeared in the TEM photographs of FIGS. 9A and 9B, additional TEM measurements at higher resolutions of 5 nm and 10 nm scales were made on the aqueous suspension sample of the zero valent iron composite, as shown in the TEM photographs of FIGS. 10A and 10B. In the TEM photographs of FIGS. 10A and 10B, at these higher resolutions, crystalline structures (as pointed to by the arrows) were observed in both of the preceding identified and described two distinct types of regions (separate small dark regions corresponding to the zero valent iron particles, and single contiguous larger lighter region corresponding to the powdered diatomite matrix surface) of the zero valent iron composite.

Two distinctly different spacings or distances (especially noticed in FIG. 10A) between the layers of the crystalline structures were measured and evaluated from the TEM images and their FFT transforms as being about 2.9 Å and about 4.9 Å. These results lead to the hypothesis that two different types of crystalline structures of the zero valent iron particles were incorporated on or/and in the powdered diatomite matrix of the zero valent iron composite.

Quantitative elemental analysis was performed, via the TEM apparatus, on the aqueous suspension sample of the zero valent iron composite. The results, shown in the following table, indicated the presence of iron, silicon, oxygen, and to a lesser extent, carbon, cobalt, aluminum, and zinc. The presence of copper was attributed to the metal TEM sample holder grid.

| Element | Atomic % |
| --- | --- |
| O | 55.6 |
| Al | 0.3 |
| Si | 19.9 |
| Fe | 22.6 |
| Co | 0.8 |
| Zn | 0.8 |
| Total | 100 |

Considering that all of the Si was in the form of $SiO_2$, as the powdered diatomite matrix, then 15.8% of the oxygen remained for being complexed with other species of the zero valent iron composite. This amount of the oxygen does not account for complete oxidation of all of the measured quantity of the iron. Hence, it was concluded that at least a fraction of the iron remained in the active elemental zero valent metal state following several days of exposure of the nanometer sized zero valent iron particles to water in the aqueous suspension sample of the zero valent iron composite. These results lead to the conclusion that the nanometer sized zero valent iron particles remained in the reduced, and therefore, catalytically active, form, even following exposure to water for several days. This conclusion is highly relevant with respect to application of the zero valent iron composite for treating contaminated water, wherein exposure (residence) time of the zero valent iron composite is typically at least several days. During the exposure (residence) time it is important for the zero valent iron particles to remain in the reduced, and therefore, catalytically active, form, thereby enabling the various heterogeneous catalytic reaction processes to take place for catalytically treating contaminated surface water, to thereby decrease concentration of at least one of the contaminants in the contaminated surface water.

Another TEM sample was prepared from the dry (non-suspended), anaerobically stored, and non-separated zero valent iron composite that was used for making the TEM measurements shown in FIGS. 9A, 9B, 10A, and 10B. The zero valent iron composite sample was maintained under anaerobic conditions until TEM sample preparation. TEM measurements of the zero valent iron composite sample were carried out within two hours from the time of preparing the TEM sample. In this case, it was observed that the zero valent iron particles were relatively small circularly shaped with a diameter up to about 50 nm.

The crystalline structure of the zero valent iron particles could not be directly measured since the resolution of the TEM instrument (2.6 Å) was larger than the layer spacing characteristic of elemental iron. However, an indirect measurement of the layer spacing was obtained by performing an electron diffraction analysis using the TEM. The FFT signal of the electron diffraction analysis corresponded to a characteristic layer spacing of about 1.9 Å.

Quantitative elemental analysis was performed, via the TEM apparatus, on the sample of the zero valent iron composite, and the results obtained are shown in the following table:

| Element | Atomic % |
| --- | --- |
| O | 44.6 |
| Al | 0.7 |
| Si | 26.6 |
| Fe | 25.9 |
| Co | 1.1 |
| Zn | 1.0 |
| Total | 100 |

This analysis clearly indicated that the amount of oxygen observed in the zero valent iron composite was not sufficient to account for the stoichiometry of regular silica ($SiO_2$), for the zero valent iron composite being maintained under anaerobic conditions. This lead to the conclusion that there was some reduction, (for example, probably by the reducing agent) during the synthesis of the original powdered diatomite matrix. Based on this lower than expected level of oxygen, lead to the hypothesis that either as part of, or in addition to, mechanism(s) for incorporating of the zero valent iron particles in the metallic (zero valent) elemental iron state into the powdered diatomite (silica) surface, another mechanism takes place which involves reduction of the original powdered diatomite matrix involving some kind of yet undetermined physicochemical bonding.

FTIR Spectroscopy and XRD of the Zero Valent Iron Composite:

FTIR spectroscopy and XRD measurements were made on selected samples of the 'clean' (pre-treated, pre-reacted) powdered diatomite used for manufacturing (synthesizing) the different specific embodiments of a zero valent iron composite, as described hereinabove and exemplified in Examples 1, 2, and 3, and were made on selected samples of the different specific embodiments (without vermiculite) of the zero valent iron composite manufactured (synthesized) as described hereinabove and exemplified in Example 1, in accordance with the present invention.

The FTIR (400-2000 cm$^{-1}$; sample in a KBr pellet) and XRD (2θ=15-85) measurements indicated that the powdered diatomite in the zero valent iron composite retained its original mineralogical composition, which consists mostly of opal, crystobalite, and quartz. Regarding the FTIR spectra, since absorption peaks for Fe and Si minerals are usually below 400 cm$^{-1}$, they were not observed in the spectral range of measurement. Main peaks associated with the (clean or zero valent iron composite) powdered diatomite, in decreasing order of their amplitudes, were at 1093 cm$^{-1}$, 474 cm$^{-1}$, 793 cm$^{-1}$, and 620 cm$^{-1}$. Regarding the XRD scans, when compared to that of the clean powdered diatomite, the XRD scan of the powdered diatomite in the zero valent iron composite included an additional peak at 2θ=47.3, indicating the probability that a new type of crystal structure or species was formed on the diatomite powder matrix during the synthesis of the zero valent iron composite.

Example 5

Measurement of Permeability, k, of a Zero Valent Metal Composite

Permeability, k, measurements were made on selected samples of two of the different specific embodiments (without vermiculite, and including vermiculite) of a zero valent iron composite manufactured (synthesized) as described hereinabove and exemplified in Examples 1 and 3, respectively, in accordance with the present invention. Values obtained from these measurements were compared to ranges of known values of permeability, k, of several common porous materials, at comparable measurement conditions.

The permeability measurements were made using a standard falling head permeameter apparatus, as described in detail in the art [e.g., 56, 57]. Each synthesized zero valent iron composite, of Examples 1 and 3, was packed into a cylindrical column (permeameter) apparatus having a length of about 20 cm and a diameter of 1 cm. For these permeability measurements, the scale of measurement was on the order of centimeters.

Values obtained for permeability, k, of the zero valent iron composites of Examples 1 and 3, being composed of a powdered diatomite matrix on or/and in which is incorporated zero valent iron particles having a size in a range of between about 1 nm and about 1000 nm and vitamin $B_{12}$, (without vermiculite, and including vermiculite, respectively) were $8.7 \times 10^{-9}$ cm$^2$, and $1.48 \times 10^{-8}$ cm$^2$, respectively.

Apparently, the presence of vermiculite in the zero valent iron composite caused a slight increase in the linear velocity of the liquid phase water flowing through the zero valent iron composite, resulting in a slight increase in the permeability, k, of the zero valent iron composite including vermiculite, compared to a similar zero valent iron composite, but manufactured without vermiculite.

Ranges of known values of permeability, k, of several common porous materials, at comparable measurement conditions, are as follows (from [57]):

| | |
|---|---|
| Coarse gravels | $10^{-4}$-$10^{-5}$ cm$^2$ |
| Sands and gravels | $10^{-5}$-$10^{-8}$ cm$^2$ |
| Fine sands, silt, loess | $10^{-8}$-$10^{-12}$ cm$^2$ |
| Clay, shale, glacial till | $10^{-12}$-$10^{-16}$ cm$^2$ |
| Sandstone | $10^{-7}$-$10^{-13}$ cm$^2$ |
| Limestone | $10^{-8}$-$10^{-12}$ cm$^2$ |
| Weathered chalk | $10^{-6}$-$10^{-8}$ cm$^2$ |

Comparison of the values obtained for permeability, k, of the zero valent iron composites of Examples 1 and 3, to the above list of ranges of known values of permeability, k, of several common porous materials, at comparable measurement conditions, shows that values of permeability, k, for the zero valent iron composites of Examples 1 and 3, are of about the same or greater order of magnitude compared to that for most of the above listed common porous materials.

Examples 6-9

Catalytically Treating Contaminated Water Using a Zero Valent Metal Composite

In each of the following Examples 6-9, a series of heterogeneous catalytic type batch mode experiments (i.e., control or test material, contaminated water, and, reaction (degradation, transformation, or/and converted) products, maintained in a batch type closed vial-reactor) was performed in order to measure and analyze catalytic treatment of a sample of contaminated water, separately using different specific embodiments of the hereinabove illustratively described zero valent metal composite.

In each of Examples 6-9, the contaminated water initially included an exemplary water contaminant characterized as being composed of an organic specie or of an inorganic specie. In each of Examples 6, 7, and 8, the initial exemplary water contaminant was a halogenated organic compound, i.e., carbon tetrachloride (CT) [Example 6], tetrachloroethylene (PCE) [Example 7], and tribromoneopentlyalcohol (TBNPA) [Example 8]. In Example 10, the initial exemplary water contaminant was a charged (cationic) form of a transition metal element, i.e., hexavalent chromium (chromium (VI) cation [$Cr^{+6}$]), originating from the inorganic compound potassium dichromate [$K_2Cr_2O_7$].

In each of Examples 6-9, (the same) two different specific embodiments of a zero valent metal composite, separately, were used for catalytically treating the contaminated water.

The first specific embodiment of the zero valent metal composite was the zero valent iron (ZVI) composite manufactured (synthesized) as described hereinabove and exemplified in Example 1, being composed of a powdered diatomite matrix incorporated with zero valent iron particles having a size in a range of between about 1 nm and about 1000 nm and vitamin $B_{12}$, (without vermiculite).

The second specific embodiment of the zero valent metal composite was the zero valent iron (ZVI) composite manufactured (synthesized) as described hereinabove and exemplified in Example 3, in accordance with the hereinabove described second exemplary alternative preferred embodiment of the manufacturing method (with optional addition of vermiculite), i.e., including the alternative optional procedure of adding vermiculite to the collected zero valent metal composite (absent of vermiculite), for forming the zero valent metal composite (including vermiculite). Accordingly, the second specific embodiment of the zero valent iron (ZVI) composite was composed of a powdered diatomite matrix incorporated with zero valent iron particles having a size in a range of between about 1 nm and about 1000 nm and vitamin $B_{12}$, and additionally including vermiculite.

Materials and Experimental Methods

Water:

Distilled deionized filtered water, generated by a Milli-Q water purification system, was exclusively used throughout.

Water Contaminants, and Contaminated Water Stock Solutions Thereof:

Example 6

Water contaminant—carbon tetrachloride (CT), 99%, from Frutarom Ltd., Israel. Contaminated water stock solution—carbon tetrachloride (CT), 50 mg/l (50 ppm).

Example 7

Water contaminant—tetrachloroethylene (PCE), 99%, from Frutarom Ltd., Israel. Contaminated water stock solution—tetrachloroethylene (PCE), 50 mg/l (50 ppm). Trichloroethylene (TCE), 98%, from Bio Lab Ltd., Israel, for the gas chromatographic analytical procedure.

Example 8

Water contaminant—tribromoneopentlyalcohol (TBNPA), 99%, from DSBG Ltd., Israel. Contaminated water stock solution—tribromoneopentlyalcohol (TBNPA), 50 mg/l (50 ppm).

Example 9

Water contaminant—hexavalent chromium (chromium (VI) cation [$Cr^{+6}$]), originating from potassium dichromate [$K_2Cr_2O_7$], 99.5%, from Fluka. Contaminated water stock solution—hexavalent chromium (chromium (VI) cation [$Cr^{+6}$]), 10 mg/l (10 ppm).

Zero Valent Metal Composites (Each of Examples 6-9):

First specific embodiment—anaerobically stored, dry zero valent iron (ZVI) composite, from hereinabove Example 1, composed of a powdered diatomite matrix incorporated with zero valent iron particles having a size in a range of between about 1 nm and about 1000 nm and vitamin $B_{12}$, (without vermiculite).

Second specific embodiment—anaerobically stored, dry zero valent iron (ZVI) composite, from hereinabove Example 3, composed of a powdered diatomite matrix incorporated with zero valent iron particles having a size in a range of between about 1 nm and about 1000 nm and vitamin $B_{12}$, and additionally including vermiculite.

In each of the first and second specific embodiments of the zero valent iron (ZVI) composite, the powdered diatomite matrix particles had a particle size in a range of between about 1 micron and about 150 microns, and a pore size in a range of between about 1 nm and about 5000 nm; zero valent iron particle concentration was about 7.7% (weight (mass) percent); and vitamin $B_{12}$ electron transfer mediator concentration was about 0.038% (weight (mass) percent). In the second specific embodiment, the additionally included vermiculite had a piece size in a range of between about 0.01 mm and about 20.0 mm, and a concentration of about 50% (weight (mass) percent).

Extraction Solvents (or GC Analysis), and Reagents (for Colorimetric Analysis):

In Examples 6-8, the following extraction solvents were used for performing a (liquid-liquid) extraction and centrifuge separation procedure of the contents of each batch mode reactor, for preparing a GC sample for performing the GC analytical procedure. Example 6—hexane, 99+%, from Aldrich, Germany. Example 7-cyclohexane, 99.5%, from Aldrich Ltd., Israel. Example 8—toluene, 99.5%, from Frutarom Ltd., Israel.

In Example 9, the following reagents were used for performing the calorimetric (photometric) analytical procedure. Diphenylcarbazide, 97%, from Fluka, Austria; sulfuric acid [$H_2SO_4$], 98%, from BDH, England; and reagent grade water-Milli-Q distilled deionized filtered water.

Heterogeneous Catalytic Batch Mode Reactor (as an Exemplary In-Situ or Ex-Situ Unit) (Each of Examples 6-9):

For each heterogeneous catalytic type batch mode reactor, a 40 milliliter (0.4 liter) glass vial was used at room temperature (between about 20° C. and about 25° C.) and atmospheric pressure. Contents of the glass vial (batch reactor) were mixed by securing the glass vial onto an orbital shaker (model TS-600, from MRC, Israel) having automatic (mixing) speed control.

Experimental Setup, Procedures, and Reaction Conditions (Each of Examples 6-9)

For each of Examples 6-9, the experimental setup consisted of two replicate sets of the same number of separate 'control' and 'test' batch mode reactors (i.e., 40 ml glass vials) containing control or test materials, described and prepared as follows:

Control-1: Contaminated Water (Example 6 only): contaminated water alone.

A volume, 50 milliliters, of the carbon tetrachloride (CT), 50 mg/l (50 ppm), contaminated water stock solution was added to an empty 40 ml glass vial (batch mode reactor).

Control-2: Diatomite: contaminated water exposed to control material—clean (pre-treated, pre-reacted) powdered diatomite matrix. This control was used for assessing the possibility of contaminant adsorption onto the clean powdered diatomite matrix, being the same as that included in the zero valent iron composite used in the below indicated two test batch mode reactors.

A weight, 2.5 grams (Example 6), 1.5 grams (Examples 7, 8), or 0.25 gram (Example 9), of the powdered diatomite, was added to an empty glass vial (batch mode reactor). To that was added a volume, 50 milliliters (Example 6), 15 milliliters (Examples 7, 8), or 25 milliliters (Example 9), of the respective above prepared contaminated water stock solution.

Control-3: Diatomite+$Fe^0$ (Example 6 only): contaminated water exposed to control material-powdered diatomite matrix incorporated with only zero valent iron particles having a size in a range of between about 1 nm and about 1000 nm, being the same components included in the zero valent iron composite used in the below indicated two test batch mode reactors.

A weight, 2.5 grams, of the powdered diatomite incorporated with the zero valent iron particles was added to an empty glass vial (batch mode reactor). To that was added a volume, 50 milliliters, of the carbon tetrachloride (CT), 50 mg/l (50 ppm), contaminated water stock solution.

Test-1: Diatomite+$Fe^0$+$B_{12}$: contaminated water exposed to test material—above described first specific embodiment of the zero valent iron (ZVI) composite (without vermiculite) (from Example 1).

A weight, 2.5 grams (Example 6), 1.5 grams (Examples 7, 8), or 0.25 gram (Example 9), of the zero valent iron (ZVI)

composite (without vermiculite), was added to an empty glass vial (batch mode reactor). To that was added a volume, 50 milliliters (Example 6), 15 milliliters (Examples 7, 8), or 25 milliliters (Example 9), of the respective above prepared contaminated water stock solution.

Test-2: Diatomite+$Fe^0$+$B_{12}$+Vermiculite: contaminated water exposed to test material—above described second specific embodiment of the zero valent iron (ZVI) composite (with vermiculite) (from Example 3).

A weight, 2.5 grams (Example 6), 1.5 grams (Examples 7, 8), or 0.25 gram (Example 10), of the zero valent iron (ZVI) composite (with vermiculite), was added to an empty glass vial (batch mode reactor). To that was added a volume, 50 milliliters (Example 6), 15 milliliters (Examples 7, 8), or 25 milliliters (Example 9), of the respective above prepared contaminated water stock solution.

Following preparation of each of the above 'control' and 'test' batch mode reactors, the contents in each glass vial (batch mode reactor) were continuously mixed by securing the glass vial onto the orbital shaker set at a mixing speed of 150 rpm. Such mixing of the batch mode reactors was maintained for the entire extent of time or duration of reaction, thereby maximizing exposure of the water contaminants in the contaminated water to the control and test materials.

The heterogeneous catalytic type batch mode water treatment experiments were performed at room temperature (between about 20° C. and about 25° C.) and atmospheric pressure, for the entire extent of time or duration of reaction. For each control and test batch mode reactor, at periodic time intervals, measurements, and analysis thereof, were made on the degradation rate (kinetics) of the respective water contaminant, i.e., carbon tetrachloride (CT) [Example 6], tetrachloroethylene (PCE) [Example 7], tribromoneopentlyalcohol (TBNPA) [Example 8], or hexavalent chromium (chromium (VI) cation [$Cr^{+6}$]) [Example 9], in the contaminated water, using the below described gas chromatography (GC) or colorimetric (photometric) analytical procedures.

Analytical Procedures (GC, Colorimetry):

Concentration over time, of the water contaminant, and reaction (i.e., degradation, transformation, or/and conversion) products (i.e., dechlorination product(s)) thereof, of each batch mode reactor in each set of control and test batch mode reactors, was measured using gas chromatography (GC) [Examples 6-8] or colorimetry (photometry) [Example 9].

At the end of each pre-determined extent of time or duration of reaction, for each set of the two replicate sets of the separate 'control' and 'test' batch mode reactors (i.e., 40 ml glass vials) containing the reacting control or test materials under the above mixing conditions, and for each type (i.e., control-1, control-2, control-3, test-1, test-2) of control and test batch mode reactor, the contents of two identical batch mode reactors (glass vials) were used ('sacrificed') for GC analysis (Examples 6-8) or calorimetric (photometric) analysis (Example 9). Mixing of the contents of the remaining control and test batch mode reactors (glass vials) was maintained via the orbital shaker, until reaching the end of the next pre-determined extent of time or duration of reaction, at which time GC or calorimetric analysis of the batch mode reactor contents was again performed. The preceding procedure was continuously repeated until reaching the end of the final pre-determined extent of time or duration of reaction for each set of control and test batch mode reactors.

Gas Chromatography:

For Examples 6-8, in accordance with the preceding described analytical procedure for measuring the concentration over time, of the water contaminant, and reaction (i.e., degradation, transformation, or/and conversion) products (i.e., dechlorination product(s)) thereof, of each batch mode reactor in each set of control and test batch mode reactors, the contents of each batch mode reactor (glass vial) were used ('sacrificed') in a (liquid-liquid) extraction and centrifuge separation procedure for preparing a GC sample for performing the GC measurements and analysis.

In Example 6, for the GC sample preparation procedure, 20 milliliters of water were taken from each batch mode reactor (glass vial), and the organic species were extracted therefrom using 4 milliliters of an extraction solvent (hexane), under conditions of shaking at a speed of 150 rpm, followed by centrifuge separation. In Examples 7, and 8, for the GC sample preparation procedure, 15 milliliters of water were taken from each batch mode reactor (glass vial), and the organic species were extracted therefrom using 3 milliliters of an extraction solvent (cyclohexane [Example 7], toluene [Example 8]), under conditions of shaking at a speed of 150 rpm, followed by centrifuge separation.

In Examples 6-8, an HP 5890 GC instrument, equipped with an electron capture detector (ECD), was used for sample analysis. In Example 6, the GC column was a J&W Scientific, DB VRX capillary column, 30 meter length, 0.32 mm inner diameter, and 1.8 micron film layer thickness. In Examples 7, and 8, the GC column was a J&W Scientific, DB5 ms capillary column, 25 meter length, 0.25 mm inner diameter, and 0.25 micron film layer thickness. In each example, the GC carrier gas was nitrogen ($N_2$), at a flow rate of 1 ml per minute. Details regarding the GC temperature program, and, injector and detector temperatures, used in each of Examples 6-8 are as follows:

Example 6

Carbon Tetrachloride (CT) Water Contaminant

GC temperature program—60° C. for 1.5 minutes; ramp at 5° C. per minute to 80° C.; ramp at 15° C. per minute to 200° C.; hold for 1 minute. Injector and detector temperatures were maintained at 220° C., and 300° C., respectively.

Example 7

Tetrachloroethylene (PCE) Water Contaminant

GC temperature program—50° C. for 2 minutes; temperature ramp of 17° C. per minute to 190° C.; hold for 1 minute. Injector and detector temperatures were maintained at 190° C., and 300° C., respectively.

Example 8

Tribromoneopentlyalcohol (TBNPA) Water Contaminant

GC temperature program—200° C. for 1 minute; temperature ramp of 10° C. per minute to 250° C.; hold for 4 minutes. Injector and detector temperatures were maintained at 220° C., and 300° C., respectively.

For Examples 6-8, while performing the GC analytical procedure, GC area count units, being directly proportional to the concentration of the indicated halogenated organic compound water contaminant in the batch mode reactor at the end of the indicated extent of time or duration of reaction, were recorded, and subsequently used for analyzing the experimental data, as presented in tabulated form (i.e., Tables 2-4, below).

Colorimetry (Photometry):

For Example 9, in accordance with the preceding described analytical procedure for measuring the concentration over time, of the water contaminant [i.e., hexavalent chromium (chromium (VI) cation [$Cr^{+6}$])], and reaction (i.e., degradation, transformation, or/and conversion) product (i.e., $Cr^{+3}$) thereof, of each batch mode reactor in each set of control and test batch mode reactors, the contents of each batch mode reactor (glass vial) were sampled (without an extraction procedure), in triplicate, for performing the colorimetric (photometric) measurements and analysis.

The calorimetric (photometric) procedure used corresponds to US Environmental Protection Agency (EPA) Method 7169A: "Colorimetric Determination Of Hexavalent Chromium" [58]. In accordance with this method, hexavalent chromium (chromium (VI) cation [$Cr^{+6}$]) dissolved in aqueous solution, in the absence of interfering amounts of substances, such as molybdenum, vanadium, or/and mercury, may be calorimetrically (photometrically) determined by reaction with diphenylcarbazide in acid solution. A red-violet color of unknown composition is produced. The calorimetric (photometric) reaction is highly sensitive. For example, absorbancy index per gram atom of hexavalent chromium is about 40,000 measured at a wavelength of 540 nm. Addition of an excess amount of diphenylcarbazide yields the red-violet colored reaction product, and its absorbance is colorimetrically (photometrically) measurable at 540 nm.

In Example 9, for the colorimetric (photometric) procedure, 95 ml of water were taken from each batch mode reactor (glass vial), and transferred to a 100 ml volumetric flask. A volume, 2 ml, of diphenylcarbazide solution was added to the flask, along with mixing the flask contents. Sulfuric acid [$H_2SO_4$] solution was then added to the flask, for obtaining a pH of 2±0.5. The contents of the flask were then diluted to 100 ml with reagent grade water, and allowed to stand for a time of between about 5 minutes and about 10 minutes in order to achieve full color development. An appropriate volumetric sample was taken from the solution in the flask, and transferred to a 1 centimeter absorption cell of a calorimeter (photometer) instrument (Varian, Cary 100Bio UV-Visible spectrometer). Absorbance of the solution was measured at 540 nm.

As part of the colorimetric (photometric) procedure, reagent grade water was used as a reference. Sample absorbance readings were corrected by subtracting the absorbance of a blank used in the procedure. An aliquot of the sample containing all reagents, except diphenylcarbazide, was prepared and used to correct the sample for turbidity (i.e., a turbidity blank).

For Example 9, while performing the colorimetric (photometric) procedure, absorbance units, being directly proportional to the concentration of the hexavalent chromium (chromium (VI) cation [$Cr^{+6}$]) water contaminant in the batch mode reactor at the end of the indicated extent of time or duration of reaction, were recorded, and subsequently used for analyzing the experimental data, as presented in tabulated form (i.e., Table 5, below).

EXPERIMENTAL RESULTS

Example 6

Catalytically Treating Contaminated Water Using a Zero Valent Metal Composite: Carbon Tetrachloride (CT) Water Contaminant, Zero Valent Iron Composite The results obtained for Example 6 are presented in the following Table 1. Table 1 lists concentration (in terms of GC area count units) of the (carbon tetrachloride (CT)) water contaminant remaining in each type of control and test batch mode reactor, measured at the end of two extents of time or duration of reaction, i.e., after 2 days, and after 2 weeks.

TABLE 1

Concentration of carbon tetrachloride (CT) (in terms of (absolute) area count units) remaining in control and test batch mode reactors, measured after 2 days, and after 2 weeks.

| Batch mode reactor | CT concentration |
|---|---|
| After 2 days | |
| Control - 1: Contaminated Water | 2906.9 ± 58.5 |
| Control - 2: Diatomite | 2838.0 ± 4.9 |
| Control - 3: Diatomite + $Fe^0$ | 46.5 ± 5.1 |
| Test - 1: Diatomite + $Fe^0$ + $B_{12}$ | 0.0 ± 0.0 |
| Test - 2: Diatomite + $Fe^0$ + $B_{12}$ + Vermic. | 0.0 ± 0.0 |
| After 2 weeks | |
| Control - 1: Contaminated Water | 2984.4 ± 193.6 |
| Control - 2: Diatomite | 2596.8 ± 99.3 |
| Control - 3: Diatomite + $Fe^0$ | 0.0 ± 0.0 |
| Test - 1: Diatomite + $Fe^0$ + $B_{12}$ | 0.0 ± 0.0 |
| Test - 2: Diatomite + $Fe^0$ + $B_{12}$ + Vermic. | 0.0 ± 0.0 |

The results listed in Table 1 show that after only 2 days of exposure, each test material, Test-1 (Diatomite+$Fe^0$+$B_{12}$) and Test-2 (Diatomite+$Fe^0$+$B_{12}$+Vermiculite), catalytically completely eliminated, or decreased to zero, the concentration of the water contaminant (carbon tetrachloride (CT)). By strong contrast, for the same 2 day time period, the Control-2 material (Diatomite) decreased the concentration of the water contaminant by a significantly smaller amount, of only about 2%. For the same 2 day exposure time period, the Control-3 material (Diatomite+$Fe^0$) catalytically decreased the concentration of the water contaminant by about 98%.

After 2 weeks of exposure, each of the Test-1 and Test-2 materials, and the Control-3 material, catalytically completely eliminated, or decreased to zero, the concentration of the water contaminant. Similar to the results of after 2 days, for the same 2 week time period, the Control-2 material decreased the concentration of the water contaminant by a significantly smaller amount, of only about 13%.

Example 7

Catalytically Treating Contaminated Water Using a Zero Valent Metal Composite: Tetrachloroethylene (PCE) [and Trichloroethylene (TCE)] Water Contaminants, Zero Valent Iron Composite The results obtained for Example 7 are presented in the following Tables 2 and 3. Table 2 lists concentration (normalized relative to control with clean diatomite) of the tetrachloroethylene (PCE) water contaminant remaining in each type of control and test batch mode reactor, periodically measured at the end of several extents of time or duration of reaction, within a range of between 1 hour and 160 hours.

TABLE 2

Concentration of tetrachloroethene (PCE) (normalized relative to the control with clean diatomite) remaining in control and test batch mode reactors, periodically measured in a range of 1-160 hours.

| | treatment | | |
|---|---|---|---|
| time (hours) | Test - 1: Diatomite + $Fe^0$ + $B_{12}$ | Test - 2: Diatomite + $Fe^0$ + $B_{12}$ + Vermiculite | Control - 2: Diatomite |
| 1 | 92 | 98 | 100 |
| 5.5 | 92 | 88 | 100 |
| 22 | 40 | 50 | 100 |
| 44 | 20 | 42 | 100 |
| 66 | 5 | 22 | 100 |
| 93 | 1 | 12 | 100 |
| 160 | 1 | 1 | 100 |

The results listed in Table 2 show that the degradation reaction is immediate and after only less than 24 hrs of exposure, each test material, Test —I (Diatomite+$Fe^0$+$B_{12}$) and Test-2 (Diatomite+$Fe^0$+$B_{12}$+Vermiculite), catalytically eliminated, or decreased to half, the concentration of the water contaminant (tetrachloroethylne (PCE)). After 93 and 160 hours for each of Test-1 and Test-2 materials, the concentration of the PCE is reduced to 1% of the initial concentration. In strong contrast, for the same time period, the Control-2 material (Diatomite) decreased the concentration of the water contaminant by a significantly smaller amount, which is incorporated into the data normalization calculation.

The results listed in Table 2 correspond to the measurements, and analysis thereof, made on the degradation rate (kinetics) of the tetrachloroethylene (PCE) in the contaminated water. Since trichloroethylene (TCE) is produced as the main reaction (dechlorination type of degradation, transformation, or/and conversion) product during catalytic treatment of the tetrachloroethylene (PCE) contaminated water, therefore, measurements, and analysis thereof, were also made in terms of a 'combined' or 'composite' production and degradation rate (kinetics) of the trichloroethylene (TCE) in the contaminated water, effected by the zero valent iron composite, following exposing the tetrachloroethylene (PCE) contaminated water to the zero valent iron composite. These results are listed in the following Table 3. Table 3 shows the 'relative' concentration of trichloroethylene (TCE), normalized relative to the maximum concentration of trichloroethylene (TCE), produced and degraded in control and test batch mode reactors, during tetrachloroethylene (PCE) treatment of Table 2, periodically measured within a range of between 1 hour and 491 hours.

TABLE 3

Relative concentration of trichloroethylene (TCE) (normalized relative to the maximum concentration) produced and degraded in control and test batch mode reactors, during tetrachloroethylene (PCE) treatment of Table 2, periodically measured in a range of 1-491 hours.

| | treatment | | |
|---|---|---|---|
| time (hours) | Test - 1: Diatomite + $Fe^0$ + $B_{12}$ | Test - 2: Diatomite + $Fe^0$ + $B_{12}$ + Vermiculite | Control - 2: Diatomite |
| 1 | 7 | 11 | 2 |
| 5.5 | 24 | 15 | 2 |
| 22 | 67 | 43 | 2 |
| 44 | 93 | 64 | 1 |
| 66 | 93 | 66 | 1 |
| 93 | 100 | 82 | 2 |
| 160 | 91 | 86 | 3 |
| 250 | 63 | 52 | 3 |
| 322 | 74 | — | 2 |
| 345 | 59 | 57 | 2 |
| 491 | 52 | 49 | 4 |

It is thus seen that trichloroethylene is a substantial byproduct of the tetrachloethylene (TCE) degradation by Test-1 (Diatomite+$Fe^0$+$B_{12}$) and Test-2 (Diatomite+$Fe^0$+$B_{12}$+Vermiculite) materials only, and that it further decomposes after less than 3 weeks from the beginning of the tetrachloroethylene (PCE) reaction (i.e., TCE as a byproduct reaches a maximum concentration after about 93-160 hours, and then decreases further).

Example 8

Catalytically Treating Contaminated Water Using a Zero Valent Metal Composite Tribromoneopentlyalcohol (TBNPA) Water Contaminant, Zero Valent Iron Composite The results obtained for Example 8 are presented in the following Table 4. Table 4 lists concentration (normalized relative to control with clean diatomite) of the tribromoneopentlyalcohol (TBNPA) water contaminant remaining in each type of control and test batch mode reactor, periodically measured at the end of several extents of time or duration of reaction, within a range of between 1 minute and 330 minutes.

TABLE 4

Concentration of tribromoneopentlyalcohol (TBNPA) (normalized relative to the control with clean diatomite) remaining in control and test batch mode reactors, periodically measured in a range of 1-330 minutes.

| | treatment | | |
|---|---|---|---|
| time (minutes) | Test - 1: Diatomite + $Fe^0$ + $B_{12}$ | Test - 2: Diatomite + $Fe^0$ + $B_{12}$ + Vermiculite | Control - 2: Diatomite |
| 10 | — | 67.4 | 100.0 |
| 25 | 59.1 | 54.2 | 100.0 |
| 40 | 49.5 | 54.5 | 100.0 |
| 60 | 48.7 | 42.8 | 100.0 |
| 90 | 29.3 | 13.2 | 100.0 |
| 150 | 8.9 | 7.8 | 100.0 |
| 210 | 4.8 | 2.7 | 100.0 |
| 270 | 0.8 | 0.2 | 100.0 |
| 330 | 0.2 | 0.1 | 100.0 |

The results listed in Table 4 show that the degradation reaction is immediate and after only less than 330 min of exposure, each test material, Test-1 (Diatomite+$Fe^0$+$B_{12}$) and Test-2 (Diatomite+$Fe^0$+$B_{12}$+Vermiculite), catalytically eliminated, or decreased to zero, the concentration of the water contaminant (tribromoneopentlyalcohol (TBNPA)). In strong contrast, for the same time period, the Control-2 material (Diatomite) decreased the concentration of the water contaminant by a significantly smaller amount, which is incorporated in the data normalization calculation.

Example 9

Catalytically Treating Contaminated Water Using a Zero Valent Metal Composite: Hexavalent Chromium (Chromium (VI) Cation [$Cr^{+}6$]) Water Contaminant, Zero Valent Iron Composite The results obtained for Example 9 are presented in the following Table 5. Table 5 lists concentration (normalized relative to control with clean diatomite) of the water contaminant (hexavalent chromium (chromium (VI) cation [$Cr^{+6}$]), originating from potassium dichromate [$K_2Cr_2O_7$]), remaining in each type of control and test batch mode reactor, periodically measured at the end of several extents of time or duration of reaction, within a range of between 0.25 minute and 0.58 minute.

TABLE 5

Concentration of hexavalent chromium (chromium (VI) cation [$Cr^{+6}$]) (normalized relative to the control with clean diatomite) remaining in control and test batch mode reactors, periodically measured in a range of 0.25-0.58 minute.

| time (minutes) | treatment | | |
|---|---|---|---|
| | Test - 1: Diatomite + $Fe^0$ + $B_{12}$ | Test - 2: Diatomite + $Fe^0$ + $B_{12}$ + Vermiculite | Control - 2: Diatomite |
| 0.25 | 8.1 | 5.6 | 100.0 |
| 0.42 | 0.8 | 1.6 | 100.0 |
| 0.58 | 0.0 | 0.0 | 100.0 |

The results listed in Table 5 show that the transformation or/and conversion of the hexavalent chromium (chromium (VI) cation [$Cr^{+6}$]) water contaminant to the trivalent chromium (chromium (III) cation [$Cr^{+3}$]), being a non-hazardous form of chromium cation, is immediate and after only less than 0.58 min of exposure. Each test material, Test-1 (Diatomite+$Fe^0$+$B_{12}$) and Test-2 (Diatomite+$Fe^0$+$B_{12}$+Vermiculite), catalytically eliminated, or decreased to zero, the concentration of the hexavalent chromium (chromium (VI) cation [$Cr^{+6}$]) water contaminant. In strong contrast, for the same time period, the Control-2 material (Diatomite) decreased the concentration of the hexavalent chromium (chromium (VI) cation [$Cr^{+6}$]) water contaminant water contaminant by a significantly smaller amount, which is incorporated in the data normalization calculation.

Thus, based on, in addition to, or a consequence of, the above described aspects of novelty and inventiveness, the present invention as illustratively described and exemplified hereinabove, has the following beneficial and advantageous aspects, characteristics, or features.

The components (powdered diatomite matrix, nanometer sized zero valent metal particles, at least one electron transfer mediator, and, optionally, vermiculite) of the zero valent metal composite of the present invention are natural, user-friendly, and environmentally friendly.

The powdered diatomite matrix is highly absorbent, physically and chemically stable, nearly indestructible, and ordinarily chemically inert to most common water contaminants.

The powdered diatomite matrix is highly absorbent, which in addition to the catalytic activity of the nanometer sized zero valent metal particles, provides an additional mechanism for decreasing the concentration of contaminants in contaminated water, by absorbing and retaining the contaminants on or/and in the matrix.

The powdered diatomite matrix is highly permeable, and therefore promotes (in-situ) funneling or channeling of contaminated water to a treatment zone, thus reducing both the amounts of material and the extent of the area needed for treatment and remediation of contaminated water.

Inclusion of the powdered diatomite matrix in the zero valent metal composite, wherein the zero valent metal particles are incorporated on or/and in (dispersed throughout, supported by, and adhering in a chemical bonding manner to) the powdered diatomite matrix, drastically reduces the amount of zero valent metal that is required for catalytically treating contaminated water, thus increasing the economic viability of treatment and remediation of contaminated water.

Incorporation of the nanometer sized zero valent metal particles does not significantly affect the small- and large-scale porosity of the powdered diatomite matrix, such that pores of the diatomite matrix remain open to fluid flow.

The zero valent metal particles which are incorporated on or/and in the powdered diatomite matrix have extremely large specific surface areas. This physicochemical characteristic of the zero valent metal particles is directly related to, and used for exploiting, chemical reduction reaction activity by the zero valent metal composite. Moreover, the large specific surface areas of the nano-sized zero valent metal particles significantly reduces the effects of catalyst fouling and extends the activity period of the zero valent metal included in the zero valent metal composite.

The configuration of the zero valent metal composite having nanometer sized zero valent metal particles being incorporated on or/and in the powdered diatomite matrix decreases the rate of oxidation of the ordinarily pyrophoric nano-sized metal particles, thus enabling easier handling, transportation, use, and application, of the zero valent metal composite.

The components (powdered diatomite matrix, nanometer sized zero valent metal particles, at least one electron transfer mediator, and, optionally, vermiculite) of the zero valent metal composite, singly, or in a synergistic combination, catalytically decrease contaminant concentrations in contaminated water. For example, an electron transfer mediator, which is incorporated on or/and in the powdered diatomite matrix of the zero valent metal composite, and which may also chemically adhere to the metallic surface of the zero valent metal particles, and for the specific embodiment of the zero valent metal composite additionally including vermiculite, may also chemically or/and physically adhere to the hydrated silicate surface of the vermiculite, primarily functions as a chemical substance which is catalytically active. Thus, the electron transfer mediator, along with the catalytically active nanometer sized zero valent metal particles, can synergistically function in combination for enhancing the catalytic reactions taking place during the catalytic treatment of the contaminated water.

For the alternative preferred embodiment of the zero valent metal composite, additionally including vermiculite, the vermiculite primarily functions as a physical scaffold, being a frame or platform, for physically supporting the powdered diatomite matrix on or/and in which are incorporated the zero valent metal particles and the at least one electron mediator. The vermiculite may also function by increasing the adsorption, in addition to the porosity and permeability (permeability, k), properties, parameters, characteristics, and behavior, of the zero valent metal composite. The vermiculite may also function as a chemically active species, for example, by serving as an additional support for chemisorption of reaction species, participating in the redox (reduction-oxidation) reaction(s) taking place between contaminants in contaminated water and the zero valent metal composite of the present invention, during the catalytic treatment of the contaminated water.

Another advantageous feature of the additional inclusion of the vermiculite, is that in the alternative preferred embodiment of the manufacturing method, during the reaction taking place for forming the zero valent metal composite (including vermiculite), in addition to the electron transfer mediator, the vermiculite may also function as a chemically active species, for example, by actively facilitating (mediating, catalyzing, or co-catalyzing) the reduction of the oxidized form of the metal in the metal salt to the zero valent metal, or/and by actively facilitating (mediating, catalyzing, or co-catalyzing) the bonding of the zero valent metal to the silica surface of the powdered diatomite matrix.

The present invention, as illustratively described and exemplified hereinabove, is generally applicable to a variety of industries, which have a need for (in-situ or ex-situ) treating any of a wide variety of different forms of contaminated water, for example, sub-surface water, surface water, above-surface water, water vapor, gaseous water, or any combination thereof, which are contaminated with any number of a wide variety of different types or kinds of organic or/and inorganic chemical contaminants.

The present invention is particularly applicable to treating such forms of contaminated water wherein the water contaminants are organic species, for example, halogenated organic compounds and halogen containing degradation products thereof; inorganic species, for example, metal elements, metal element containing inorganic species, nonmetal elements, and nonmetal element containing inorganic species; or any combination thereof.

The present invention is particularly applicable for treating contaminated water located in geographical areas or regions designated by governmental environmental agencies as requiring waste remediation or clean-up, or/and contaminated water associated with commercial processes requiring environmental control, monitoring, and treatment, of effluent contaminated water.

As previously stated hereinabove, although the present invention is primarily focused on applications involving catalytic treatment of contaminated water, wherein the contaminated water is, for example, a form of sub-surface water, surface water, above-surface water, water vapor, gaseous water, or any combination thereof, it is to be fully understood that the present invention is also applicable to (in-situ or ex-situ) catalytically treating contaminated non-aqueous fluids (in liquid, vapor, or/and gaseous forms), for decreasing contaminant concentrations therefrom.

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

BIBLIOGRAPHY

1. Mackay, D. M., and Cherry, J. A., *Environ. Sci. Technol.*, 23(6): 630-636, (1989).
2. Rodriguez, E. M, et al., *Chemosphere*, 54: 71-78 (2004).
3. Pon, G., et al., *Environ. Sci. Technol.*, 37: 3181-3188 (2003).
4. Schnoor, J. L., et al., *Environ. Sci. Tech.*, 29: 318A-323A (1995).
5. Newman, L. A., et al., *Environ. Sci. Tech.*, 31: 1062-1067 (1997).
6. Jeffers, P. M., et al., *Geophys. Res. Lett.*, 25: 43-46 (1998).
7. Nzengung, V. A., et al., *J. Phytoremediation*, 1(3): 203-226 (1999).
8. Garrison, A. W., et al., *Environ. Sci. Tech.*, 34: 1663-1670 (2000).
9. Matheson, L. J., et al., *Environ. Sci. Tech.*, 28 (12): 2045-2053 (1994).
10. Campbell, T. J., et al., *Environ. Toxicol. Chem.*, 16 (4): 625-630 (1997).
11. Orth, W. S. and Gillham, R. W., *Environ. Sci. Tech.*, 30 (1): 66-71 (1996).
12. Burris, D. R., et al., *Environ. Sci. Tech.*, 29 (11): 2850 (1995).
13. Roberts, A. L., et al., *Environ. Sci. Tech.*, 30 (8): 2654 (1996).
14. Allen-King, R. M., et al., *Environ. Toxicol. Chem.*, 16 (3): 424-429 (1997).
15. Kim, Y., et al., *Environ. Sci. Tech.*, 34 (10): 2014-2017 (2000).
16. Su, C. and Puls, R. W., *Environ. Sci. Tech.*, 33: 163-168 (1999).
17. Larson, R. A. and Weber, E. J., Reaction Mechanisms in Environmental Organic Chemistry, Lewis Publishers, Boca Raton, Fla., USA (1994).
18. Assaf-Anid, N., et al., *Environ. Sci. Technol.*, 28: 246-252 (1994).
19. Chiu, P. and Reinhard, M., *Environ. Sci. Technol.*, 29: 595-603 (1995).
20. Gantzer, C. J. and Wackett, L. P., *Environ. Sci. Technol.*, 25: 715-722 (1991).
21. Klecka, G. M. and Gonsior, S. J., *Chemosphere*, 13: 3, 391-402 (1984).
22. Schanke, C. A. and Wackett, L. P., *Environ. Sci. Technol.*, 26: 830-833 (1992).
23. Baxter, R. M., *Chemosphere*, 21: 451-458 (1990).
24. Krone, U. E., et al., *Biochemistry*, 28: 4908-4914 (1989a).
25. Krone, U. E., et al., *Biochemistry*, 28, 10061-10065 (1989b).
26. Marks, T. S., et al., *Appl. Environ. Microbiol.*, 55: 1258-1261 (1989).
27. Quirke, J. M. E., et al., *Chemosphere*, 3: 151 (1979).
28. Wade, R. S. and Castro, C. E., *J. Am. Chem. Soc.*, 95: 226-230 (1973).

29. Zoro, J. A., et al., *Nature* (London), 247, 235 (1974).
30. Dunnivant, F. M., et al., *Environ. Toxicol. Chem.*, 23: 252-257 (1992).
31. Perlinger, et al., *Environ. Sci. Tech.*, 32: 2431-2437 (1998).
32. O'Loughlin, E. J., et al., *Environ. Sci. Tech.*, 33: 1145-1147 (1999).
33. Curtis, G. P. and Reinhard, M., *Environ. Sci. Tech.*, 28: 2393-2401 (1994)].
34. Kadish, K. M., et al., editors, The Porphyrin Handbook: Vols. 1-10, Academic Press, San Diego, Calif., USA (1999).
35. Hambright, P., "Chemistry of Water Soluble Porphyrins", in reference 79, Vol. 3, Chapter 3, 129-200 (1999).
36. Guilard R., et al., "Synthesis, Spectroscopy and Electrochemical Properties of Porphyrins with Metal-Carbon Bonds", in reference 79, Vol. 3, Chapter 21, 295-338 (1999).
37. Barwise, A. J. G. and Roberts, I., *Organic Geochemistry*, 6: 167-176 (1984).
38. Harradine, P. J. and Maxwell, J. R., *Organic Geochemistry*, 28: 111-117 (1998).
39. Callot, H. J. and Ocampo, R., "Geochemistry of Porphyrinogens", in reference 79, Vol. 1, 349-398 (1999).
40. Chiu, P. C. and Reinhard, M., *Environ. Sci. Tech.*, 29: 595-603 (1995).
41. Lewis, T. A., et al., *J. Environ. Qual.*, 24: 56-61 (1995).
42. Lewis, T. A., et al., *Environ. Sci. Tech.*, 30: 292-300 (1996).
43. Glod, G., et al., *Environ. Sci. Tech.*, 31: 3154-3160 (1997).
44. Burris, D. R., et al., *Environ. Sci. Tech.*, 30: 3047-3052 (1996).
45. Burris, D. R., et al., *Environ. Toxicol. Chem.*, 17: 1681-1688 (1998).
46. Garant, H. and Lynd, L., *Biotechnol. Bioeng.*, 57: 751-755 (1998).
47. Natarajan, M. R., et al., *Appl. Microbiol. Biotechnol.*, 46: 673-677 (1996).
48. Woods, S. L., et al., *Environ. Sci. Tech.*, 33: 857-863 (1999).
49. Habeck, B. D. and Sublette, K. L., *Appl. Biochem. Biotechnol.*, 51-2, 747-759 (1995).
50. Smith, M. H. and Woods, S. L., *Appl. Envrion. Microbiol.*, 60: 4107-4110 (1994).
51. Lesage, S., et al., *Environ. Sci. Tech.*, 32: 2264-2272 (1998).
52. Ukrainczyk, L., et al., *Environ. Sci. Tech.*, 29: 439-445 (1995).
53. Marks, T. S. and Maule, A., *Applied Microbiology and Biotechnology*, 38: 413-416 (1992).
54. Fuhr, J. H. and Smith, K. M., "Laboratory Methods", in Porphyrins and Metalloporphyrins, Smith, K. M., editor, Elsevier, Amsterdam, The Netherlands, 757-869 (1975).
55. Warburg, O. and Negelein, E., *Biochemistry Z*, 244: 239-242 (1932).
56. Bear, J., "Dynamics of Fluids in Porous Media", Dover Publications, Inc., New York (1988), (originally published by American Elsevier Pub. Co., Inc. (1972).
57. de Marsily, G., "Quantitative Hydrogeology", Academic Press, Inc., New York (1986).
58. http://www.epa.gov/epaoswer/hazwaste/test/pdfs/7196a.pdf; accessible through December, 2005.

What is claimed is:

1. A zero valent metal composite comprising a powdered diatomite matrix on or/and in which is incorporated zero valent metal particles having a size in a range of between about 1 nm and about 1000 nm and at least one electron transfer mediator, wherein concentration of said zero valent metal particles is in a range of between about 0.1 weight percent and about 20 weight percent of total weight of the composite, and wherein said at least one electron transfer mediator comprises at least one porphyrinogenic organometallic complex.

2. The composite of claim 1, wherein said powdered diatomite matrix has a particle size in a range of between about 1 micron and about 150 microns.

3. The composite of claim 1, wherein said metal in said zero valent metal particles comprises at least one transition metal.

4. The composite of claim 1, wherein said zero valent metal particles have a size in a range of between about 5 nm and about 500 nm.

5. The composite of claim 1, wherein concentration of said at least one electron transfer mediator is in a range of between about 0.001 weight percent and about 1 weight percent of total weight of the composite.

6. The composite of claim 1, additionally including vermiculite.

7. The composite of claim 6, wherein said vermiculite has a piece size in a range of between about 0.01 mm and about 20 mm.

8. The composite of claim 6, wherein concentration of said vermiculite is in a range of between about 20 weight percent and about 95 weight percent of total weight of the composite.

9. A zero valent metal composite comprising a composition consisting essentially of a powdered diatomite matrix on or/and in which is incorporated zero valent metal particles having a size in a range of between about 1 nm and about 1000 nm and at least one electron transfer mediator, wherein concentration of said zero valent metal particles is in a range of between about 0.1 weight percent and about 20 weight percent of total weight of the composite, and wherein said at least one electron transfer mediator comprises at least one porphyrinogenic organometallic complex.

10. The composite of claim 9, wherein said powdered diatomite matrix has a particle size in a range of between about 1 micron and about 150 microns.

11. The composite of claim 9, wherein said metal in said zero valent metal particles comprises at least one transition metal.

12. The composite of claim 9, wherein said zero valent metal particles have a size in a range of between about 5 nm and about 500 nm.

13. The composite of claim 9, wherein concentration of said at least one electron transfer mediator is in a range of between about 0.001 weight percent and about 1 weight percent of total weight of the composite.

14. A method of manufacturing a zero valent metal composite, the method comprising incorporating zero valent metal particles having a size in a range of between about 1 nm and about 1000 nm and at least one electron transfer mediator on or/and in a powdered diatomite matrix, wherein concentration of said zero valent metal particles is in a range of between about 0.1 weight percent and about 20 weight percent of total weight of the composite, and wherein said at least one electron transfer mediator comprises at least one porphyrinogenic organometallic complex.

15. The method of claim 14, wherein said powdered diatomite matrix has a particle size in a range of between about 1 micron and about 150 microns.

16. The method of claim 14, wherein said metal in said zero valent metal particles comprises at least one transition metal.

17. The method of claim 14, wherein said zero valent metal particles have a size in a range of between about 5 nm and about 500 nm.

18. The method of claim 14, wherein concentration of said at least one electron transfer mediator is in a range of between about 0.001 weight percent and about 1 weight percent of total weight of the composite.

19. The method of claim 14, further comprising, prior to, during or subsequent to said incorporating, adding vermiculite, such that the zero valent metal composite additionally includes said vermiculate.

20. The method of claim 19, wherein said vermiculite has a piece size in a range of between about 0.01 mm and about 20 mm.

21. The method of claim 19, wherein concentration of said vermiculite is in a range of between about 20 weight percent and about 95 weight percent of total weight of the composite.

22. The method of claim 14, wherein said incorporating comprises:
providing an aqueous solution of a metal salt and said at least one electron transfer mediator;
adding said powdered diatomite matrix to said aqueous solution, to thereby form an aqueous slurry of said metal salt, said at least one electron transfer mediator, and said powdered diatomite matrix; and
contacting said aqueous slurry with a reducing agent, to thereby produce said zero valent metal particles, and further to thereby incorporate said zero valent metal particles and said at least one electron transfer mediator on or/and in said powdered diatomite matrix.

23. The method of claim 22, wherein said metal salt comprises at least one transition metal salt.

24. The method of claim 22, wherein said at least one electron transfer mediator comprises at least one porphyrinogenic organometallic complex.

25. The method of claim 22, wherein said incorporating further comprises adding vermiculite to said aqueous solution, to thereby form a mixture of said vermiculite and said aqueous solution, such that said adding said powdered diatomite matrix is to said mixture, and said aqueous slurry is of said metal salt, said at least one electron transfer mediator, said powdered diatomite matrix and said vermiculite.

26. A method for catalytically treating contaminated water, the method comprising exposing the contaminated water to a catalytically effective amount of a zero valent metal composite comprised of a powdered diatomite matrix on or/and in which is incorporated zero valent metal particles having a size in a range of between about 1 nm and about 1000 nm and at least one electron transfer mediator, to thereby decrease concentration of at least one contaminant in the contaminated water, said at least one contaminant comprising a halogenated organic compound, wherein concentration of said zero valent metal particles is in a range of between about 0.1 weight percent and about 20 weight percent of total weight of said composite, and wherein said at least one electron transfer mediator comprises at least one porphyrinogenic organometallic complex.

27. The method of claim 26, wherein said powdered diatomite matrix has a particle size in a range of between about 1 micron and about 150 microns.

28. The method of claim 26, wherein said metal in said zero valent metal particles comprises at least one transition metal.

29. The method of claim 26, wherein said zero valent metal particles have a size in a range of between about 5 nm and about 500 nm.

30. The method of claim 26, wherein concentration of said at least one electron transfer mediator is in a range of between about 0.001 weight percent and about 1 weight percent of total weight of the composite.

31. The method of claim 26, wherein said zero valent metal composite additionally includes vermiculite.

32. The method of claim 31, wherein said vermiculite has a piece size in a range of between about 0.01 mm and about 20 mm.

33. The method of claim 31, wherein concentration of said vermiculite is in a range of between about 20 weight percent and about 95 weight percent of total weight of the composite.

34. The method of claim 26, wherein said exposing is performed by using a system which includes said zero valent metal composite and at least one unit for containing said catalytically effective amount of said zero valent metal composite.

35. A zero valent metal composite comprising a powdered diatomite matrix on or/and in which is incorporated zero valent metal particles having a size in a range of between about 1 nm and about 1000 nm, at least one electron transfer mediator, and vermiculite, wherein concentration of said vermiculite is in a range of between about 20 weight percent and about 95 weight percent of total weight of the composite.

36. The composite of claim 35, wherein said powdered diatomite matrix has a particle size in a range of between about 1 micron and about 150 microns.

37. The composite of claim 35, wherein said metal in said zero valent metal particles comprises at least one transition metal.

38. The composite of claim 35, wherein said zero valent metal particles have a size in a range of between about 5 nm and about 500 nm.

39. The composite of claim 35, wherein concentration of said zero valent metal particles is in a range of between about 0.1 weight percent and about 20 weight percent of total weight of the composite.

40. The composite of claim 35, wherein said at least one electron transfer mediator comprises at least one porphyrinogenic organometallic complex.

41. The composite of claim 35, wherein concentration of said at least one electron transfer mediator is in a range of between about 0.001 weight percent and about 1 weight percent of total weight of the composite.

42. The composite of claim 35, wherein said vermiculite has a piece size in a range of between about 0.01 mm and about 20 mm.

43. A method of manufacturing a zero valent metal composite, the method comprising incorporating zero valent metal particles having a size in a range of between about 1 nm and about 1000 nm, and at least one electron transfer mediator on or/and in a powdered diatomite matrix, the method further comprising, prior to, during or subsequent to said incorporating, adding vermiculite, such that the zero valent metal composite additionally includes said vermiculate, wherein concentration of said vermiculite is in a range of between about 20 weight percent and about 95 weight percent of total weight of the composite.

44. The method of claim 43, wherein said incorporating comprises:
providing an aqueous solution of a metal salt, said at least one electron transfer mediator and said vermiculite;
adding said powdered diatomite matrix to said aqueous solution, to thereby form an aqueous slurry of said metal salt, said at least one electron transfer mediator, said vermiculite and said powdered diatomite matrix; and
contacting said aqueous slurry with a reducing agent, to thereby produce said zero valent metal particles, and further to thereby incorporate said zero valent metal particles, said at least one electron transfer mediator and said vermiculite on or/and in said powdered diatomite matrix.

45. A method for catalytically treating contaminated water, the method comprising exposing the contaminated water to a catalytically effective amount of a zero valent metal composite comprised of a powdered diatomite matrix on or/and in which is incorporated zero valent metal particles having a size in a range of between about 1 nm and about 1000 nm, at least one electron transfer mediator and vermiculite, to thereby decrease concentration of at least one contaminant in the contaminated water, wherein concentration of said vermiculite is in a range of between about 20 weight percent and about 95 weight percent of total weight of the composite.

46. The method of claim 45, wherein said exposing is performed by using a system which includes said zero valent metal composite and at least one unit for containing said catalytically effective amount of said zero valent metal composite.

* * * * *